US010595100B2

(12) United States Patent
Lee et al.

(10) Patent No.: US 10,595,100 B2
(45) Date of Patent: Mar. 17, 2020

(54) DISTRIBUTED, UNFOLDING, EMBEDDED TRANSACTION AND INVENTORY APPARATUSES, METHODS AND SYSTEMS

(71) Applicant: The Electric Fan Company, New York, NY (US)

(72) Inventors: John Anthony Lee, Toronto (CA); Jason Alan Snyder, Ridgewood, NJ (US); Bradley Wallace Weir, Toronto (CA)

( * ) Notice: Subject to any disclaimer, the term of this patent is extended or adjusted under 35 U.S.C. 154(b) by 0 days.

(21) Appl. No.: 14/488,167

(22) Filed: Sep. 16, 2014

(65) Prior Publication Data
US 2015/0249872 A1    Sep. 3, 2015

Related U.S. Application Data

(60) Provisional application No. 62/029,561, filed on Jul. 27, 2014, provisional application No. 62/011,149, (Continued)

(51) Int. Cl.
*H04N 21/8545* (2011.01)
*G06Q 30/06* (2012.01)
(Continued)

(52) U.S. Cl.
CPC ......... *H04N 21/8545* (2013.01); *G06Q 30/02* (2013.01); *G06Q 30/06* (2013.01);
(Continued)

(58) Field of Classification Search
CPC .............................................. H04N 21/47815
(Continued)

(56) References Cited

U.S. PATENT DOCUMENTS 6,573,908 B1    6/2003  Jang
2007/0208751 A1*  9/2007  Cowan ................... G06Q 30/02
(Continued)

FOREIGN PATENT DOCUMENTS

KR    1020030010348    2/2003
KR    1020090044221    5/2009
WO    2012061760    5/2012

OTHER PUBLICATIONS

International Search Report issued for PCT application No. PCT/US2014/055954, dated Dec. 23, 2014.
(Continued)

*Primary Examiner* — Joshua D Taylor
(74) *Attorney, Agent, or Firm* — Hanchuk Kheit LLP; Walter G. Hanchuk

(57) ABSTRACT

The Distributed, Unfolding, Embedded Transaction and Inventory Apparatuses, Methods and Systems ("DUETI") transforms site traversal, site request, embed data request, purchase request inputs via DUETI components into contextual activity payload, digital/media/actual asset procurement outputs. DUETI is a distributed transaction and transformer mechanism. DUETI, in one embodiment, provides a cloud based, distributable, site agnostic purchasing account, and in essence, may act as a commerce enabling media distribution platform. DUETI may provide distributed: advertising, asset browsing, electronic transactions, social sharing and gifting, etc., all disjoined from any one server/site/source. As such, the DUETI may operate with native (e.g., paid) media assets wherever they exist and unfurl around such asset to bring a user the ability to operate on and with the asset wherever it may reside. In one embodiment, the DUETI system includes a processor, and memory with instructions to: provide a video advertisement to a user and receive a user input indicating the user is interested in the video advertisement. The DUETI system may then determine
(Continued)

DUETI—Exemplary Share It UI mine enhanced advertisement content based on the user indication of interest in the advertisement and display enhancement content to the user.

7 Claims, 29 Drawing Sheets

Related U.S. Application Data filed on Jun. 12, 2014, provisional application No. 61/941,336, filed on Feb. 18, 2014, provisional application No. 61/878,569, filed on Sep. 16, 2013.

(51) Int. Cl.
*G06Q 30/02* (2012.01)
*H04N 21/431* (2011.01)
*H04N 21/466* (2011.01)
*H04N 21/478* (2011.01)
*H04N 21/4782* (2011.01)
*H04N 21/81* (2011.01)
*H04N 21/845* (2011.01)
*H04N 21/858* (2011.01)

(52) U.S. Cl.
CPC ..... *H04N 21/4312* (2013.01); *H04N 21/4668* (2013.01); *H04N 21/4782* (2013.01); *H04N 21/47815* (2013.01); *H04N 21/812* (2013.01); *H04N 21/8455* (2013.01); *H04N 21/858* (2013.01)

(58) Field of Classification Search
USPC .......................... 725/37–61; 705/26.5, 27.1
See application file for complete search history.

(56) References Cited

U.S. PATENT DOCUMENTS

| | | | |
|---|---|---|---|
| 2007/0271184 A1* | 11/2007 | Niebert | H04L 63/102 705/51 |
| 2009/0292595 A1* | 11/2009 | Tonnison | G06Q 30/02 705/14.1 |
| 2011/0167254 A1* | 7/2011 | Dagdeviren | G06F 21/10 713/150 |
| 2011/0258031 A1 | 10/2011 | Valin | |
| 2012/0173626 A1* | 7/2012 | Reis | G06Q 30/0241 709/204 |
| 2013/0041781 A1* | 2/2013 | Freydberg | G06Q 50/01 705/27.1 |
| 2013/0282514 A1* | 10/2013 | Dougherty | G06Q 30/02 705/26.5 |
| 2013/0339263 A1* | 12/2013 | Lockhart | G06Q 30/0279 705/329 |
| 2015/0177964 A1* | 6/2015 | Spirer | G06F 17/30056 715/732 |

OTHER PUBLICATIONS

European Search Report for EP application No. EP 14 84 3246, dated Jan. 3, 2017.

* cited by examiner

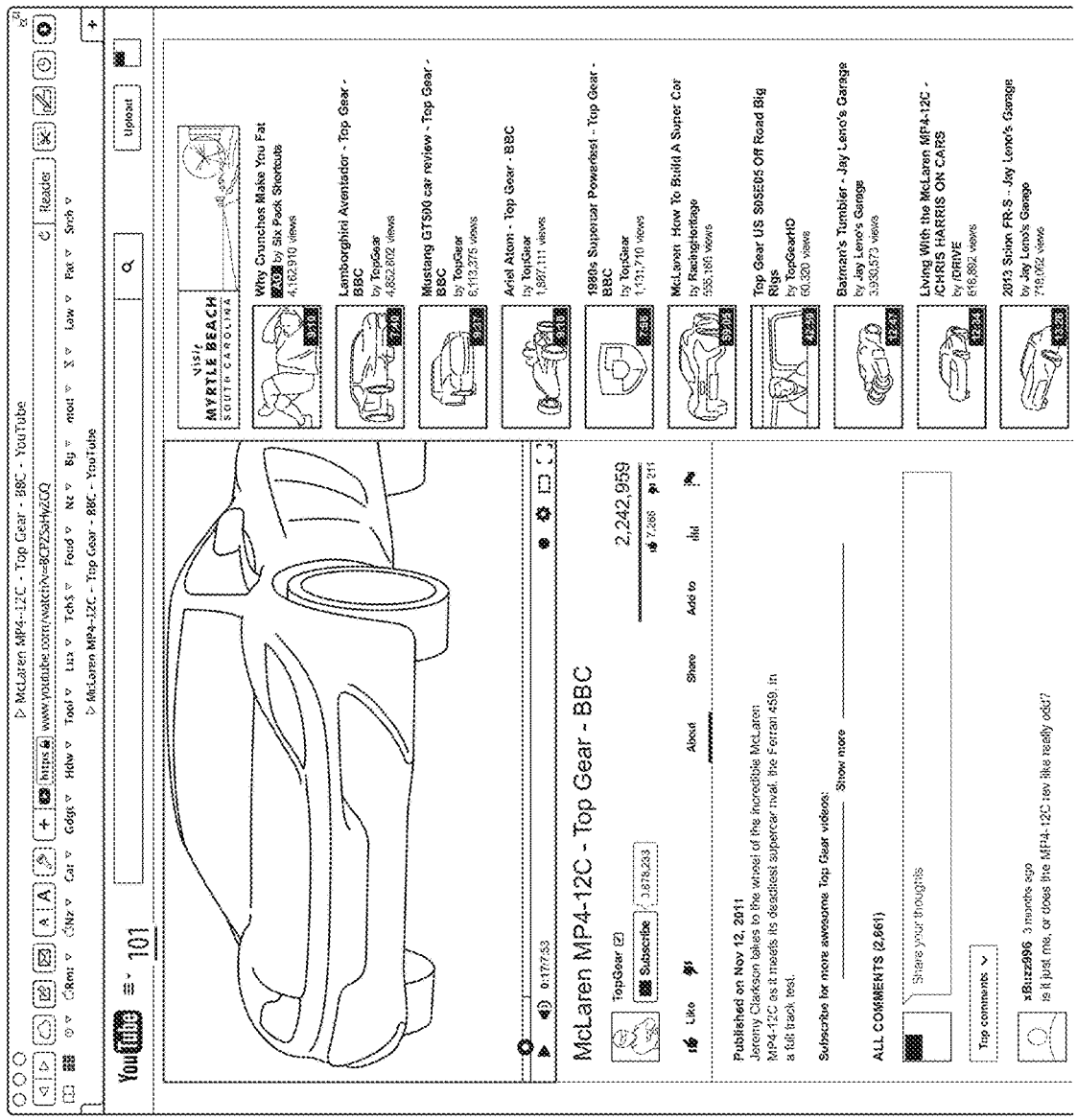
FIG. 1A: DUET1—Exemplary Buy It UI

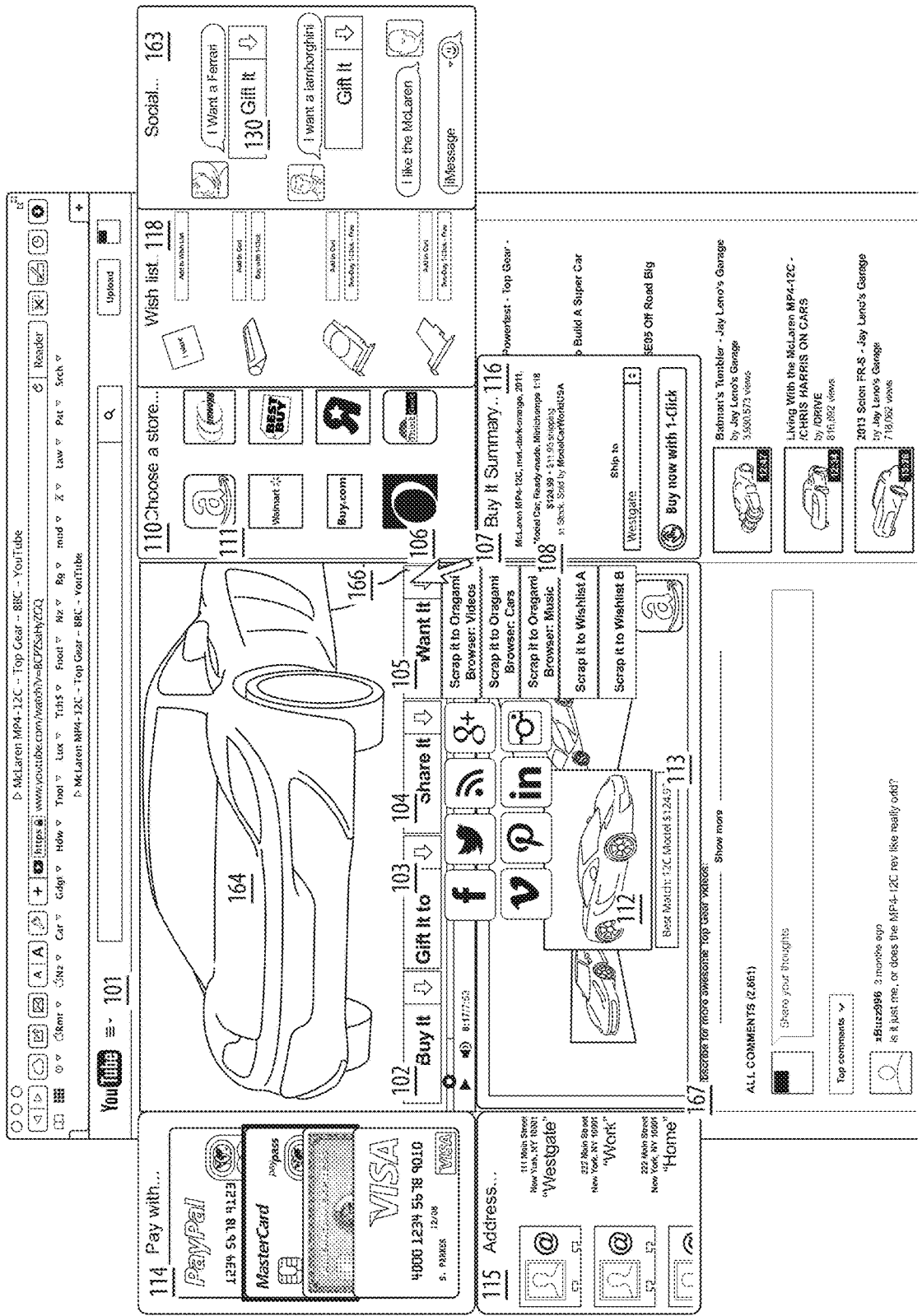
FIG. 1B: DUET—Exemplary Buy It UI

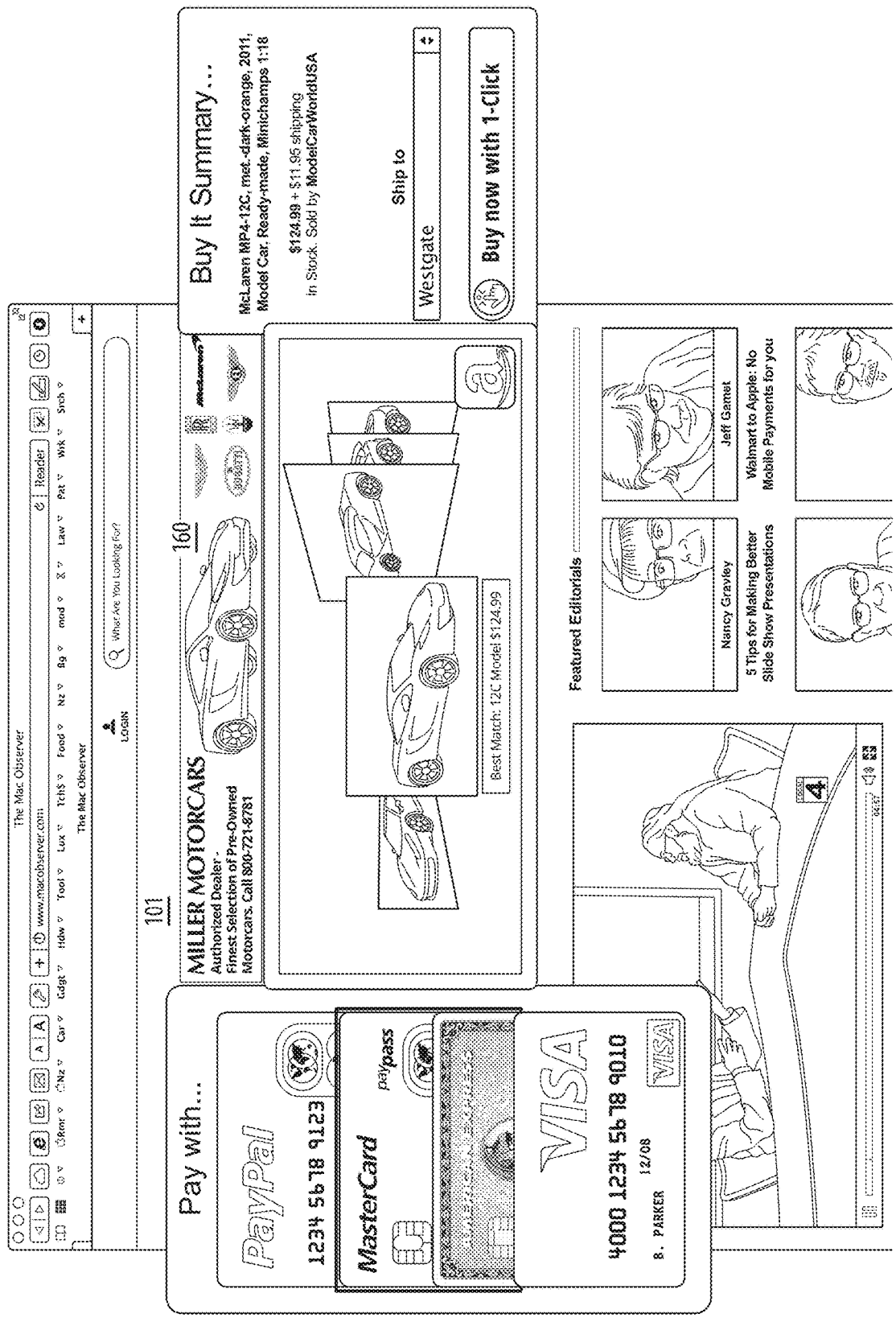
FIG. 1C: DUET1—Exemplary Buy It UI

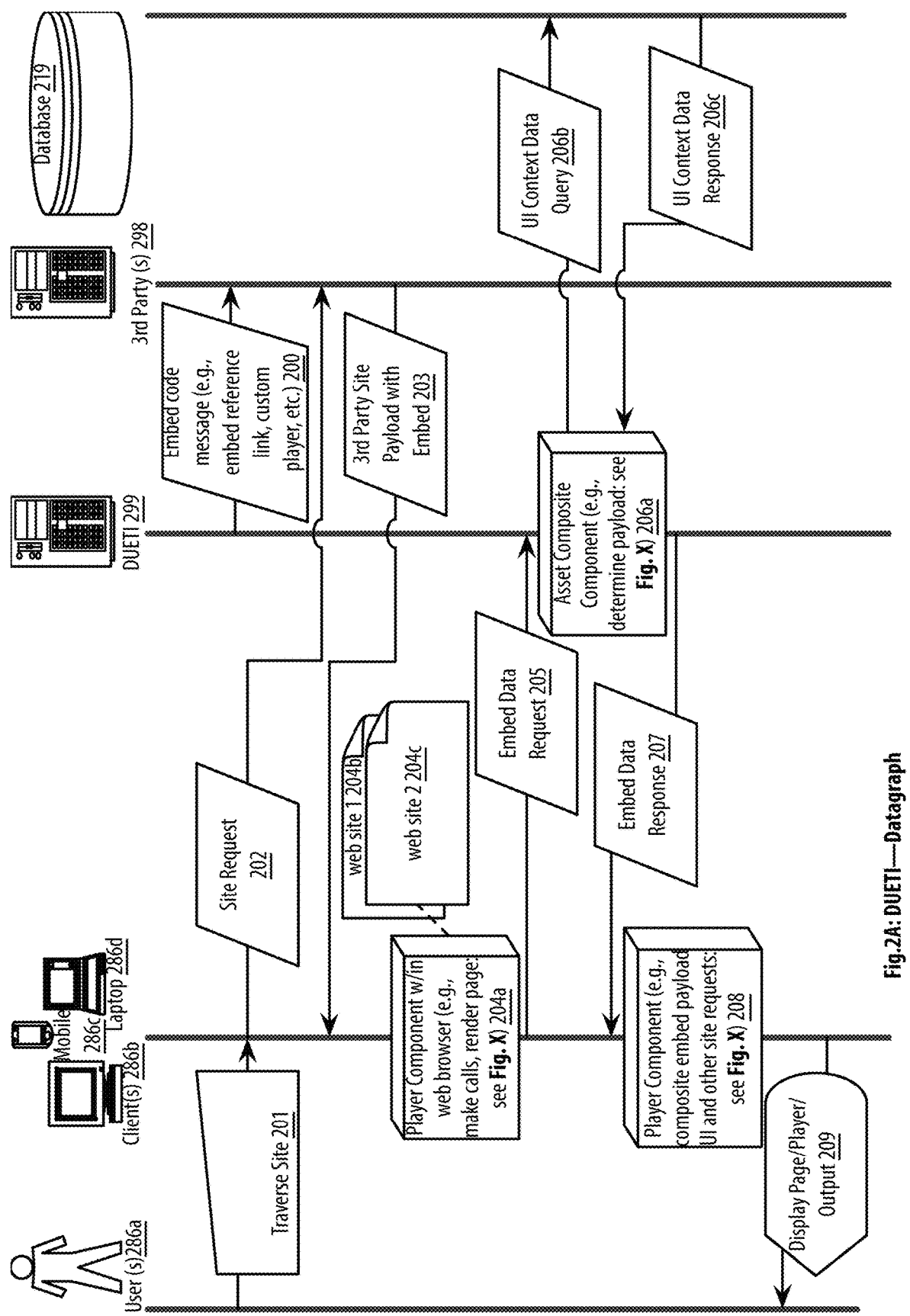
Fig.2A: DUETI—Datagraph

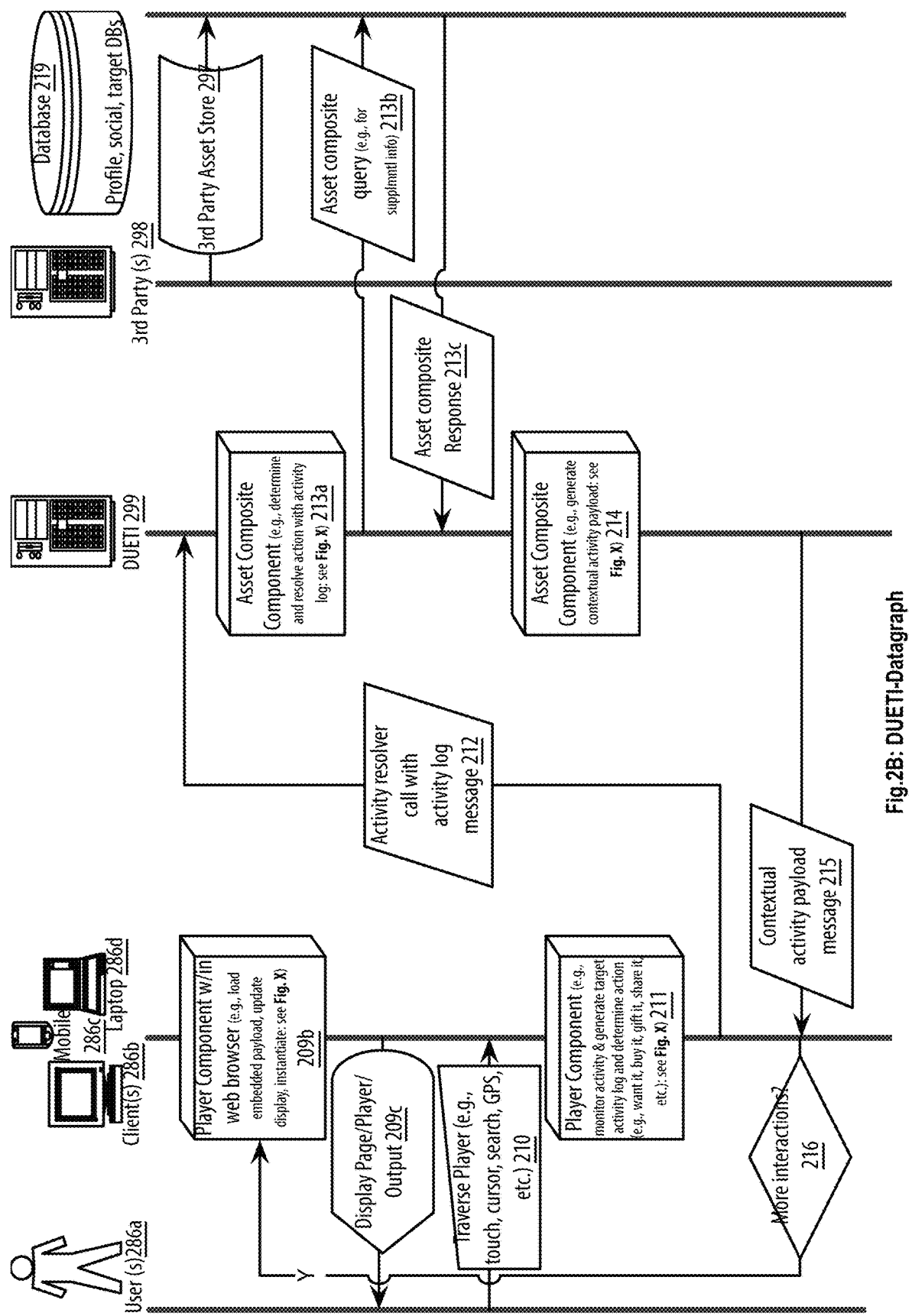
Fig.2B: DUET1-Datagraph

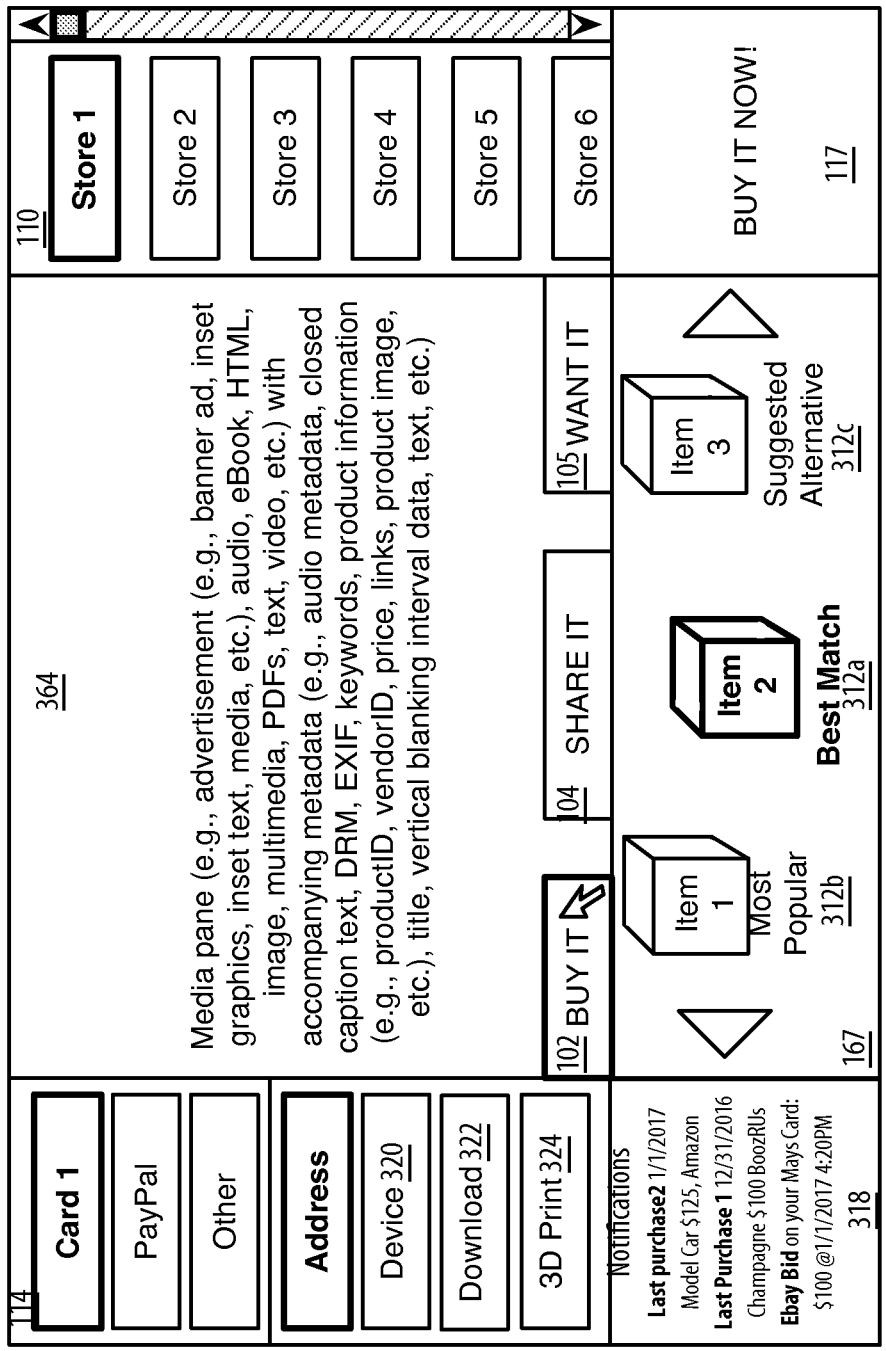
Fig.3: DUETI—Exemplary Buy It UI

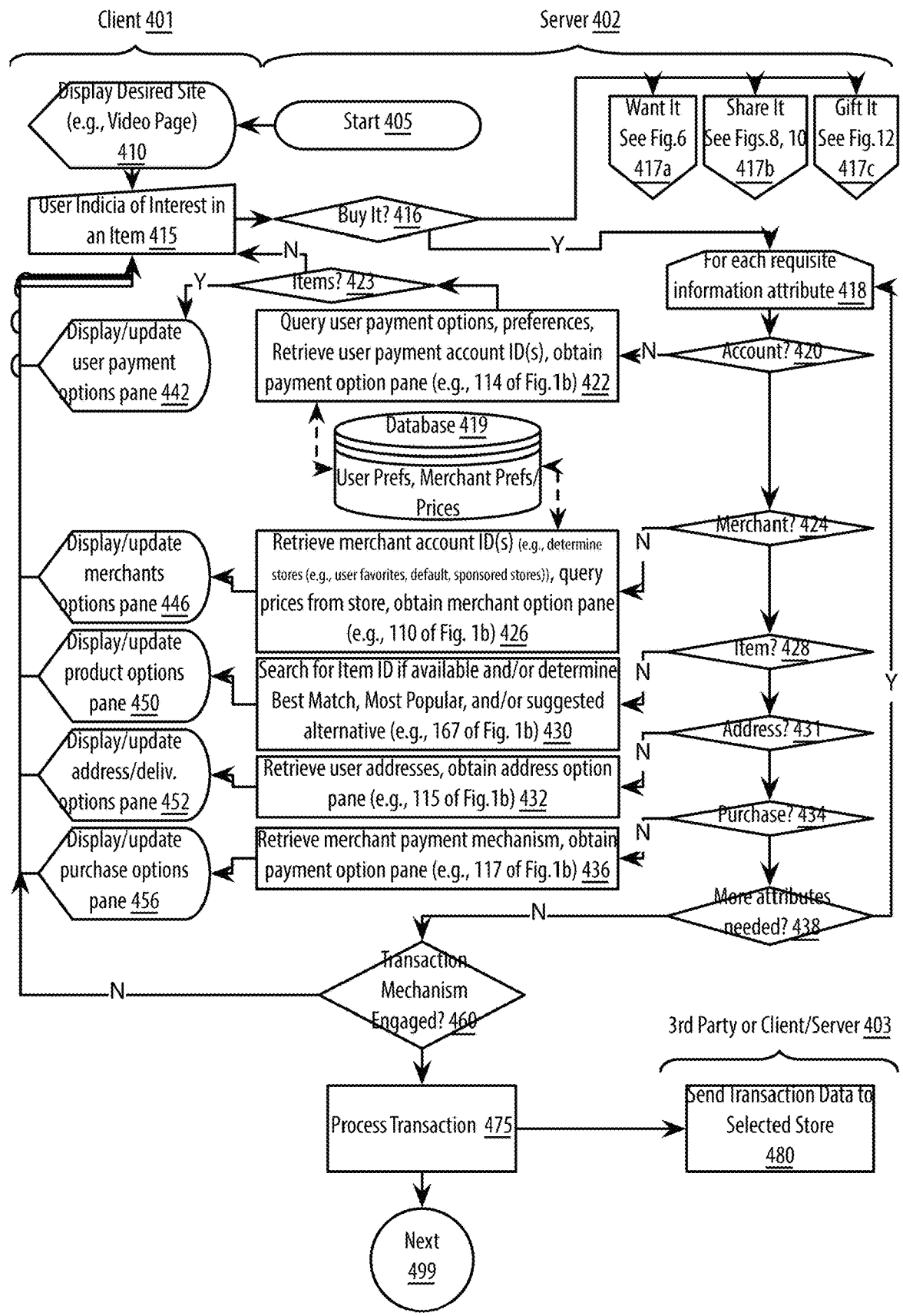
Fig.4: DUETI-Transaction & Asset Transofrmer (TAT) Buy It Component Logic Flow

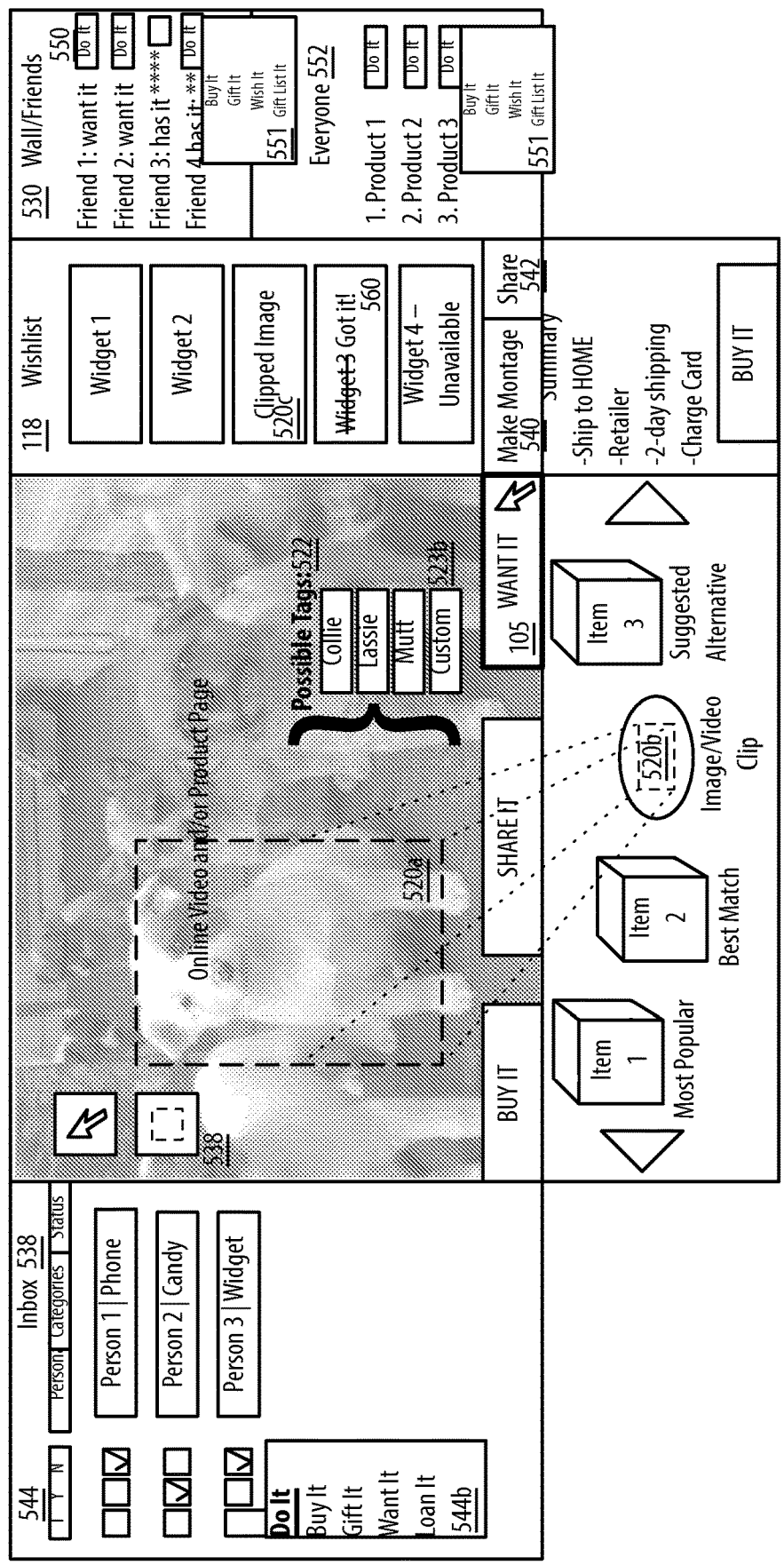
Fig.5: DUETI—Exemplary Want It UI

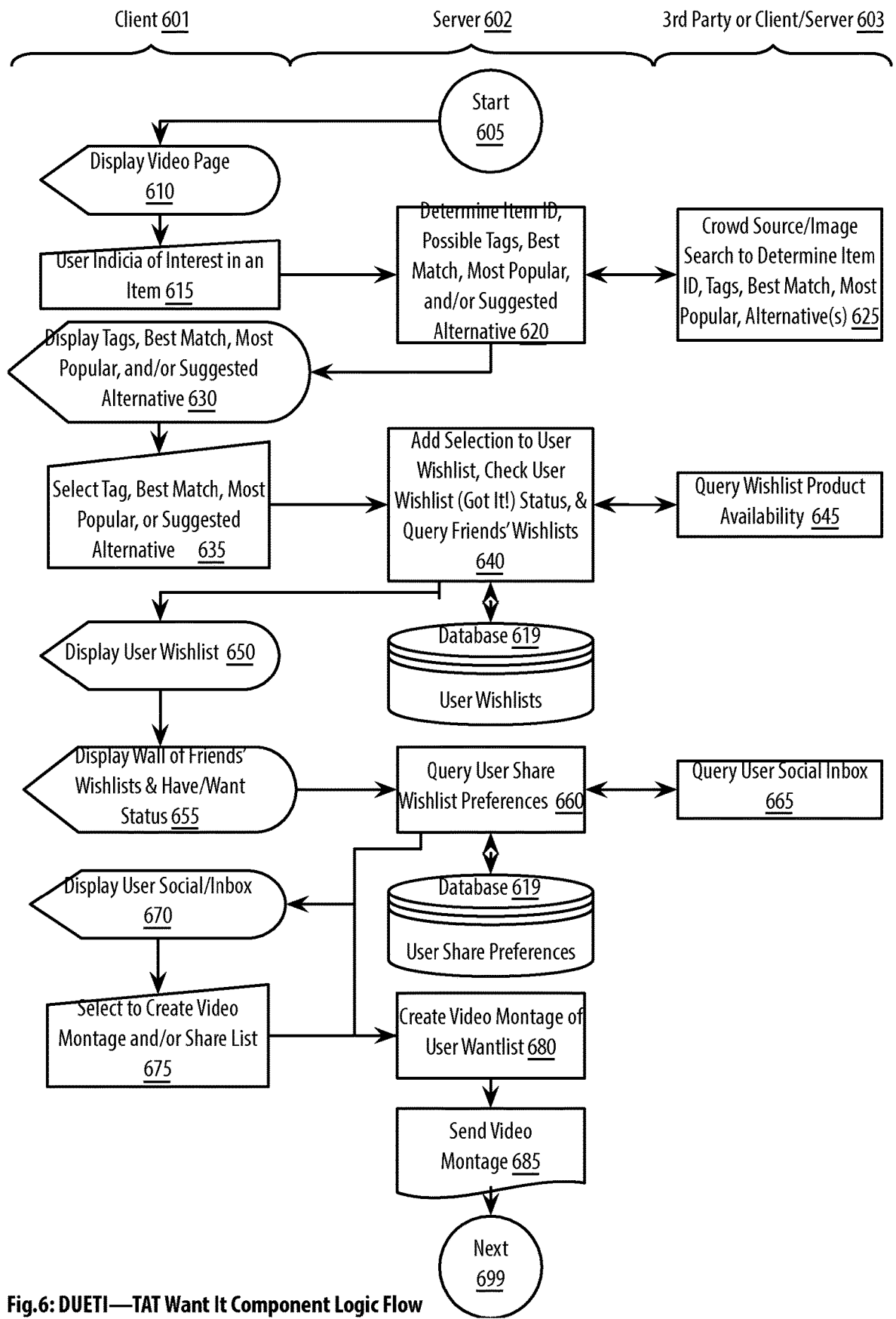
Fig.6: DUETI—TAT Want It Component Logic Flow

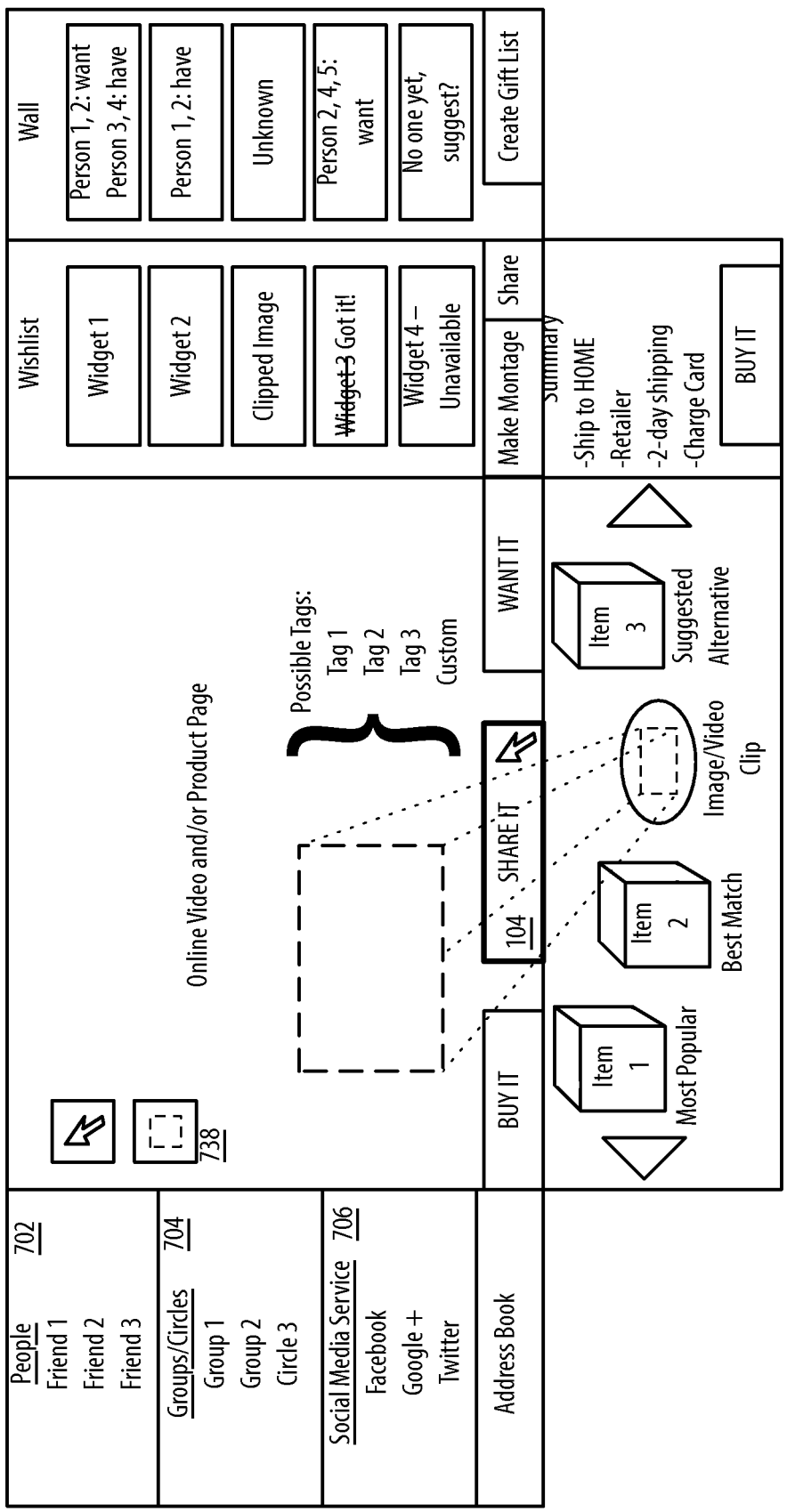
Fig.7: DUETI—Exemplary Share It UI

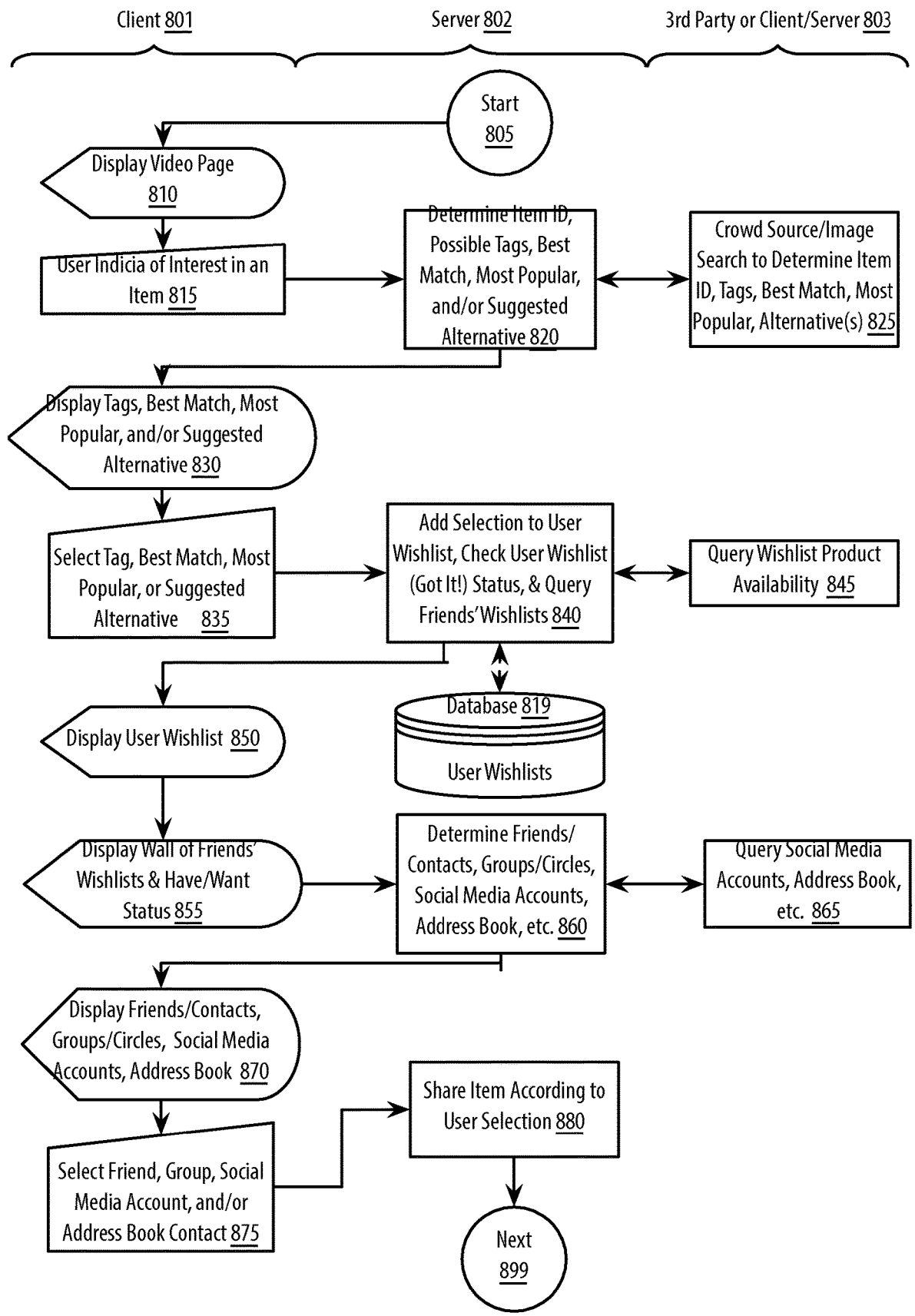
Fig.8: DUETI—TAT Share It Component Logic Flow

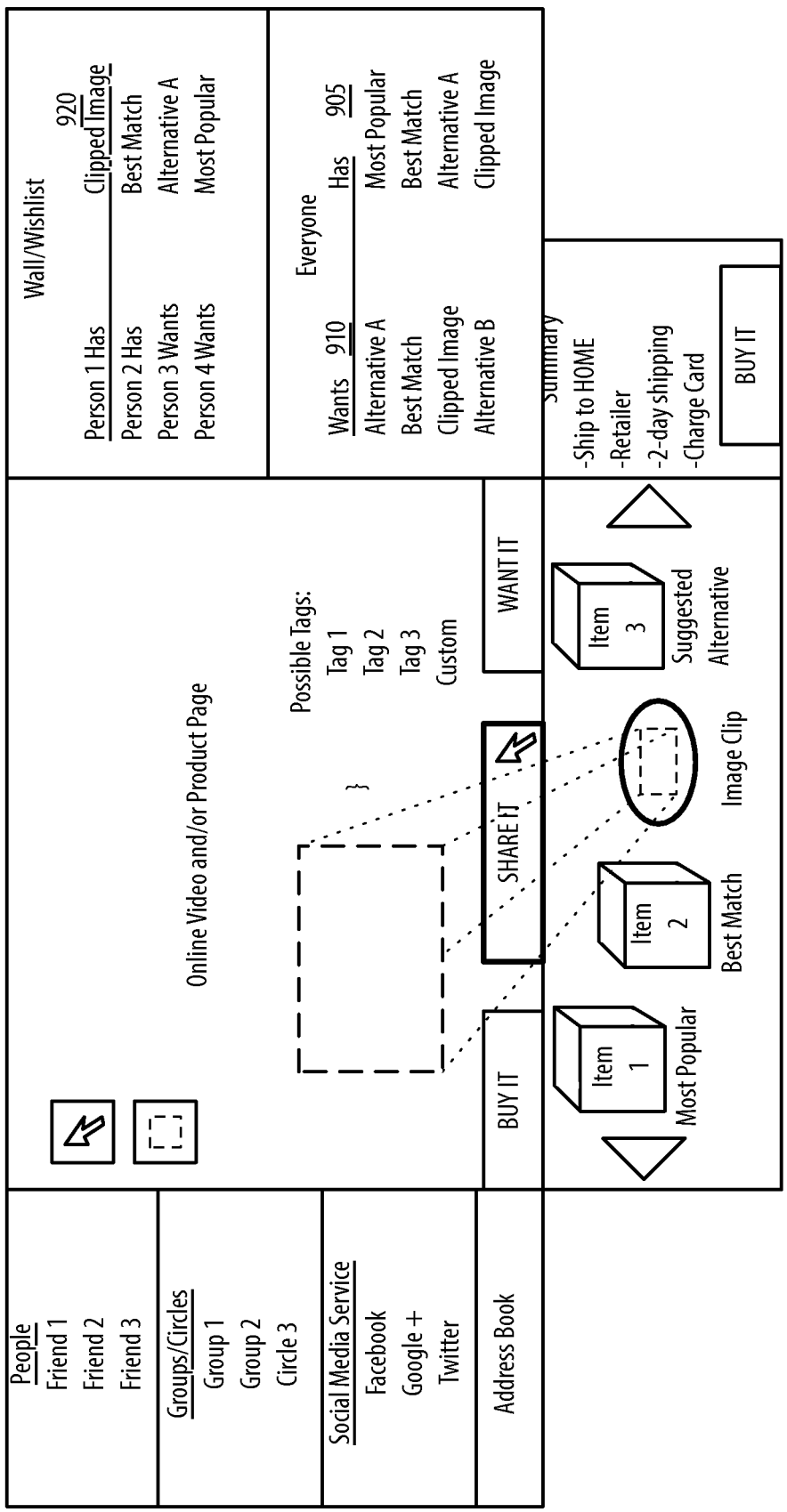
Fig. 9: DUETI—Exemplary Share It UI

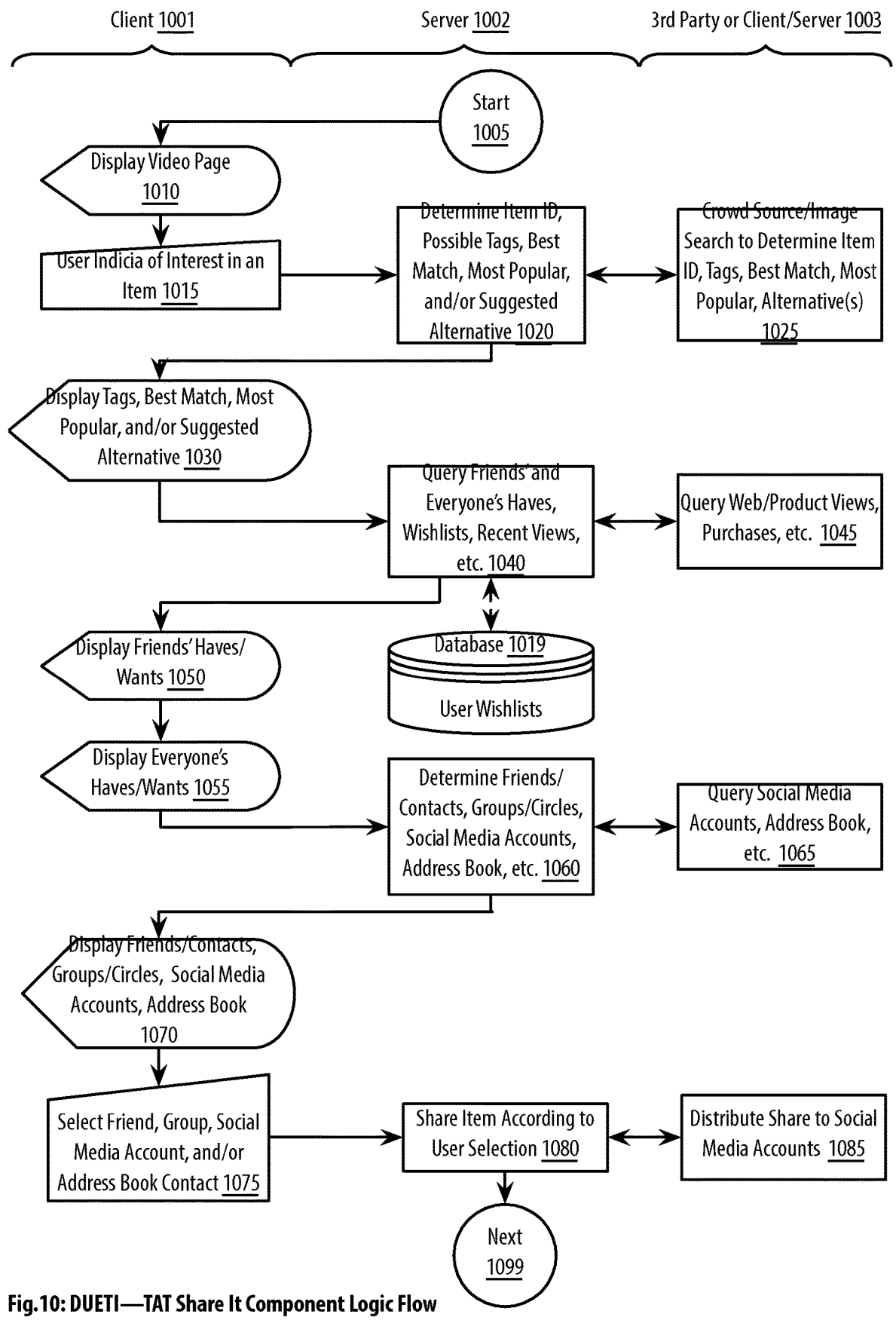
Fig.10: DUETI—TAT Share It Component Logic Flow

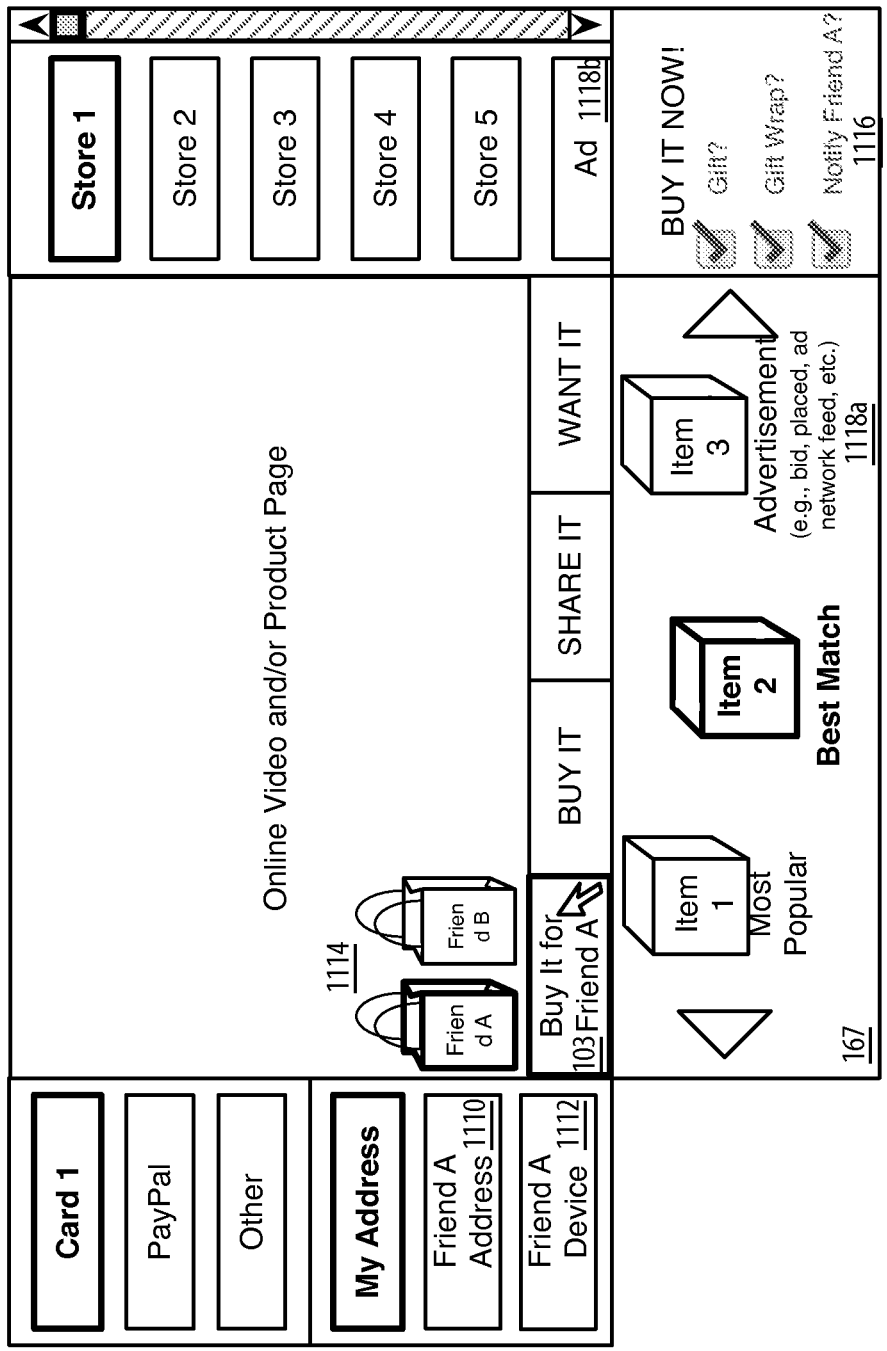
Fig.11: DUETI—Exemplary Gift It UI

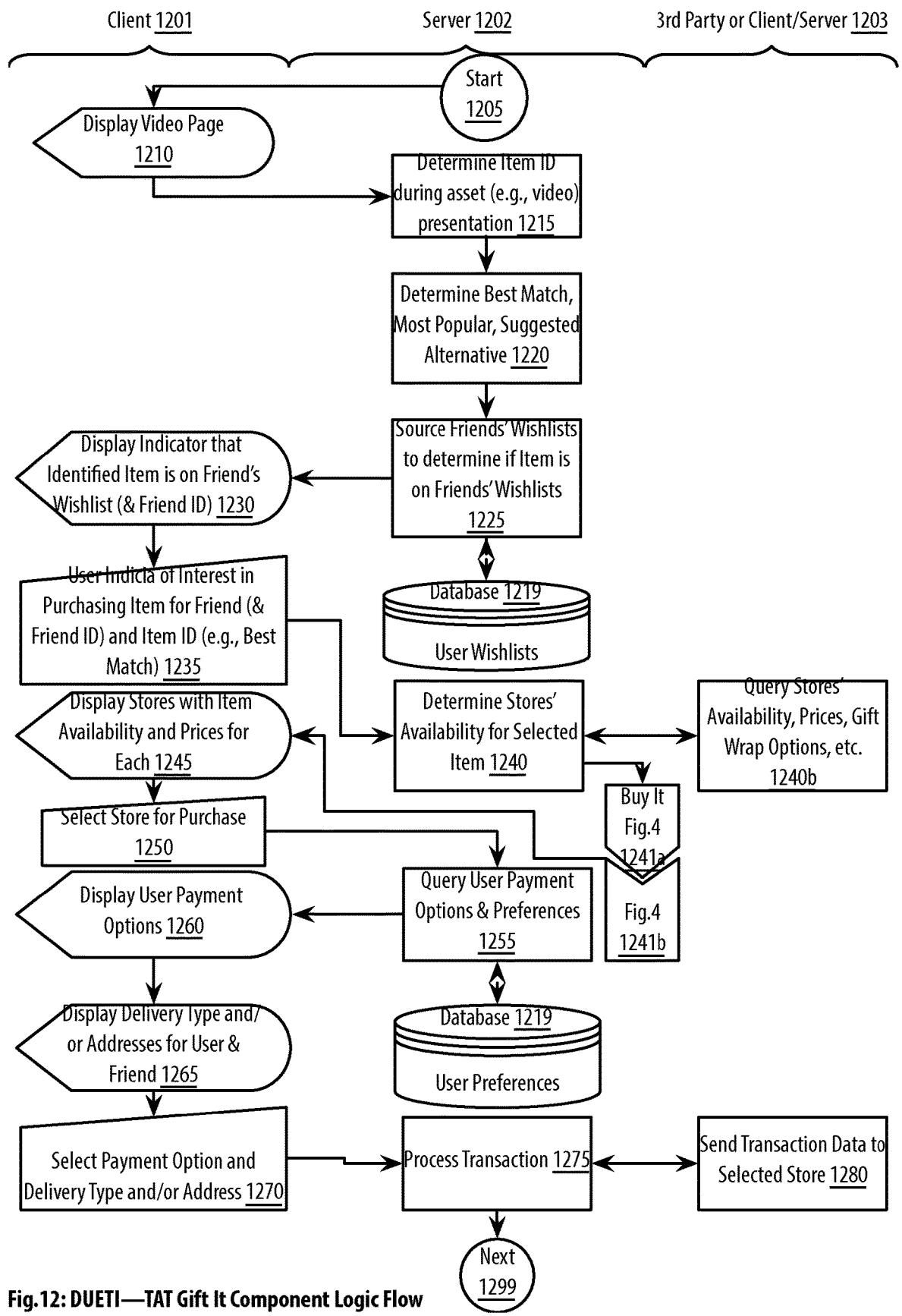
Fig.12: DUETI—TAT Gift It Component Logic Flow

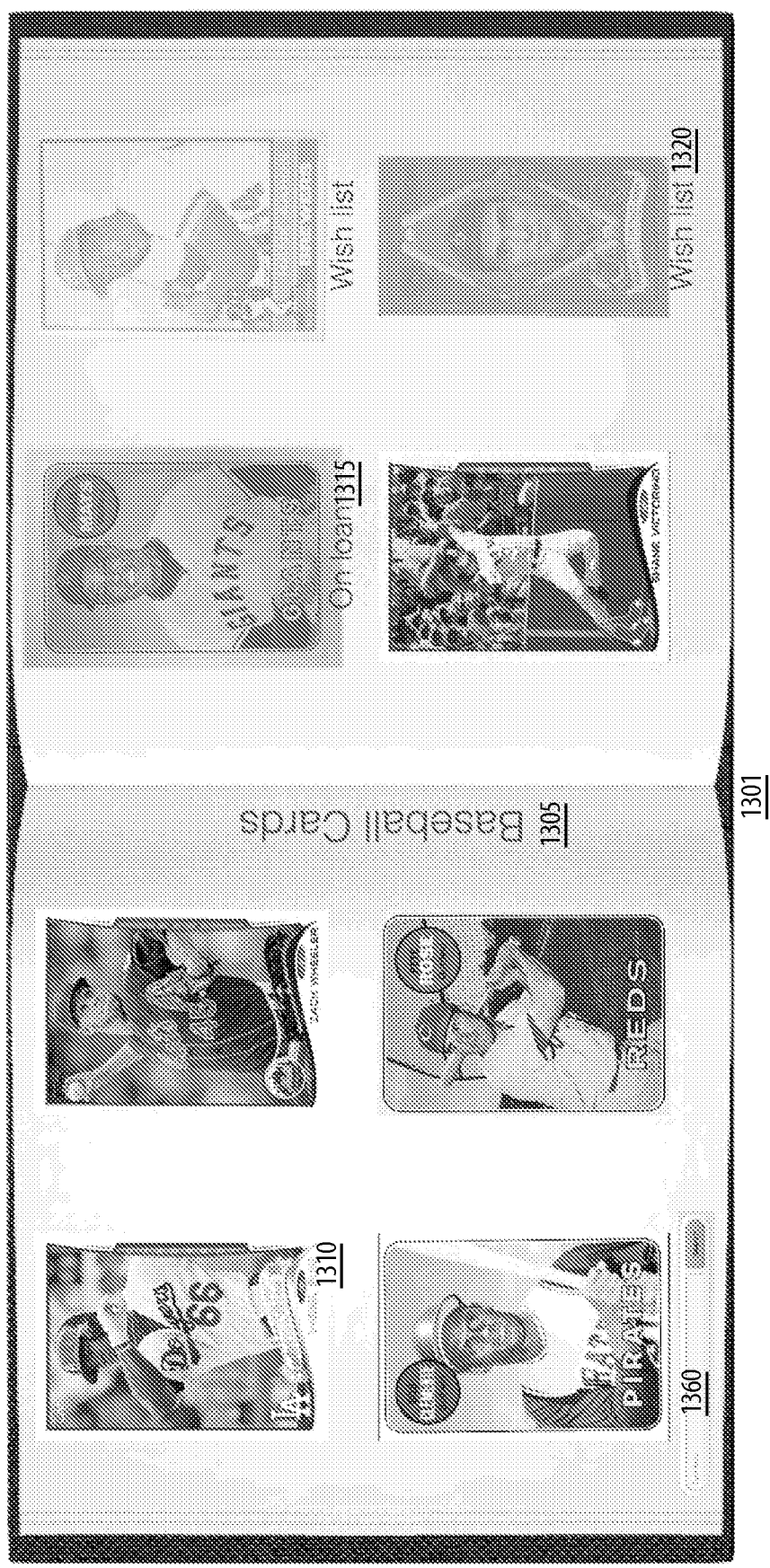
Fig.13A: DUETI—Exemplary DUETI Browser (Cards) UI

Fig.13B: DUETI—Exemplary DUETI Browser (Cards) UI

Fig.14A: DUETI—Exemplary DUETI Browser (Auto) UI

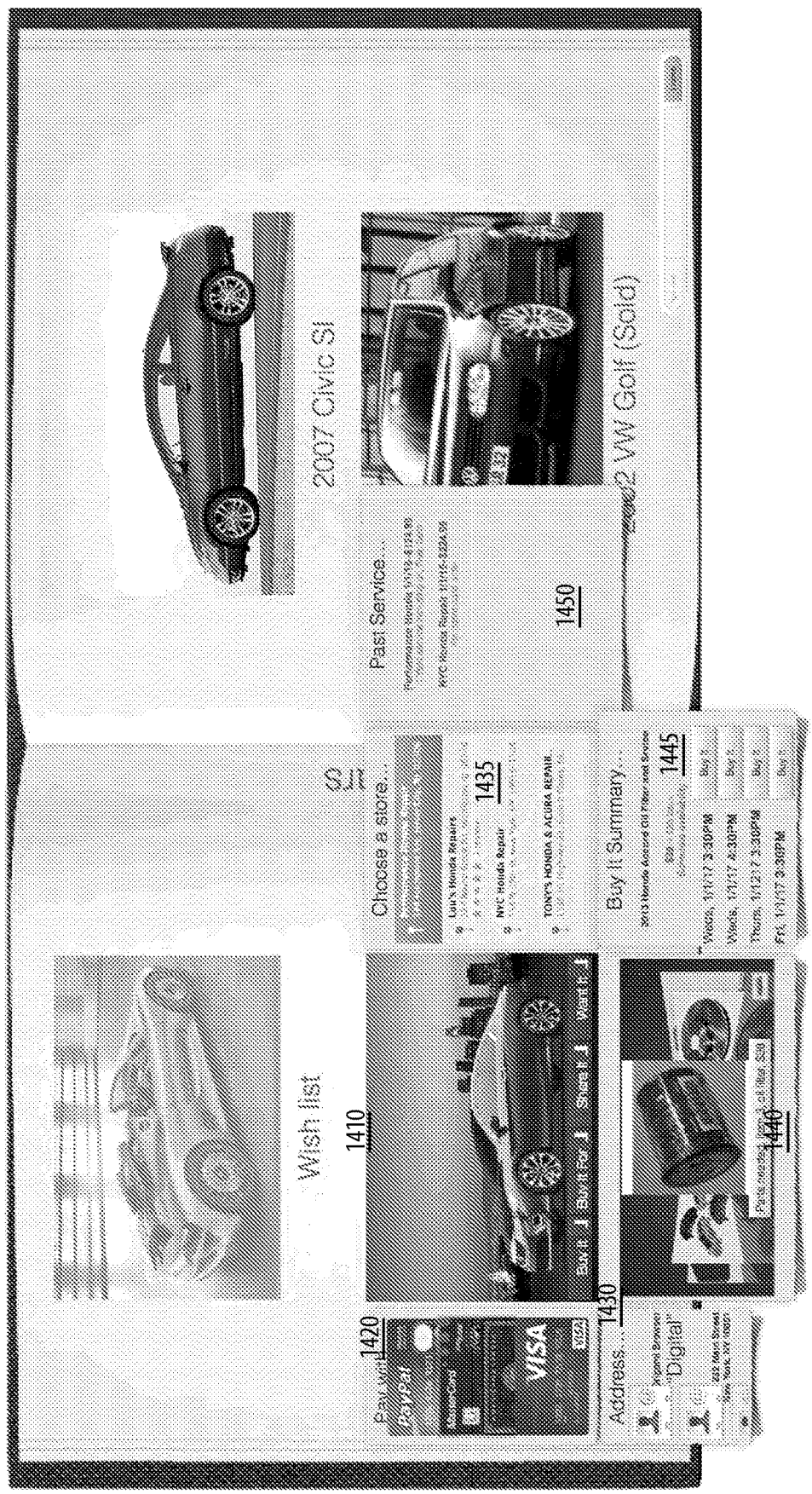
Fig.14B: DUETI—Exemplary DUETI Browser (Auto) UI

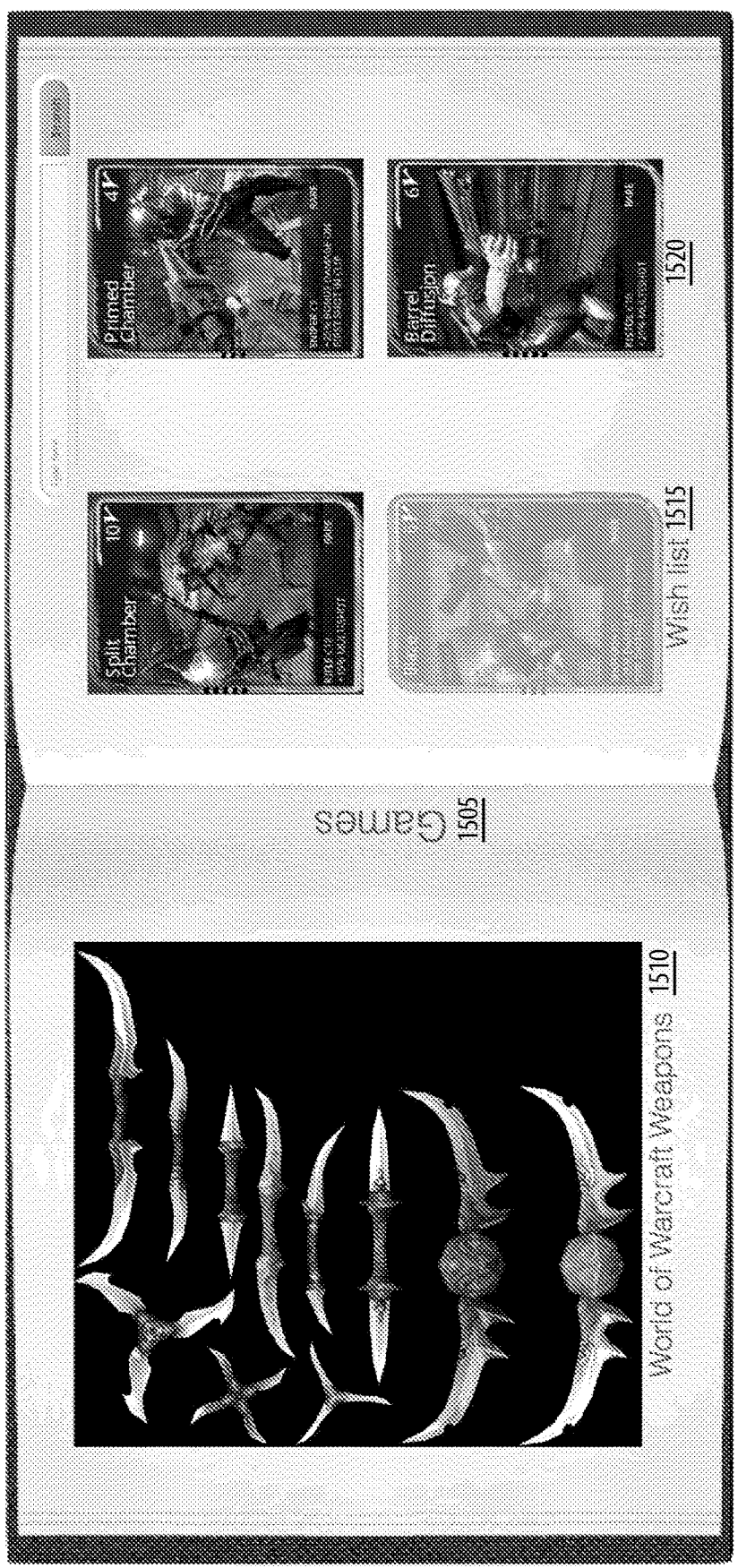
Fig.15: DUETI—Exemplary DUETI Browser (Digital Goods) UI

Fig.16: DUETI—Exemplary DUETI Browser (Free Search, Video View and Ticket Order) UI

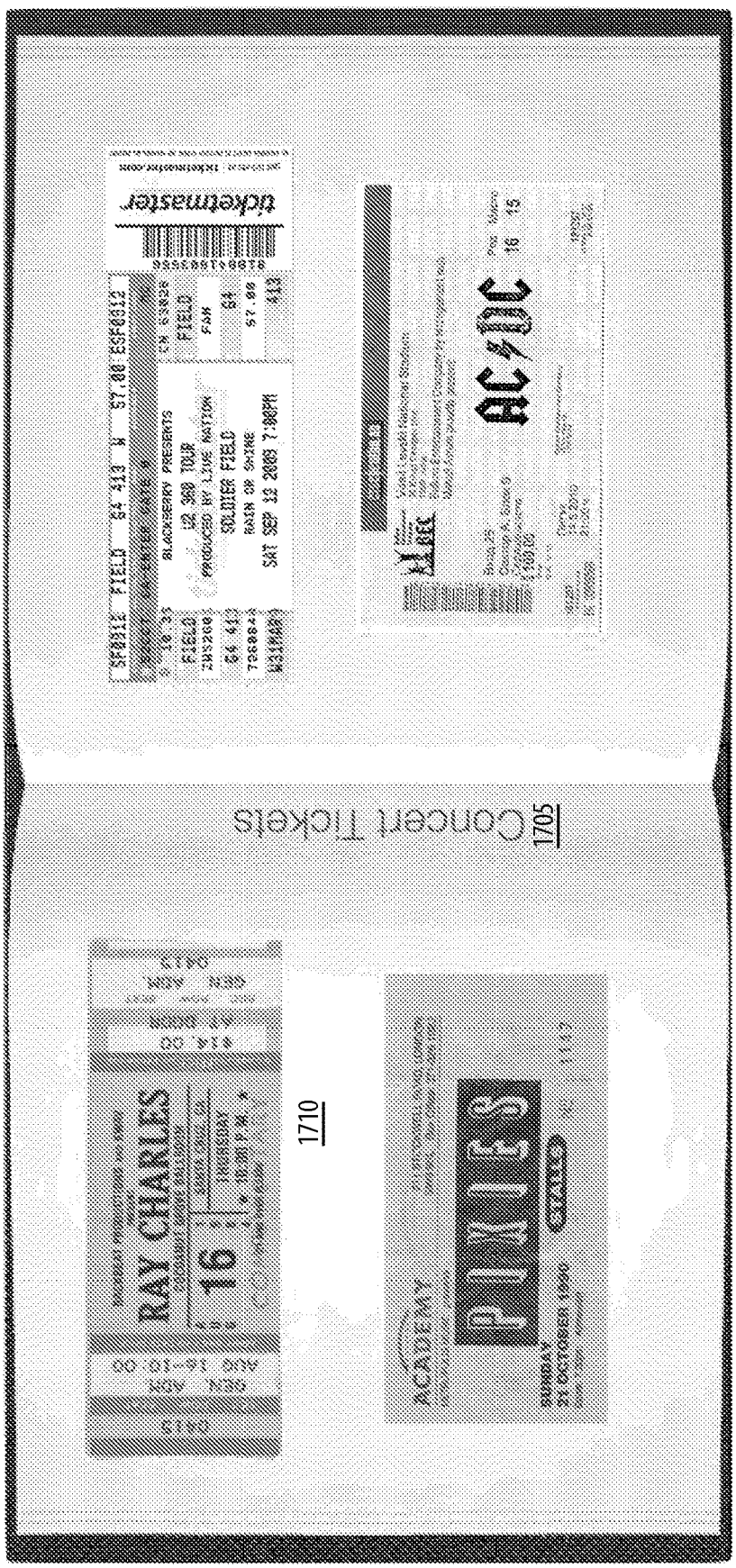
Fig. 17: DUETI—Exemplary DUETI Browser (Tickets) UI

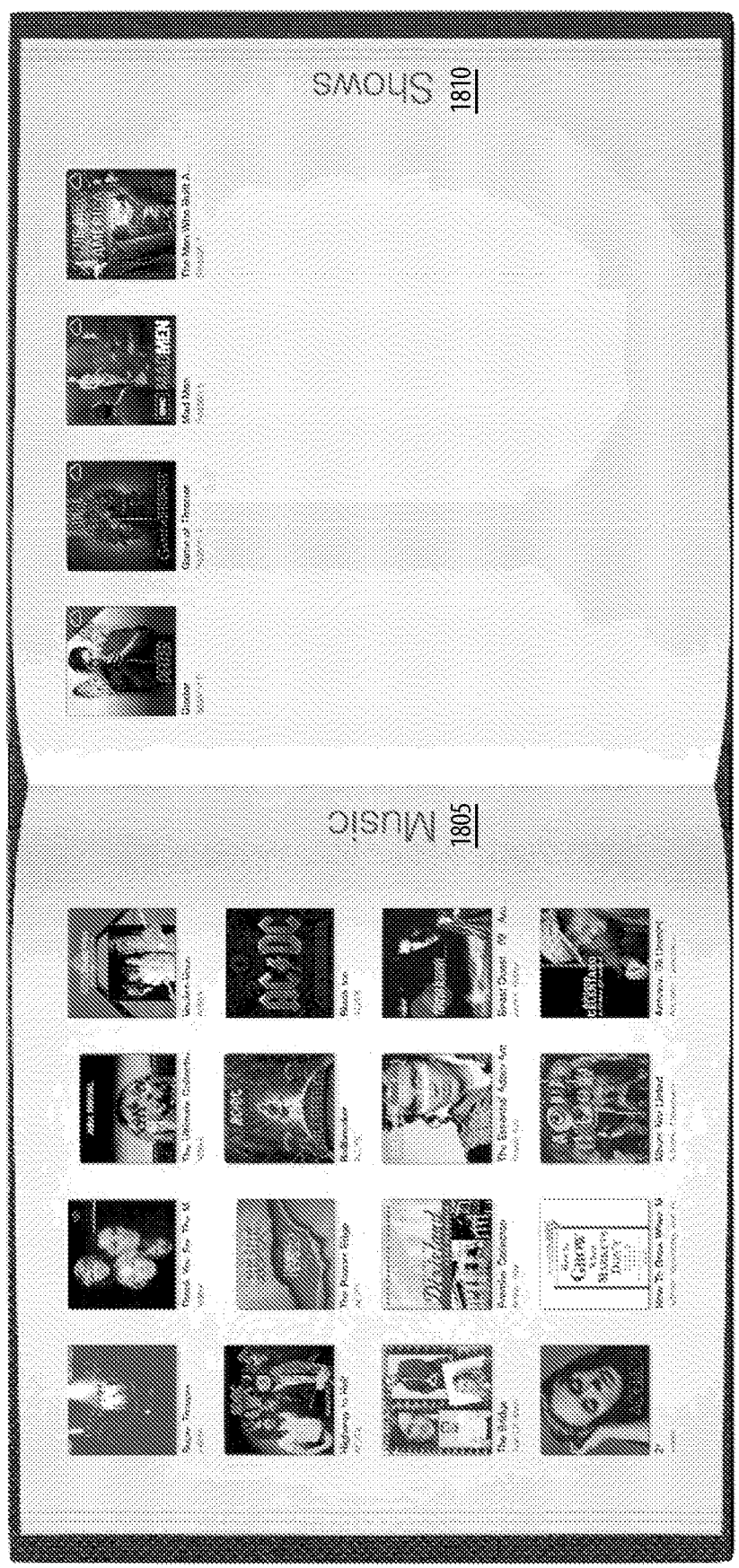
Fig.18: DUETI—Exemplary DUETI Browser (Music & TV) UI

Fig. 19: DUETI—Exemplary DUETI Browser (Transaction History) UI

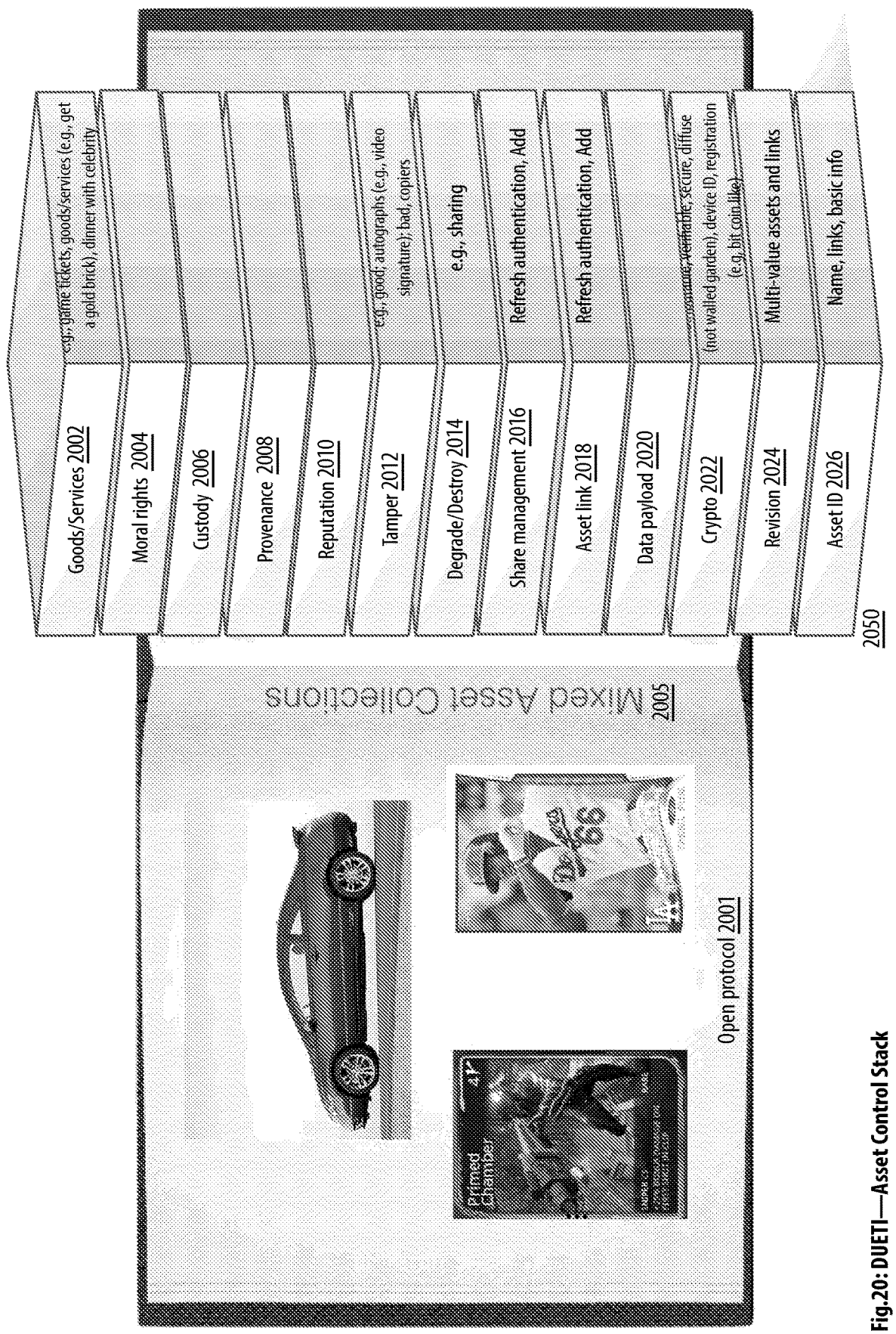
Fig.20: DUETI—Asset Control Stack

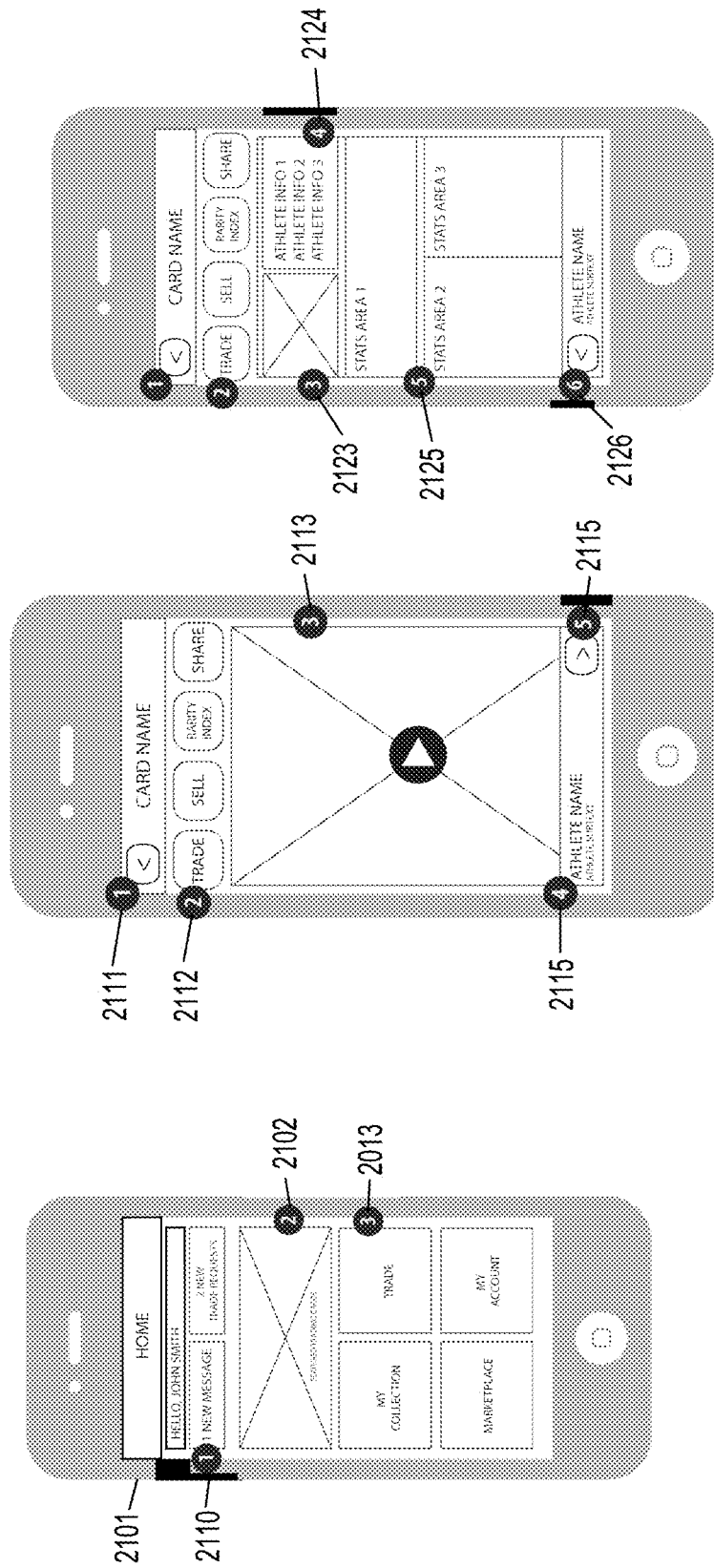
Fig. 21A: DUETI—Cards

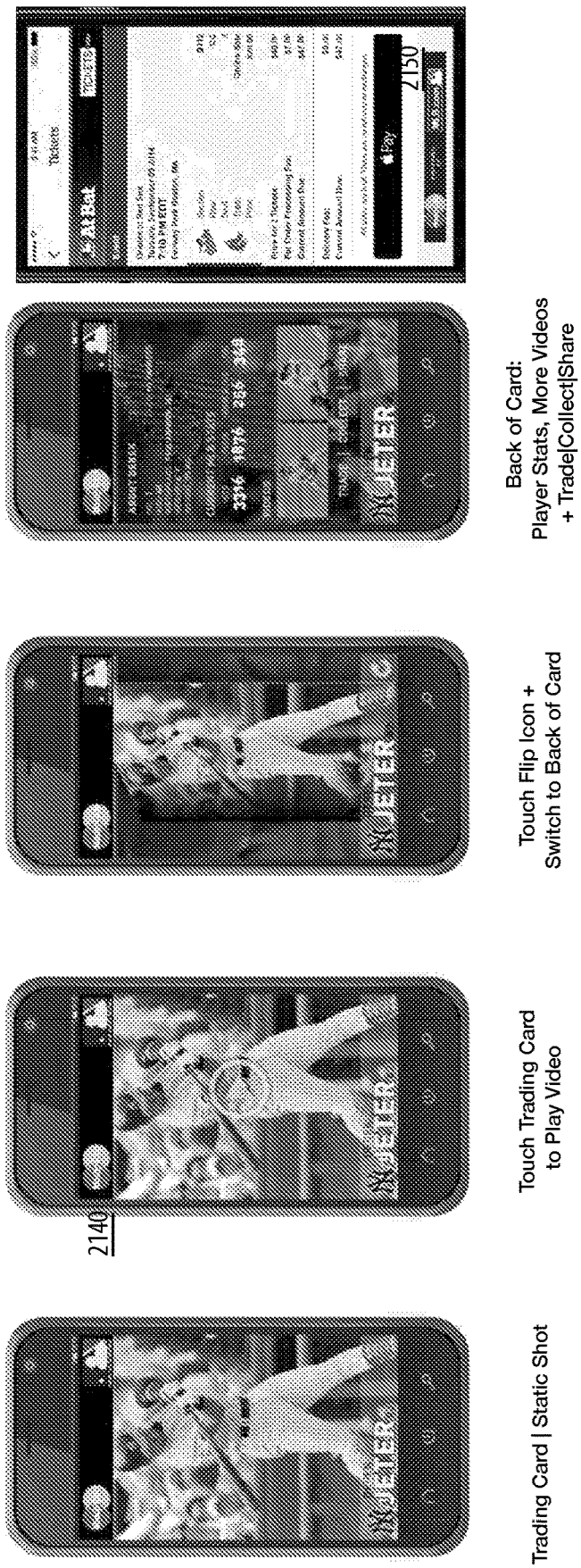
Fig.21B: DUETI—Cards

Fig.21C: DUETI—Cards

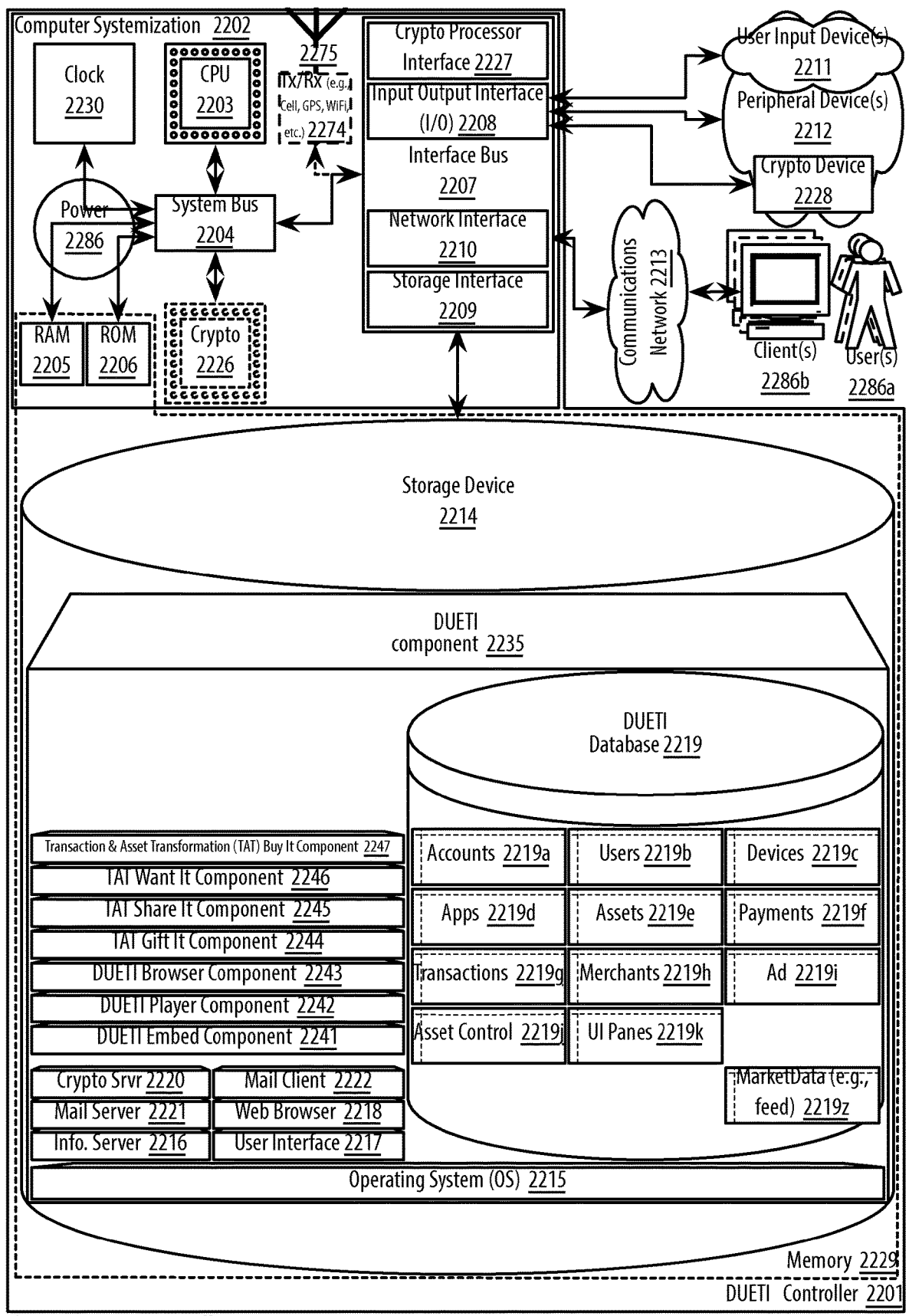
Fig.22: DUETI—Controller

US 10,595,100 B2

DISTRIBUTED, UNFOLDING, EMBEDDED TRANSACTION AND INVENTORY APPARATUSES, METHODS AND SYSTEMS

PRIORITY CLAIM

Applicant hereby claims benefit to priority under 35 USC 5119 as a non-provisional conversion of: U.S. provisional patent application Ser. No. 62/029,561, filed Jul. 27, 2014, entitled "Distributed, Unfolding, Embedded Transaction and Inventory Apparatuses, Methods and Systems,"; U.S. provisional patent application Ser. No. 62/011,149, filed Jun. 12, 2014, entitled "Distributed, Unfolding, Embedded Transaction and Inventory Apparatuses, Methods and Systems,"; U.S. provisional patent application Ser. No. 61/941,336, filed Feb. 18, 2014, entitled "VIDEO ADVERTISING PLATFORM APPARATUSES, METHODS AND SYSTEMS,"; and of U.S. provisional patent application Ser. No. 61/878,569, filed Sep. 16, 2013, entitled "VIDEO ADVERTISING PLATFORM APPARATUSES, METHODS AND SYSTEMS,".

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address digital asset, management, inventory and electronic purchasing systems, and more particularly, include Distributed, Unfolding, Embedded Transaction and Inventory Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

People purchase things online on the Internet by visiting a website, like Amazon.Com®, searching for their items, and selecting things they wish to purchase. Also, such websites and advertising networks may advertise over the internet working with websites to have banner ads placed at participating websites. Other websites on the Internet, like YouTube.Com®, allow users to watch uploaded videos. These videos often have banner ads overlays. More conventionally, consumers have long enjoyed baseball and other collectable cards. Consumers would purchase such cards and often trade and/or sell the cards with one another. Such physical cards may be purchased on websites such as Ebay.Com®.

BRIEF DESCRIPTION OF THE DRAWINGS

Appendices and/or drawings illustrating various, non-limiting, example, innovative aspects of the Distributed, Unfolding, Embedded Transaction and Inventory Apparatuses, Methods and Systems (hereinafter "DUETI") disclosure, include:

FIGS. 1a-1c show a screen shot diagrams illustrating user interface embodiments of the DUETI;

FIGS. 2a-2b show a datagraph diagram illustrating embodiments of a the DUETI;

FIG. 3 shows a screen shot diagram illustrating Buy It user interface embodiments of the DUETI;

FIG. 4 shows a logic flow diagram illustrating Transaction & Asset Transformer (TAT) Buy It component embodiments of the DUETI;

FIG. 5 shows a screen shot diagram illustrating Want It user interface embodiments of the DUETI;

FIG. 6 shows a logic flow diagram illustrating TAT Want It component embodiments of the DUETI;

FIG. 7 shows a screen shot diagram illustrating Share It user interface embodiments of the DUETI;

FIG. 8 shows a logic flow diagram illustrating TAT Share It component embodiments of the DUETI;

FIG. 9 shows a screen shot diagram illustrating Share It user interface embodiments of the DUETI;

FIG. 10 shows a logic flow diagram illustrating TAT Share It component embodiments of the DUETI;

FIG. 11 shows a screen shot diagram illustrating Gift It user interface embodiments of the DUETI;

FIG. 12 shows a logic flow diagram illustrating TAT Share It component embodiments of the DUETI;

FIGS. 13a-20 show a screenshot diagrams illustrating embodiments of an asset collection browser for the DUETI;

FIGS. 21a-21c show a screenshot diagrams illustrating embodiments of digital cards for the DUETI; and FIG. 22 shows a block diagram illustrating embodiments of a DUETI controller.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Distributed, Unfolding, Embedded Transaction and Inventory Apparatuses, Methods and Systems (hereinafter "DUETI") transforms site traversal, site request, embed data request, purchase request inputs, via DUETI components (e.g., embed 2241, player 2242, asset collection browser 2243, TAT Gift It 2244, TAT Share It 2245, TAT Want It 2246, TAT Buy It 2247 of FIG. 22, etc.), into contextual activity payload, digital/media/actual asset procurement outputs. DUETI is a distributed transaction and transformer mechanism. DUETI, in one embodiment, provides a cloud based, distributable, site agnostic purchasing account, and in essence, may act as a commerce enabling media distribution platform. DUETI may provide distributed: advertising, asset browsing, electronic transactions, social sharing and gifting, etc., all disjoined from any one server/site/source. As such, the DUETI may operate with native (e.g., paid) media assets wherever they exist and unfurl around such asset to bring a user the ability to operate on and with the asset wherever it may reside. The DUETI components, in various embodiments, implement advantageous features as set forth below.

DUETI

FIGS. 1a-1c show a screen shot diagrams illustrating user interface embodiments of the DUETI. In this example, a user may be traversing a website (e.g., Youtube® videos) with their web browser 101. Moving to FIG. 1b, when a user moves their cursor 106 over a DUETI engageable asset 164 (e.g., in this example, a video), DUETI obtains information about the asset and provides them to the DUETI server so that it may return a contextually relevant user interface (UI) and various engageable context relevant UI mechanisms. For example, the DUETI may be hooked into digital assets through a custom DUETI media player, an iframe region, an API within the asset allowing for UI overlays (e.g., the Youtube overlay UI API when initiated via a method like "Call-To-Action Overlay," etc.), as shall be discussed in greater detail throughout the disclosure.

In one embodiment, this may initially begin with a set of menus 102-105 (e.g., Buy It 102, Gift It 103, Share It 104, Want It 105, etc.) materializing as an overlay atop the asset. In one alternative embodiment these menu options may be static and preloaded without obtaining a context from the DUETI server. It should be noted that a number of additional/alternative menu item/activities may be added. In one embodiment, a Bet It menu option may materials, allowing a user to bet on a live stream of a sporting event, for example.

The user may then interact with this initial menu set by engaging with them (e.g., via cursor, touch, voice, and other UI conventions). For example, although the initial menu set may be provided as engageable button UI widgets, they may alternatively be provided as bifurcated buttons with an engageable drop down menu portion 166. When engaging the drop down, additional options may be selected 107-109. When engaging the menu buttons 102-105, various UI pane mechanisms may unfurl, much like origami, outward from the digital asset providing the user with various UI mechanisms to interact with the mechanism.

For example, if the user engages the Buy It button 102, a pane allowing a user to select a merchant may unfurl 110 providing the user with merchant options allowing them to purchase the asset, or alternative assets related to the currently engaged (e.g., Youtube) digital asset. In one embodiment, the user may select a desired merchant 111, and release the unfurling of another pane. In this example, a product browser and selection pane UI may unfurl below 167 the original media asset 164. In this example, a number of products offered by the merchant 111 are displayed in the product selection pane, which may be flipped through (e.g., via touch swiping, mouse scrolling, etc.) and selected for interaction 112. Once selected 112, another DUETI pane may unfurl allowing the selection of a payment method by the user 114. Similarly, another pane may unfurl allowing for the selection of a delivery address 115. Lastly, a confirmation summary and purchase engagement pane may unfurl 116 showing the details of the item to be purchased, which may be engaged with a Buy It button 117. In some embodiments, any of these panes may display merchant web pages, sub web pages, iframes, etc. designed to facilitate such functions may be presented as the interface. Additional panes showing social network interaction panes 163 may unfurl in context, e.g., when a Share It button 104 is engaged (e.g., showing a drop down of various social networks that the asset may be shared through). Similarly a wish list pane 118 may unfurl when the Want It button 105 is engaged, showing the user's current list of wished for items. Additionally, the user may use the Want It drop down 166 to add the media asset 164 and/or any of the purchase options 112, 113 to a DUETI browser scrap book (e.g., into the video 107, Car 108, music 109, etc. sections of the DUETI browser—more detail regarding the DUETI browser may be see in FIGS. 13-20). Gifting options, similarly, may be engaged via Gift It button 103 (e.g., or in context of a social dialogue 130) and may bring up similar options to the Buy It derived UI panes.

DUETI is distributable on demand to any digital asset, and is triggerable on any $3^{rd}$ party server. For example, FIG. 1c shows DUETI Buy It panes unfurling around a banner advertisement 160 displayed on a website within a web browser 101. It should be noted that DUETI is not limited to web deployment, but may also be engaged within applications, mobile apps, and any number of other environments. This distributed nature of DUETI in some sense may turn electronic commerce on its head, in some sense "bringing the mountain to Mohamad," by bringing a consistent purchasing environment, accounts, social accounts, security, UI conventions, etc. to whatever site or digital environment the user may be engaging.

FIGS. 2a-2b show a datagraph diagram illustrating embodiments of a the DUETI. In one embodiment, DUETI server 299 may provide embed code messages to a $3^{rd}$ party server 298 to enable media content for interaction with users of the DUETI system. In some embodiments, a custom DUETI Player component and links thereto may be provided. The $3^{rd}$ party servers may span a number of various systems, including, for example, advertisement networks, video sites such as Youtube®, regular websites, commerce sites, and/or the like. By using a DUETI embed message, for their content, the DUETI user interface mechanisms may be employed around most any content. As such, some $3^{rd}$ party sites 298 may be preconfigured to work with DUETI.

An example embed code message request 200, substantially in the form of a HTTP(S) POST message including XML-formatted data, is provided below:

```
imagetype.xmlOverlay=true
imagetype.xmlOverlayFile=filename.xml
# skin directory
dueti.skin.dir=./skins/...
#set relation of overlay.dir (def:true); true = skin root, false = other root
dueti.overlay.skinroot=true
# place of overlay xml files and overlay.properties:
deuti.overlay.dir=./resources/skin-name
# place of overlay xml resources (overlay images, default overlay
PNGs, etc.):
deuti.overlay.resources=.
<overlay>
    <layer>
        <name>ParamName1</name>
        <images>
<image value="true" filename="image1.png"/>
        </images>
    </layer>
    <layer after="true">
        <name>ParamName2/ParamName3</name>
        <left>-1</left>
        <top>23</top>
        <align>center</align>
        <valign>bottom</valign>
        <images>
<image name="ParamName2" value="true/true"
filename="image2.png"/>
<image name="ParamName2" value="true/false"
filename="image3.png"/>
<image name="ParamName2" value="false/true"
filename="image4.png"/>
<image name="ParamName3" value="true" filename="image5.png"/>
        </images>
        <positions>
<position value="true/true" align="right/left"/>
        </positions>
    </layer>
</overlay>
```

Details regarding the embed code message include:

- <layer> - each overlay layer (required)
    - after - indicates the time when the paint layer: before or after applying the basic overlay (optional, def: false).
- <name> - parameter name (one - required, more divided slash - optional)
    - set - true, false, number(if ImageType.logoSet=count)
    - TV - true, false
    - HD - true, false
    - subtitle, ST - true, false
    - watched - true, false
    - top250 - true, false
    - language - not use tag <images>
    - rating - 0, 10, 20, 30, 40, 50, 60, 70, 80, 90, 100 (or real number [0..100] if ImageType.rating=real)
    - videosource, source, VS - text value corresponding <videoSource>
    - videoout, out, VO - text value corresponding <videoOutput>
    - videocodec, vcodec, V? - text value corresponding <videoCodec>
    - audiocodec, acodec, A? - text value corresponding <audioCodec>
    - audiochannels, channels - text value corresponding <audioChannels>
    - container - text value corresponding <container>
    - aspect - text value corresponding <aspect>
    - fps - text value corresponding <fps>
    - certification - text value corresponding <certification>
    - keywords - text value in the movie filename
    - country - text value corresponding <country>
    - company - text value corresponding <company>
    - award - according to ImageType.award
        - ■ true - true/false
        - ■ block - award names
        - ■ count - number of awards won
- <left> - horizontal offset (optional, integer, def: 0)
- <top> - vertical offset (optional, integer, def: 0)
- <align> - horizontal align (optional, [left, center, right], def: left)
- <valign> - vertical align (optional, [top, center, bottom], def: top)
- <image> - image file (required)
    - name - parameter name (optional, def: first parameter)
    - value - parameter value corresponding his name (see tag <name>). may be use value "default" if no more matched (required)
    - filename - image filename (required)
- <position> - parameters of the mutual arrangement (optional)
    - value - parameter's value (required)
    - left - horizontal offsets (optional, def: from tag <left>)
    - top - vertical offsets (optional, def: from tag <top>)
    - align - horizontal aligns (optional, def: from tag <align>)
    - valign - vertical aligns (optional, def: from tag <valign>)
- <block> - each named block
    - <name> - parameter name
    - <dir> - true(vertical)/false(horizontal)
    - <size> - auto/static
    - <cols> - auto/<number>
    - <rows> - auto/<number>
    - <hmargin> - <number>

<vmargin> - <number>

Properties that may adjust/activate/disable (e.g., default) the images and video types in overlays may include ImageType, which can be any of "posters", "banners", "thumbnails" or "videoimages," etc. For additional/next options/default value(s) may be false, or set to true to active such features as:

ImageType.xmlOverlay
ImageType.logoSet
ImageType.logoSubTitle
ImageType.language
ImageType.rating
ImageType.videosource
ImageType.videoout
ImageType.videocodec
ImageType.audiocodec
ImageType.audiochannels
ImageType.container
ImageType.aspect
ImageType.fps
ImageType.certification -continued ImageType.watched
ImageType.top250
ImageType.keywords
ImageType.country
ImageType.company
ImageType.location
ImageType.TimeStamp
ImageType.tour
etc.

An example of a POST message is below:

```
<?xml version="1.0"?>
<result>
<mediaid>[MediaID]</mediaid>
    <source>[SourceFile]</source>
    <status>[MediaStatus]</status>
    <description>[ ErrorDescription]</description> <!-- Only
in case of Status = Error -->
```

-continued

```
<format>
    <DUETI>[OutputFormat]</DUETI> <!-- DUETI video
    compositon -->
    <destination>[URL]</destination> <!-- Only in case
    of Status = Finished -->
    <destination_status>[Saved|Error
    (ErrorDescription)]</destination_status>
    <destination>[URL_2]</destination>
    <destination_status>[Saved|Error
    (ErrorDescription)]</destination_status>
        <!-- ... -->
    <destination>[URL_N]</destination>
    <destination_status>[Saved|Error
    (ErrorDescription)]</destination_status>
    <
    status>[TaskStatus]</status>
    <description>[ErrorDescription]</description> <!--
    Only in case of Status = Error -->
    <suggestion>[ErrorSuggestion]</suggestion> <!--
    Only in case of Status = Error -->
</format>
</result>
```

As such, a user 286*a* may traverse 201 a site and or service of a 3$^{rd}$ party server 298 using any number of client devices 286*b* such as a computer 286*d*, set-top box, and/or mobile device 286*c* such as a mobile phone or tablet. Upon visiting the site, the device may make a site request 202 of the 3$^{rd}$ party server 298, which can then furnish a 3$^{rd}$ party site payload with the DUETI embedded media 203 (e.g., a web page having the embed code message(s) within).

Once received at the client 286, a player component may be instantiated with in, for example, the users web browser, which will render the requested site much as a normal site request 204*a* (e.g., rendering web site web pages 204*b*, 204*c*). There, should the user interact with a media asset (e.g., an image, a video, etc.) that is encapsulated by DUETI embed code, it may trigger the player component 204*a* to make an embed data request call 205 to the DUETI server 299. In so doing, the player component may extract metadata from the media asset (e.g., keywords, product identifier, titles, etc.) and use that as part of the embed data request 205 so as to obtain contextually relevant information for the DUETI UI.

An example embed code message request 200, substantially in the form of a HTTP(S) POST message including XML-formatted data, is provided below, each for iOS, Android, and desktop clients:

```
POST /authrequest.php HTTP/1.1
Host: www.server.com
Content-Type: Application/XML
Content-Length: 667
<?XML version = "1.0" encoding = "UTF-8"?>
<embed_data_request>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>DUETI_Component.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <context_query_details>
        <asset_name>McLaren MP4-12C - Top Gear - BBC</product_name>
        <asset_type>Youtube Video</asset_type>
```

```
            <asset_ID>BCPZSaHyZGQ</asset_ID>
            <keywords>McLaren, supercar, MP4-12C, Top Gear, Ferrari, orange,
BBC</keywords>
            <merchant_ID>None Specified</merchant_ID>
            <advertiser_ID>AdSenseID12345</advertiser_ID>
            <product_name>None Specified</product_name>
            <manufacturer_ID> None Specified</manufacturer_ID>
        </context_query_details>
</embed_data_request>
POST /authrequest.php HTTP/1.1
Host: www.server.com
Content-Type: Application/XML
Content-Length: 667
<?XML version = "1.0" encoding = "UTF-8"?>
<embed_data_request>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //Android Client with Webbrowser
        <client_IP>10.0.0.123</client_IP>
        <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <context_query_details>
        <asset_name>McLaren MP4-12C - Top Gear - BBC</product_name>
        <asset_type>Youtube Video</asset_type>
        <asset_ID>BCPZSaHyZGQ</asset_ID>
        <keywords>McLaren, supercar, MP4-12C, Top Gear, Ferrari, orange,
BBC</keywords>
        <merchant_ID>None Specified</merchant_ID>
        <advertiser_ID>AdSenseID12345</advertiser_ID>
        <product_name>None Specified</product_name>
        <manufacturer_ID> None Specified</manufacturer_ID>
    </context_query_details>
</embed_data_request>
POST /authrequest.php HTTP/1.1
Host: www.server.com
Content-Type: Application/XML
Content-Length: 667
<?XML version = "1.0" encoding = "UTF-8"?>
<embed_data_request>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
```

```
        <client_app_type>web browser</client_app_type>
        <client_name>Mobile Safari</client_name>
        <client_version>537.75.14</client_version>
    </client_details>
    <context_query_details>
        <asset_name>McLaren MP4-12C - Top Gear - BBC</product_name>
        <asset_type>Youtube Video</asset_type>
        <asset_ID>BCPZSaHyZGQ</asset_ID>
        <keywords>McLaren, supercar, MP4-12C, Top Gear, Ferrari, orange,
BBC</keywords>
        <merchant_ID>None Specified</merchant_ID>
        <advertiser_ID>AdSenseID12345</advertiser_ID>
        <product_name>None Specified</product_name>
        <manufacturer_ID> None Specified</manufacturer_ID>
    </context_query_details>
</embed_data_request>
```

Upon obtaining the embed data request 205, the DUETI server 299 may employ the asset composite component 206a to use the request's 205 context query details to determine a proper DUETI UI pane In one implementation, after receiving the new information request 205 the DUETI server may parse the message, and retrieve the user and/or UI panes appropriate for the context data query 206b from records from the one or more databases and/or tables (e.g., DUETI user account tables and UI tables see 2219 of FIG. 22) and obtain data for and/or UI widgets back for compositing 206c via UI Context data response. An example, substantially in PHP/SQL format, for querying a database for user contextual UI panes is below:

```
<?PHP
header('Content-Type: text/plain');
mysql_connect("254.93.179.112",$DBserver,$password); // access
database server
mysql_select_db("DUETI_UI.SQL"); // select database table
to search
$query = "SELECT user_id, menu_id, merchant_id, pane_id,
device_type,
application_type FROM UI_PaneTemplate WHERE UI_Pane_type
LIKE '%'
$userpanetype";
$result = mysql_query($query); // perform the search query
mysql_close("DUETI_UI.SQL"); // close database access
?>
```

With this, the DUETI server 299 and its asset composite component 206a may determine the proper payload to accompany the embed code and media component that is particular to the user. So for example, the correct user ID and initial menus (e.g., Buy It, Share It, etc.) may be composited from the resulting embed data response 207 that is provided to the user's client device 286 and the DUETI player component therein 208. The player component may then composite these results for display of the resulting site request (e.g., website 204b, 204c) as output for user display (e.g., via web browser page display, DUETI player display, etc) 209a. In one embodiment, the embed data response 207 may be a standard web page from a 3rd party website including embed codes to make UI and component requests of the DUETI server, and incorporate specific UI and user identifiers obtained from the asset composite component 206a. An example embed data response 207, substantially in the form of a HTML/Javascript format, is provided below:

```
!DOCTYPE html>
<html>
    <body>
        <!-- 1. The <iframe> (and video player) will replace this <div>
        tag. -->
        <div id="player"></div>
        <script>
            // 2. This code loads the IFrame Player API code asynchronously.
            var tag = document.createElement('script');
            tag.src = "https://www.youtube.com/iframe_api";
            var firstScriptTag =
            document.getElementsByTagName('script')[0];
            firstScriptTag.parentNode.insertBefore(tag, firstScriptTag);
            // 3. This function creates an <iframe> (and YouTube player)
            //    after the API code downloads.
            var player;
            function onYouTubeIframeAPIReady( ) {
                player = new YT.Player('player', {
                    height: '390',
                    width: '640',
                    videoId: 'M7lc1UVf-VE',
                    events: {
                        'onReady': onPlayerReady,
                        'onStateChange': onPlayerStateChange
                    }
                });
            }
            // 4. The API will call this function when the video player is ready.
            function onPlayerReady(event) {
                event.target.playVideo( );
            }
            // 5. The API calls this function when the player's state changes.
            //    The function indicates that when playing a video
            //    (state=1), the player should play for six seconds and
            then stop.
            var done = false;
            function onPlayerStateChange(event) {
                if (event.data == YT.PlayerState.PLAYING && !done) {
                    setTimeout(stopVideo, 6000);
                    done = true;
                }
            }
            function stopVideo( ) {
                player.stopVideo( );
            }
            // 6. This will call and confirm the DUETI when the video is ready
            function onDuetiReady(event) {
                event.target.callUID( );
            }
        </script>
    </body>
</html>
```

Moving to FIG. 2b, we see additional detail regarding display of the DUETI UI and player component. With the embed data response payload 207 received at the client 286 for display 209 in FIG. 2a, we now see that the DUETI player component 209b can load the embedded payload (e.g., the received embed data response payload 207) and instantiate the player component in its environment (e.g., in a native DUETI player component app, as a DUETI player component within a web browser, and/or the like), allowing it to update the environment display with DUETI UI components (e.g., UI panes) for display 209c. Once instantiated 209b, the user 286a may then interact with the requested site as per usual (e.g., touching the UI, moving the cursor, scrolling, searching, GPS positioning, etc.) and those manual interactions may be input to the client 210. The DUETI player component monitors such input activity and generates a media asset target activity log and determines an action to effectuate (e.g., Buy It, Want It, Gift It, Share It menu interactions) 211. Once a DUETI activity is engaged, the Player Component may send an activity resolver call with an accompanying activity log as a message 212 to the DUETI server 299. An example embed activity resolver call message 212, substantially in the form of a HTTP(S) POST message including XML-formatted data, is provided below, each for iOS, Android, and desktop clients:

```
POST /authrequest.php HTTP/1.1
Host: www.server.com
Content-Type: Application/XML
Content-Length: 667
<?XML version = "1.0" encoding = "UTF-8"?>
<activity_resolver_call>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>DUETI_Component.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <activity_log>
        <hover_1>
            <time_stamp>12:34:56</time_stamp>
            <duration>00:00:03.2</duration>
            <asset_ID>BCPZSaHyZGQ</asset_ID>
            <coordiantes>123,234</coordinates>
        </hover_1>
        <hover_2>
            <time_stamp>12:35:56</time_stamp>
            <duration>00:00:06.2</duration>
            <asset_ID>adSense_link_ID_235</asset_ID>
            <coordiantes>222,134</coordinates>
        </hover_2>
        <click_1>
            <time_stamp>12:36:06</time_stamp>
            <asset_ID>Play_Button_ID_123</asset_ID>
            <coordiantes>72,434</coordinates>
        </click_1>
        <click_2>
```

```
                <time_stamp>12:37:08</time_stamp>
                <asset_ID>BuyIt_Button1</asset_ID>
                <coordiantes>72,334</coordinates>
            </click_2>
        </activity_log>
        <mediaasset_details>
            <asset_name>McLaren MP4-12C - Top Gear - BBC</product_name>
            <asset_type>Youtube Video</asset_type>
            <asset_ID>BCPZSaHyZGQ</asset_ID>
            <keywords>McLaren, supercar, MP4-12C, Top Gear, Ferrari, orange, BBC</keywords>
            <merchant_ID>None Specified</merchant_ID>
            <advertiser_ID>AdSenseID12345</advertiser_ID>
            <product_name>None Specified</product_name>
            <manufacturer_ID> None Specified</manufacturer_ID>
        </media_asset_details>
</activity_resolver_call>
POST /authrequest.php HTTP/1.1
Host: www.server.com
Content-Type: Application/XML
Content-Length: 667
<?XML version = "1.0" encoding = "UTF-8"?>
<activity_resolver_call>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //Android Client with Webbrowser
        <client_IP>10.0.0.123</client_IP>
        <user_agent_string>Mozilla/5.0 (Linux; U; Android 4.0.4; en-us; Nexus S Build/IMM76D) AppleWebKit/534.30 (KHTML, like Gecko) Version/4.0 Mobile Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <activity_log>
        <hover_1>
            <time_stamp>12:34:56</time_stamp>
            <duration>00:00:03.2</duration>
            <asset_ID>BCPZSaHyZGQ</asset_ID>
            <coordiantes>123,234</coordinates>
        </hover_1>
        <hover_2>
            <time_stamp>12:35:56</time_stamp>
            <duration>00:00:06.2</duration>
            <asset_ID>adSense_link_ID_235</asset_ID>
            <coordiantes>222,134</coordinates>
        </hover_2>
        <click_1>
            <time_stamp>12:36:06</time_stamp>
            <asset_ID>Play_Button_ID_123</asset_ID>
            <coordiantes>72,434</coordinates>
        </click_1>
        <click_2>
            <time_stamp>12:37:08</time_stamp>
            <asset_ID>BuyIt_Button1</asset_ID>
            <coordiantes>72,334</coordinates>
        </click_2>
    </activity_log>
    <mediaasset_details>
        <asset_name>McLaren MP4-12C - Top Gear - BBC</product_name>
        <asset_type>Youtube Video</asset_type>
        <asset_ID>BCPZSaHyZGQ</asset_ID>
        <keywords>McLaren, supercar, MP4-12C, Top Gear, Ferrari, orange,
```

-continued

```
BBC</keywords>
        <merchant_ID>None Specified</merchant_ID>
        <advertiser_ID>AdSenseID12345</advertiser_ID>
        <product_name>None Specified</product_name>
        <manufacturer_ID> None Specified</manufacturer_ID>
    </media_asset_details>
</activity_resolver_call>
POST /authrequest.php HTTP/1.1
Host: www.server.com
Content-Type: Application/XML
Content-Length: 667
<?XML version = "1.0" encoding = "UTF-8"?>
<activity_resolver_call>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <activity_log>
        <hover_1>
            <time_stamp>12:34:56</time_stamp>
            <duration>00:00:03.2</duration>
            <asset_ID>BCPZSaHyZGQ</asset_ID>
            <coordiantes>123,234</coordinates>
        </hover_1>
        <hover_2>
            <time_stamp>12:35:56</time_stamp>
            <duration>00:00:06.2</duration>
            <asset_ID>adSense_link_ID_235</asset_ID>
            <coordiantes>222,134</coordinates>
        </hover_2>
        <click_1>
            <time_stamp>12:36:06</time_stamp>
            <asset_ID>Play_Button_ID_123</asset_ID>
            <coordiantes>72,434</coordinates>
        </click_1>
        <click_2>
            <time_stamp>12:37:08</time_stamp>
            <asset_ID>BuyIt_Button1</asset_ID>
            <coordiantes>72,334</coordinates>
        </click_2>
    </activity_log>
    <mediaasset_details>
        <asset_name>McLaren MP4-12C - Top Gear - BBC</product_name>
        <asset_type>Youtube Video</asset_type>
        <asset_ID>BCPZSaHyZGQ</asset_ID>
        <keywords>McLaren, supercar, MP4-12C, Top Gear, Ferrari, orange,
BBC</keywords>
        <merchant_ID>None Specified</merchant_ID>
        <advertiser_ID>AdSenseID12345</advertiser_ID>
        <product_name>None Specified</product_name>
        <manufacturer_ID> None Specified</manufacturer_ID>
    </media_asset_details>
</activity_resolver_call>
```

The DUEITY server's 299 asset composite component 213a may take the call message 212 and determine and resolve the action by parsing the activity log 213a. In one embodiment, a log stream component may be included as javascript through the iframe embed code. An example, substantially in PHP/javascript format, for creating a log stream is below:

```
$app_key = 'DUETI_player';
$app_secret = 'DUETI_player_secret';
$app_id = 'DUETI_player_ID';
$pusher = new Pusher($app_key, $app_secret, $app_id);
$activity_type = 'activity';
$action_text = '(Activity type logged)';
$activity = new Activity($activity_type, $action_text);
$data = $activity->getMessage( );
$pusher->trigger('site-activity', $activity_type,
    $activity->getMessage( ));
```

For example, a user may have initially engaged a Buy It button, which would be resolve to load in Buy It context sensitive UI panes as has been discussed in FIG. 1. Or, the user may further interact with the such context sensitive UI panes, and engage with such panes; for example, a user may select a merchant 111 from the merchant selection pane 110 of FIG. 1, which may be logged and interpreted by the asset composite component 213a to require the loading of item/product selection pane 167 and appropriate merchant data to display within that pane 112, 113 of FIG. 1. This may result in an asset composite query 213b of the DUETI and/or $3^{rd}$ party databases 219 (similar to the UI Context Data Query already discussed 206b) and return of an asset composite response 213c. For example, the DUETI database 2019 may have access to the users social, commerce and banking redentials (e.g., by providing user IDs and passwords to DUETI) and as such, DUETI may spider those accounts and/or reach out dynamically as needed to retrieve information necessary for a particular DUETI UI component. So, if a user selects Buy It, DUETI may retrieve the user's banking information, and show user available payment forms unfurling in the payment selection pane 114 of FIG. 1b. Similarly, if a user selects a merchant (e.g., Amazon 111 of FIG. 1b), then queries may be made for the item/product pane UI 167 of FIG. 1b to the DUETI database 219 and for Amazon products matching supplied media asset details by querying the DUETI database when it caches products from Amazon, or alternatively, querying the Amazon database directly. For example, keywords, product names, product identifiers, etc. may be searched by adding them into a URL query string via HTTP post, substantially as follows:

http://www.amazon.com/s/
ref=nb_sb_noss_1?url=search-alias%3Daps&fieldkey-words=KEYWORDS (e.g., "mclaren+mp4-12c")
or
http://www.amazon.com/PRODUCTNAME (e.g., "Scalextric-McLaren-MP4-12C-C3273-Green")/dp/PRODUCTID (e.g., "B006ZVJPA0")/ref=sr_1_1?ie=UTF8&qid=1410832056&s r=8-1

With the query response return 213c (e.g., in the form of a web page), the asset composite component 214 may generate a contextual activity payload 214. The payload may generate a new UI pane, and/or inset a composite response UI via an iframe inset. For example, a "Buy now with 1-Click" iframe may be obtained from a $3^{rd}$ party server (e.g., Amazon) and inset as the purchase mechanism 116, 117 of FIG. 1b. Alternatively, the DUETI may provide its own UI widgets/panes/constructs and relay actions (e.g., purchases) to merchants after obtaining the UI directives from the user. Once the composite payload is generated 214, it is provided back the client 286 where the player component 209b may once again update and instantiate the Player Component with the new payload information. Such iteration and interaction may continue until no more interactions are detected 216 and/or the player component is terminated.

Transaction and Asset Transformers

FIGS. 3-12 show various mechanisms (e.g., Buy It, Gift It, Share It, Want It, etc.) of the DUETI; showing both the UI and underlying transaction and asset transformation (TAT) component logic. These mechanisms work to transform the underlying assets into distributed points of commerce that act as keys to a multitude of commerce sites. In some embodiments, the TAT components may be part of the DUETI player component, which itself may be embedded as part of the DUETI browser component (examples of which may be seen in FIGS. 14-20) or embedded as a DUETI Embed component into other applications (e.g., as part of a web browser via embed code within a web page as has already been discussed).

Buy It

FIG. 3 shows a screen shot diagram illustrating Buy It user interface embodiments of the DUETI. Further to FIGS. 1a-1c, FIG. 3 shows additional configurations of the DUETI UI. It should be noted that the DUETI UI may unfurl as a series of UI panes 114, 110, 117, 167 about any type of digital/media asset 364. Although in FIG. 1b, the media asset was a video 164, the media asset may be in its own media pane (e.g., via iframe, a customized DUETI player, app, actual/native media object, etc.) and may be of any type of media type, such as, but not limited to: advertisement (e.g., banner ads (e.g., see FIG. 1c), inset graphics, inset text, media, etc.), audio, eBook, HTML, image, multimedia objects, PDFs, text, video, etc. In addition, the media pane 364 and/or its enclosing environment may include accompanying metadata, such as, but not limited to audio metadata, closed caption text, DRM, EXIF, keywords, product information (e.g., product identifier, vendor identifier, price, links, product image, etc.), title, vertical blanking interval data, text, etc. This metadata may be used by the DUETI client player component as a source of query terms to obtain relevant information for the DUETI UI components as has already been discussed in FIG. 2. In this UI screen shot, only the Buy It 102, Share It 104, and Want It 105 menus are layered atop the media asset 364, and her the user is shown engaging the Buy It 102 menu with the cursor. Although the merchant 110, buy it 117 and payment panes 114 appear similar to those seen earlier in FIG. 1a, here the UI presents additional options for devices 320, downloading 322, 3D printing 324 and notifications 318. By engaging the Devices 320 mechanism, the DUETI may display a list of authorized user devices. This may be useful when interoperating with the Download 322 mechanism. For example, if the user wishes to make a purchase of a digital purchase and download (e.g., music, video, games, apps, etc.), the user may authorize a series of devices by engaging checkboxes next to the devices on which they want the digital download to be authorized to work. Similarly, if a user wishes to purchase and/or otherwise obtain a digital 3D object for printing (e.g., an STL, OBJ, X3D, Collada, VRML97/2, etc.), and the user has authorized 3D device 320 listed, then the user may engaged the 3D Print 324 facility which can apply access control to the 3D object file and print a controlled and authorized number of 3D objects. It should be noted, that in one embodiment, the DUETI player component may also be configured to provide for registration and/or application for information, promotions, and documentation. In one example, this may be achieved when the DUETI player is engaged around an application form, and the address pane automatically may fill application form fields (e.g., the address, email, name, etc. credentials). For example, a user may use the auto application fill facility to apply for online promotions and information (e.g., signing up for upcoming product announcement notifications, for raffles, etc.). In some embodiments, the DUETI player may supply secure credentials (e.g., social security numbers) upon authorization prompts (e.g., password authorization) and be used to apply for and store official/government documents (e.g., drivers/operational licenses, registration, healthcare/medical records, social security card, titles, deeds, etc.) and upon successful completion, a digital version of the documentation may be provided for storage/use within a DUETI browser, thereby providing the user with pages of official documents for the DUETI browser (e.g., drivers/operational licenses, registration, healthcare/medical records, social security card, titles, deeds, etc.) (e.g., see FIG. 19 for examples). With regard to health data, in one embodiment, an athlete may complete a series of exercises specific to tennis, golf, football, etc., and the resulting telemetric data (e.g., pulse, oxygen, impact, speed, distance, etc.) could be stored in a DUETI held health record, and may be used to provide the athlete with yield video coaching results. In another embodiment regarding health/exercise stored data records, DUETI would store and associate such telemetry data+stored medical history+purchase history in a DUETI healthcare record. Similarly, such information may be provided to, e.g., coaches (e.g., as well as healthcare professionals) with the users authorization, and could even be used in social sports contexts, e.g., starting pick-up games and matching athletic capability/rankings as between players. Similar ranking/matching may be extended to other arenas requirement proficiency assessment, e.g., music/lessons/karaoke/etc. and performances may be assessed in person, and/or performances may be recorded and upload as video for review/assessment by experts; in such an example, a user could sell tickets/access to a web stream of their performance through the DUETI player.

The notifications pane 318 may show any number of DUETI UI transactions/activities. For example, previous purchases, bids on items wanted or for sale, previous activities of a user Share It, Want It, Gift It, Buy It commands may display there, as well as such activities from their friends from social networks (e.g., if the user provided their username/password credentials to DUETI so that it can monitor such social network messages on behalf of the user).

FIG. 4 shows a logic flow diagram illustrating Transaction & Asset Transformer (TAT) Buy It component embodiments of the DUETI. Upon providing a DUETI player component to a client 401 as has already been discussed in FIG. 2, 405, the DUETI player component may display a desired site 410. As has been discussed in FIG. 3, any number of digital asset/media types may be displayed. As a user interacts with the site, the embedded DUETI player component monitors to see if the user expresses interest in an asset on the site (e.g., by interacting/selecting a menu item that the DUETI player component has overlaid atop the asset upon instantiation, for example, the Buy It menu items discussed in FIGS. 1) 415, and the DUETI player component may provide activity resolver calls and log messages 212 of FIG. 2b to the DUETI asset Composite Component 213a of Figure to on the DUETI server 402 for parsing/resolving. Upon providing an input indicating interest, such indication of interest may be relayed to the DUETI server 402 where it may determine what mechanisms have been engaged (e.g., which menu option has been selected). In this embodiment, the server determines if a Buy It menu item atop the digital asset (e.g., video) has been selected 416. The DUETI composite component at the server 402 may evaluate if any number of DUETI player component mechanisms have been engaged, for example: if the Want It menu is selected 417a, then flow may continue as shown in FIG. 6; if the Share It menu is selected 417b, then flow may continue as show in FIGS. 8 and 10; if the Gift It menu is selected 417c, then flow may continue as shown in FIG. 12; and if any additional mechanism are provided, separate flow control may be provided for such. If the DUETI composite component on the DUETI server 402 determines that the user has indicated a desire to buy an item related to the site digital asset 416, the DUETI composite component may then iterate for attributes from the site and from the users interaction with the DUETI UI and composite controller until enough information has been collected to proceed with a transaction 418. The DUETI composite component on the server 402 may then determine if any user account information had been obtained 420. If not, the DUETI server may query a DUETI database 419 for user payment accounts and preferences, obtain user account identifiers and retrieve a payment option pane onto which it may composite the users payment options and provide back to the client 422. In one embodiment, this account information may be retrieved to track user preferences and interactions at various sites. As such, if the user did not yet select any items of interest 423 (e.g., no products, digital media, etc.) then the DUETI player component on the client 401 may continue to look for more user inputs 415 while attributing activity to the retrieved user account 422. In one embodiment, the user may first provide log in credentials (e.g., user/password) and/or such may be retrieved from cookies and/or other system credentials. If the user has selected some items (e.g., products) of interest 423, then the DUETI player component will update the payment options and display them (e.g., via payment options pane) 442. If account information has been identified 420, then the DUETI composite component on the server 402 may determine if merchant information relating to the digital asset on the site has been provided/identified 424. If not, then the DUETI composite component may retrieve merchant account identifiers. In some embodiments, the digital asset itself may supply a merchant identifier (e.g., such as a store, URL, database identifier, etc.) as part of the asset metadata. In other embodiments, a user may have supplied log in credentials and/or a list of preferred and/or default merchants. In yet another embodiment, sponsored stores may be included. Once the merchants are identified, price queries for each merchant may be obtained. Again, the meta data from the digital asset may be used to query the store for products and prices for merchandise related to the digital asset, as well as for the digital asset itself 430. In some embodiments, the merchants may provide inventory regarding such products to the DUETI server and database for search, while in other embodiments, live searches of the merchant databases may be constructed and submitted. In such embodiments, the top ranking search results from the queries may constitute a best match. In one embodiment, most popular and/or suggested alternatives may also be employed. For example, if an Amazon search is constructed as discussed in FIG. 2, then the resulting page may be parsed for top matches, as well as related and popular alternatives. It should be noted, in an alternative embodiment, where no merchant selections have been made by a user, then multiple merchant databases may be searched and comparison prices and/or products may be retrieved and presented to the user in the item/product pane 167 of FIG. 1. Such items (e.g., product offerings) may be composited into a product options pane and provided for display/updating 450 to the client DUETI player component, and user interaction iteration may continue 415. If an item (e.g., product) 428 has been selected by a user 415, then the DUETI composite component may determine if address and delivery options have been selected by the user 431. If not 431, then the DUETI composite component may retrieve the users address and delivery preferences (e.g., by retrieving them from the DUETI database account table for that user), retrieve the address/delivery options pane (e.g., from the DUETI database UI table), composite the address/delivery options into the address options pane UI 432 and provide the resulting pane for update and display at the DUETI player component at the client 452; iteration may then continue for more user inputs 415. If payment account selections 420 and item selections 428, 431 have been made, the DUETI composite component may determine if purchase options/confirmation mechanisms have been provided and/or engaged 434. If no purchase options have been provided 434, then the DUETI composite component may retrieve a merchant payment mechanism, a payment options pane, and composite it for purchase confirmation 436, and hereafter provide the payment option pane for updating/display 456 on the client 401. In one embodiment, the purchase mechanism may include an iframe from a merchant (e.g., see 116 of FIG. 1b) where in other embodiments, a template from the DUETI database may be used; thereafter iteration for more user interactions may continue 415. If the DUETI composite component detects that any of the previous attributes 420, 424, 428, 431, 434 (and/or any other attributes) have not been provided, iteration may continue 438, 418, otherwise, with the purchase indication 438 obtained form user interaction 415, 460, the transaction may be processed 475. In one embodiment, where the purchase pane insets the merchant's payment mechanism, the transaction is effectively committed upon engagement of the merchant's purchase mechanism. In an alternative embodiment, the DUETI server may relay a purchase to the merchant by employing a merchant purchase API and providing a purchase request 475 and send the resulting purchase request to the selected merchant 480. If no more attributes are required, and the purchase mechanism is not engaged 460, then iteration will continue for more user interactions 415 and other processing may occur 417a, 417b, 417c, 499.

In one embodiment, HTML templates for the UI widgets may be stored in the DUETI database, and iframes may be used as DUETI UI panes. For example, the following code may be used within an (e.g., HTML) template having the iframes where $DUETI_Product_Pane_template will have the contents of a retrieved UI Pane composited by the DUETI composite component:

```
<div><a href=$DUETI_Product_Pane_Template
target="internal">PaneView</a></div>
<iframe src=$DUETI_Product_Pane_Template style="width:
90%;
height: 333px"
name="internal"></iframe>
```

In one embodiment, the pane template UI may be stored in the DUETI database.

Want It

FIG. 5 shows a screen shot diagram illustrating Want It user interface embodiments of the DUETI. In one embodiment, when a user engages a Want It menu button 105, the digital asset may be added to a wish list 118. The item may be merchant specific (e.g., added to a merchant wish list via merchant API) or merchant independent and retained by the DUETI database. In one embodiment, rather than adding the digital asset to a wish list, the DUETI player may overlay cursor selection mechanisms 538. For example, a selection marquis 538 may be provide that allows a user to select a portion of the digital asset (e.g., a photo or video clip region 520a). Upon making the selection, the DUETI player component may then present the user with a list of possible keyword tags 522. In one embodiment, the keyword tags may be obtained from the digital asset's meta data and prepopulate some of the tags for easy selection 523a, while also allowing for custom tag entry in a text box 523b. Once the clip is made 520a, and tagged 522, it may appear an item clip for scrapping. The drop down menu 106-109 of FIG. 1b may be employed to add the item to DUETI browser sections, and/or to add the clipped item to a wish list 520c. Thereafter, wishlist items may appear as part of product results 520c. When wishlist items are later purchased through the DUETI UI, its wishlist status may be updated to so indicate 560. When users make extensive wishlists, they may wish to make a montage (e.g., a product slide show, video, etc.) 540. Also, they may wish to share 542 their Want It items with their social networks. In one embodiment, the user provides their login credentials to the DUETI (e.g., username/password) and the DUETI may act as a social network client making posts of wish list items to the user's social networks. The posts may include product identifiers and status information (e.g., if the user wants the item, purchased the item, doesn't like the item, etc.). Such social network posts may be seen 163 of FIG. 1, 530. The posts may also include links and/or iframes that allow the user and/or their friends using DUETI to interact with the posts 550. In one embodiment, the wishlist posts may include Gift It 130 of FIG. 1 and Do It 550 drop down buttons and friend star ratings with additional options 551 (e.g., Buy It, Gift It, Want It, Share It). The interface may also show aggregated items by popularity 552, also showing Do It options 551. Additionally, the user may see a list of Want It items from their friends 538 with status 544 of if their friend has the item "Y" or does not "N" and Do It popup button "I" allowing the user to interact with the item for possible gifting.

FIG. 6 shows a logic flow diagram illustrating TAT Want It component embodiments of the DUETI. Building on FIG. 4, the DUETI player component at the client 601 may display a desired site 610. As has been discussed in FIG. 3, any number of digital asset/media types may be displayed. As a user interacts with the site, the embedded DUETI player component monitors to see if the user expresses interest in an asset on the site (e.g., by interacting/selecting a menu item that the DUETI player component has overlaid atop the asset upon instantiation, for example, the Buy It menu items discussed in FIGS. 1) 615, and the DUETI player component may provide activity resolver calls and log messages 212 of FIG. 2b to the DUETI asset Composite Component 213a of Figure to on the DUETI server 602 for parsing/resolving. Upon providing an input indicating interest, such indication of interest may be relayed to the DUETI server 602 where it may determine what mechanisms have been engaged (e.g., which menu option has been selected). In this embodiment, the server determines if a Want It menu item atop the digital asset (e.g., video) has been selected 417a of FIG. 4, 605. The DUETI composite component at the server 602 may evaluate the obtained Want It indication from the user 615, the selected item identifier, possible tags, best match, most popular and suggested alternatives to the item as has already been discussed in FIG. 4, 620. Where a user uses a selection marquis to select a subportion of the media asset, the coordinates and/or time span (e.g., for video clips) is provided so that the metadata for that portion may be searched (e.g., finding closed captioned information during that interval and using the text as keywords). For example, CanvasRenderingContext2D.save( ) and or the like javascript calls may be employed to copy portions of the digital media asset. In one embodiment, social networks and crowdsourcing and image searches may be used instead of 620 and/or in addition thereto 625, as a mechanism to supplement the search with richer results. Upon obtaining the product ID for the item of interest 615, the results may be displayed to the user 630. The use may then select appropriate tags, and/or alternative items that were provided (e.g., best match, most popular items, suggested alternatives to the selected media asset) 635, and the selection may be provided to the DUETI server 602. The selected item and tags may be added to the users selected wishlist in the DUETI database 619, and the DUETI composite component may query friends' wishlists, and update the user's wishlists (e.g., to show items that the user has since obtained) 640. As part of the updating of status, the DUETI composite component may query $3^{rd}$ party servers 603 to determine the availability of wishlist products 645, and the wishlist status may be updated and displayed to the user 650, 118 of FIG. 1b, 538 as well as update social panes such as social network wall displays statuses 530 of FIG. 5, 655. The DUETI composite component may then query for user shared wishlist statuses 660, 544 of FIG. 5 (e.g., by querying either the DUETI database logging user shared wishlists and preferences 619 or the social networks for DUETI tagged posts 665). These status updates may be composited and provided for display 670, 530, 538 of FIG. 5. Should the user engage the option to create a montage 675 of a share list 675 or wishlist 660, the resulting share list and wishlist items may be provided to a montage creation component 680. In one embodiment, ortu's Collage.js framework (see github- .com/ortu/collage) may be used to generate the montage. An example, substantially in javascript format, for creating a montage instance is below:

```
var collageInstance = collage.create(document.body);
collageInstance.load('facebookConentSourceUserID', 'facebook', {
    minLikes: 1,
    query: 'wishListKeyword'
}).then(function( ){
    // Wait for the loading to be finished, then
    // start the collage (filling the center) and set the active tags
    collageInstance.start(facebookConentSourceUserID');
    collageInstance.speed(7);
});
```

The resulting montage may be captured to video, and/or sent for display, e.g., via an iframe, email, social media post, etc. 685 and processing may otherwise continue 699.

Share It

FIG. 7 shows a screen shot diagram illustrating Share It user interface embodiments of the DUETI. In one embodiment, when a user engages a Share It menu button 104, options to share the media asset (e.g., the online video, product page, etc.) across several social networks may be shown to people/friends 702, groups of friends 704, and the social networks themselves 706 (e.g., see 104b of FIG. 1b).

FIG. 8 shows a logic flow diagram illustrating TAT Share It component embodiments of the DUETI. Building on FIG. 4 and similar to FIG. 6, the DUETI player component at the client 801 may display a desired site 810. As has been discussed in FIG. 3, any number of digital asset/media types may be displayed. As a user interacts with the site, the embedded DUETI player component monitors to see if the user expresses interest in an asset on the site (e.g., by interacting/selecting a menu item that the DUETI player component has overlaid atop the asset upon instantiation, for example, the Buy It menu items discussed in FIGS. 1) 815, and the DUETI player component may provide activity resolver calls and log messages 212 of FIG. 2b to the DUETI asset Composite Component 213a of Figure to on the DUETI server 802 for parsing/resolving. Upon providing an input indicating interest, such indication of interest may be relayed to the DUETI server 802 where it may determine what mechanisms have been engaged (e.g., which menu option has been selected). In this embodiment, the server determines if a Share It menu item atop the digital asset (e.g., video) has been selected 417b of FIG. 4, 805. The DUETI composite component at the server 802 may evaluate the obtained Share It indication from the user 815, the selected item identifier, possible tags, best match, most popular and suggested alternatives to the item as has already been discussed in FIG. 4, 820. Where a user uses a selection marquis to select a subportion of the media asset, the coordinates and/or time span (e.g., for video clips) is provided so that the metadata for that portion may be searched (e.g., finding closed captioned information during that interval and using the text as keywords). In one embodiment, social networks and crowdsourcing and image searches may be used instead of 820 and/or in addition thereto 825, as a mechanism to supplement the search with richer results. Upon obtaining the product ID for the item of interest 815, the results may be displayed to the user 830. The user may then select appropriate tags, and/or alternative items that were provided (e.g., best match, most popular items, suggested alternatives to the selected media asset) 835, and the selection may be provided to the DUETI server 802. The selected item and tags may be added to the users selected wishlist in the DUETI database 819, and the DUETI composite component may query friends' wishlists, and update the user's wishlists (e.g., to show items that the user has since obtained) 840. As part of the updating of status, the DUETI composite component may query $3^{rd}$ party servers 803 to determine the availability of wishlist products 845, and the wishlist status may be updated and displayed to the user 850, 118 of FIG. 1b, 538 as well as update social panes such as social network wall displays statuses 530 of FIG. 5, 702, 704, 706 of FIG. 7, 855. The DUETI composite component may then query for user friends, contacts, groups/circles, social media accounts, addresses 860 (e.g., by querying either the DUETI database 819 or the social networks for DUETI tagged posts 865). These status updates may be composited and provided for display 870, 702, 704, 706 of FIG. 7. The user may select friends/groups/networks 702, 704, 706 as the targets to where their Share It media asset selections will be posted with DUETI embed codes 875.

```
//facebook post call
<script src="view-source:http:/connect.facebook.net/en_US/all.js"
type="text/javascript"></script>
<script type="text/javascript"></script>
//end call
//command using call
<a onclick="publishOnFB('Sharing DUETI share item:
' ,$DUETI_sharelinkURLwEmbedCodes, 'Click this to see the
DUETI share item');
return false;">Share on Facebook</a>
```

The resulting digital media asset and any embed codes will then be posted to the selected networks and/or friends/groups 880 and processing may otherwise continue 899.

FIG. 9 shows a screen shot diagram illustrating Share It user interface embodiments of the DUETI. This Share It interface is similar to the one discussed in FIG. 7, however, it provides user interface panes showing which social network friends have and/or want the digital media asset (e.g., the online video, product page, etc.) 920, and aggregations of the most popular products that people want 910 or have 905. Share It mechanism allow powerful group and social purchasing. For example, discounts may be provided if a user can get 5 of his/her friends to want or purchase an item. A user can share and item noting the discount, and then watch as his friends Want the item or Buy It on their social wall 920.

FIG. 10 shows a logic flow diagram illustrating TAT Share It component embodiments of the DUETI. Building on FIG. 4 and similar to FIG. 8, 1005, the DUETI player component at the client 1001 may display a desired site 1010. As has been discussed in FIG. 3, any number of digital asset/media types may be displayed. As a user interacts with the site, the embedded DUETI player component monitors to see if the user expresses interest in an asset on the site (e.g., by interacting/selecting a menu item that the DUETI player component has overlaid atop the asset upon instantiation, for example, the Buy It menu items discussed in FIGS. 1) 1015, and the DUETI player component may provide activity resolver calls and log messages 212 of FIG. 2*b* to the DUETI asset Composite Component 213*a* of Figure to on the DUETI server 1002 for parsing/resolving. Upon providing an input indicating interest, such indication of interest may be relayed to the DUETI server 1002 where it may determine what mechanisms have been engaged (e.g., which menu option has been selected). In this embodiment, the server determines if a Share It menu item atop the digital asset (e.g., video) has been selected 417*b* of FIG. 4, 1005. The DUETI composite component at the server 1002 may evaluate the obtained Share It indication from the user 1015, the selected item identifier, possible tags, best match, most popular and suggested alternatives to the item as has already been discussed in FIG. 4, 1020. Where a user uses a selection marquis to select a subportion of the media asset, the coordinates and/or time span (e.g., for video clips) is provided so that the metadata for that portion may be searched (e.g., finding closed captioned information during that interval and using the text as keywords). In one embodiment, social networks and crowdsourcing and image searches may be used instead of 1020 and/or in addition thereto 1025, as a mechanism to supplement the search with richer results. Upon obtaining the product ID for the item of interest 1015, the results may be displayed to the user 1030. The DUETI composite component may query the DUETI database 1019 friends' and everyone's haves, recent views, wishlists, etc. 840. As part of the updating of status, the DUETI composite component may query $3^{rd}$ party servers 1003 for web searches, product views, and purchases 1045, and the have/have-not status of friends DUETI interactions may be provide for compositing and display 920 of FIG. 9, 1055, as well the aggregations of what all DUETI users want, sorted by most frequent/popular occurrence 910, as well as DUETI users' most popularly purchased/acquired items 905 of FIG. 9. The DUETI composite component may then query for user friends, contacts, groups/circles, social media accounts, addresses 1060 (e.g., by querying either the DUETI database 1019 or the social networks for DUETI tagged posts 1065). These status updates may be composited and provided for display 1070, 702, 704, 706 of FIG. 7. The user may select friends/groups/networks 702, 704, 706 as the targets to where their Share It media asset selections will be posted with DUETI embed codes 1075. The resulting digital media asset and any embed codes may then be shared 1080 and distributed to the social networks as 1085, as has already been discussed in FIG. 8, and processing may otherwise continue 1099.

Gift It

FIG. 11 shows a screen shot diagram illustrating Gift It user interface embodiments of the DUETI. In one embodiment, when a user engages a Gift It menu button 103, options to gift the media asset (e.g., the online video, product page, etc.) and/or related items to the user's friends may be shown 1110, 1112, 1116. Also, in one embodiment, advertisements (e.g., from ad networks) may be displayed as product alternatives 1118*a*, 1118*b*. In one embodiment, when a user selects the Gift It button 103, any friends selected in the address pane 1110, 1112 may be displayed by icon overlay 1114 over the asset. In this way, the user may browse, one digital asset and related products after another, and keep adding the items to the respective friends' gift bags 1114. In addition to the "Buy it now" button option, options to note the item is a gift, get gift wrapping, and notify the recipient/friend are provided 1116.

FIG. 12 shows a logic flow diagram illustrating TAT Share It component embodiments of the DUETI. Building on FIG. 4 and similar to FIG. 6, the DUETI player component at the client 1201 may display a desired site 1210. As has been discussed in FIG. 3, any number of digital asset/media types may be displayed. As a user interacts with the site, the embedded DUETI player component monitors to see if the user expresses interest in an asset on the site (e.g., by interacting/selecting a menu item that the DUETI player component has overlaid atop the asset upon instantiation, for example, the Buy It menu items discussed in FIGS. 1) 1215, and the DUETI player component may provide activity resolver calls and log messages 212 of FIG. 2*b* to the DUETI asset Composite Component 213*a* of Figure to on the DUETI server 1202 for parsing/resolving. Upon providing an input indicating interest, such indication of interest may be relayed to the DUETI server 1202 where it may determine what mechanisms have been engaged (e.g., which menu option has been selected). In this embodiment, the server determines if a Gift It menu item atop the digital asset (e.g., video) has been selected 417*c* of FIG. 4, 1205. The DUETI composite component at the server 1202 may evaluate the obtained Gift It indication from the user 415 of FIG. 4, the selected item identifier during the asset (e.g., video) presentation 1215 and determine best match, most popular and suggested alternatives to the item, as has already been discussed in FIG. 4, 1220. The DUETI asset composite component may they determine if the item is already on the user's friends' wishlists 1225 by querying the DUETI database 1219 and updating the DUETI player UI at the client 1201 with indications where the item is on a wishlist 1110, 1112 of FIG. 11, 920 of FIG. 9, 530 of FIG. 5, or already owned by a friend 1230. The user may then select the friends for which s/he is interested in purchasing the item of interest 1110, 1112 of FIG. 11, and the friend(s)' user identifier and the item identifier (and/or best/alternative matches, etc.) 1235 may be returned to the DUETI server 1202. The DUETI composite component may then obtain gifting, wrapping, availability options 1116 of FIG. 11, 1240*b* from the $3^{rd}$ part servers as additional attributes for purchase, and otherwise proceed with purchasing mechanisms/options much as has already been discussed in FIG. 4, 1241*a*, 1241*b*; wherein the items, availability, best matches, alternatives, gift options, merchants, prices, etc. are provided to the DUETI player component on the client 1201 for display 1245. The user may then select a merchant to purchase the item 1250, and the DUETI composite component at the server 1202 may then query 1255 the DUETI database 1219 for payment options, which may then be displayed for selection 1260 by the user, much as has been discussed in FIG. 4. Here, however, display and delivery options will be shown for the user's gift targets 1265, and the user selected payment options and target addresses selection 1270 will be provided for transaction processing 1275 which may be sent to the $3^{rd}$ party servers 1280, much as has been already described in FIG. 4, and processing may otherwise continue 1299.

DUETI Browser

FIGS. 13*a*-20 show a screenshot diagrams illustrating embodiments of an asset collection browser for the DUETI. The DUETI asset collection browser is an application that allows users to scrapbook any types of assets, both digital and real, into collections; the asset collection browser may be a mobile app, a desktop application, a web application, and/or the like (AC browser). The AC browser also provides a search mechanism, not unlike a web browser search bar, that will result in bringing digital assets directly into the AC browser. In one embodiment, the AC Browser may be developed using iOS and/or Apple Cocoa libraries that include a webview, and themselves may contain iframes with embed codes to house any digital asset type.

FIG. 13*a* shows the AC browser in the form of a scrapbook 1301 (however, it may take on numerous forms and depictions (e.g., a shelf, a shoe box, and/or any container type). In this view, a user has created a baseball cards 1305 section for the scrapbook. This section of the AC browser shows a number of physical baseball cards 1210, which may have been scanned/photographed and imported to the collection. In another embodiment, when such cards are purchased with the DUETI embedded player, the image of the purchased card from the commerce site may automatically be added to the AC browser. The figure also shows several dimmed cards depicting cards that are on the user's wish list 1320. As was already discussed, user may add media assets to their wish list 109, by engaging in Want It 105 of FIG. 1, FIG. 5 activity. Also, a card dimmed and highlighted in gold is shown as being "on loan" 1315 to the user. In one embodiment, the user's friend may have engaged the Share It mechanism and Do It option 544*b* of FIG. 5 and loaning it to this user. It should be noted that while these cards represent real baseball cards, digital baseball cards (and other types of trading cards and digital assets) may also be added to the AC browser. Also, the browser includes a search bar 1360 allowing for local searches of asset collections within the AC browser, and of $3^{rd}$ party servers having asset collections. It should be noted that the AC browser may store digital asset collections locally on the device on which it is executing, and as well as from a server acting as the backing store for the AC browser. In an alternative embodiment, the AC browser may distribute storage across a number of $3^{rd}$ party servers via asset link, and pull those assets in for display when the AC browser is being used.

FIG. 13*b* a shows that DUETI player components may unfurl 1330, 1335, 1340, 1345 around the digital media asset (e.g., the on-loan baseball card), allowing the user to pivot and purchase a similar card of their own. In an alternative embodiment, auctions such as Ebay 1330, stock/commodities exchanges, etc. may be displayed as a merchant option, and bid/ask prices for the asset may be shown in the product selection pane 1335.

FIG. 14*a* shows an AC browser showing a user's currently owned cars 1410*a*, 1410*b*, cars owned in the past 1415, and wishlist/dream cars 1410 in cars section of the browser 1405. Again, a search bar exists to allow for searching AC browser asset collections and for assets in outside networks 1460.

FIG. 14*b* shows that the DUETI player components may unfurl 1420, 1430, 1435, 1440, 1445, 1450 around a selected digital media asset (e.g., the users current car 1410). In this example, the DUETI player recognizes that the user owns this asset as it is stored in his/her transaction history, and marked as an owned item, and instead of querying and delivering for like products, it provides service options for the car 1435 by showing several repair shops near by 1435, and bringing up the cars past service history 1450, and showing what is required for the next service 1440. In the purchase pane, the DUETI player allows the user to not only buy the service, but to book a time for the service 1445. By accessing the users ownership of the asset and past DUETI accessible transactions, the DUETI player component was able to query for the next most relevant products related to the currently owned product, and as such, identified that a $2^{nd}$ year service requiring, oil, filter, brake rotor and brake pad replacement was the most relevant related product based on past purchases related to this user owned asset.

FIG. 15 shows an AC browser having a games 1505 section. It shows various game digital assets that are owned by the user, e.g., weapons for World of Warcraft 1510, power/ability cards for warframe 1520, and an ability card on the user's wishlist 1515. Should the user engage any of those assets, the DUETI player component would unfurl around the card/weapon/asset and provide the user with all DUETI facilities for transaction.

FIG. 16 shows an AC browser blank page/section where the user entered a search (e.g., for "AC/DC") 1660, and search results (e.g., videos) 1620, and accompanying advertisements 1650 (e.g., for a concert), 1670 (e.g., Google adsense ads to purchase music) are displayed. The user may click on the search results 1644*b* and obtain a Scrap It menu 1644*b* which would allow the user to add the asset to the users AC browser 1675. Once the asset is added to the AC browser, upon the user's selecting it, DUETI player component panes may unfurl as needed 1630, 1638, 1636, 1635, 1637. In this example embodiment, after selecting TicketMaster 1630 as the merchant, the DUETI player components item pane iframe displays TicketMaster's stadium seating selection page 1635, and will allow the user to purchase a ticket in the desired location 1637.

FIG. 17 shows an AC browser with a event (e.g., concert, sporting, etc.) ticket section 1705 where a user may store tickets of past attended concerts 1710. Should the user select one of the tickets, the DUETI player component may unfurl around the ticket and provide options for purchasing related items (e.g., upcoming concert tickets, music, videos, apparel, paraphernalia, donations, etc.).

FIG. 18 shows an AC browser with music 1805 and television show 1810 sections. The AC browser may also hold movies, and any number of other asset types. Should the user select any of these assets, in addition to engaging (e.g., playing them), the DUETI player component may unfurl and provide asset transforming options.

FIG. 19 shows an AC browser with a purchase history section 1905. A summary of the date, form of payment 1907, item 1908, and item detail summary 1909 (e.g., all of which may be engaged with to provide further detail and or further pivot/transactions with the DUETI player) may be stored in this section after each DUETI player transaction. This section is searchable. It is also engageable by the DUETI player component. Additionally, the AC browser shows a section containing (government) and personal property documents 1910 such as property deed 1915, title to a car 1920, drivers license 1925, social security card 1930, a fire arms permit 1986, etc. In one embodiment, documents pertaining to an individual's authorization to purchase/carry fire arms and other weapons may be housed by the AC browser 1986; e.g., an existing weapons collection could be held in a "gun collection" section of the AC browser, and the associated authorized federal firearms license, firearms carry permit, and/or other permits may be stored in the "Documents" section 1986. It should be noted that a mobile version of the AC browser may be used as a wallet and provide actionable versions of the documents for presentation and/or interaction. For example, a driver's license document with embedded asset control stack data may be used as a digital signature for authenticating an individual, where such credentials may be passed (e.g., with user authorization/permission (e.g., password/fingerprint authentication)) to a requesting (e.g., government) entity/official (e.g., providing an electronic version of the drivers license to a requesting police officer with an NFC equipped reader from the user's NFC enabled phone (e.g., an iPhone 6 using Touch ID and NFC to unlock the document and passing the authenticated and authenticateable information securely to the officer).

Asset Control Stack

FIG. 20 shows an AC browser with a mixed asset collection section 2005. Here a users car, game ability card, and baseball card are all shown in the AC browsers mixed asset open protocol section 2001.

All of the assets in the AC browser may employ an open protocol asset control stack 2050. The asset control stack is a datastructure that may be embedded and/or associated with any asset in the AC browser or transacted by the DUETI player component. In one embodiment, the stack may be in the form of XML and/or encrypted by way of digital certificate. The stack itself may contain the data payload of the asset 2020 or refer to it by reference via secure asset link 2018. The stack may include an asset identifier 2026 which may include basic information for the asset, as well as its name, associated links and a unique identifier. The asset control stack may contain revision control values 2024, and be capable of multi-value assets having multiple links and revision trees. Revision control is useful for a number of assets (e.g., a digital or real baseball card signed by a baseball player may increase the value of the card, and cause a new version of the asset to come into being). Crypto 2022 may specify a cryptography type for the asset. Any number of cyphers may be employed (e.g., digital certificates, public/private key pairs with ledgers akin to bitcoin making each digital asset unique, etc.). Such cryptography is distributable, secure, diffuse, may be tied to a device ID, account ID, registration via public ledgers, and/or the like. The data payload may include a crypto secure copy of the asset itself (e.g., audio, photo, video, etc.) or an asset link may be used to a secure version of the asset, alone, and/or in conjunction with the data payload 2020. Share management 2016 may provide limitations on how the asset may be shared (e.g., number of loan copies, duration of loans, maximum number of loans/shares, etc. Share management may work in conjunction with the asset link to refresh, add, destroy share access to the asset. Destroy/degrade 2014 options may specify the progressive destruction of shared assets (e.g., audio files degrade with repeated use by downsampling or asset linking to downsampled versions of the asset over time). Originals may also degrade over time, if an artist wishes their asset/work to be temporal in nature, resulting in the eventual total destruction of the asset. Tamper 2012 parameters may work in conjunction with revision 2014 settings, where some assets are marked as allowing for tampering (e.g., autographs) where as others may work in concert with the degrade/destroy flags 2014 and specify destruction of the asset upon tamper detection. Reputation parameters 2010 allow for the asset holders to have their reputation attached to the file as it is passed on from owner to owner, establishing not only a provenance chain of title 2008, which may maintain all owners of the asset, but the quality of the stewardship of the owner (e.g., some owners enhancing value with positive revision (e.g., autographs), while others attempting to tamper negatively (e.g., making unauthorized duplicates and thereby causing permanent degradation of the asset). Custody parameters 2006 are often part of provenance and show current ownership, however, may be used in concert with share management 2016 where an asset is moved and held by another user for a time. Moral rights 2004 parameters may specify an artists rights to prevent disparagement, embarrassing displays, and other moral rights abuses despite that the artist/originator/asset creator is no longer the owner of the digital asset. Goods/Services attributes 2002 may contain parameters, which may be updated continuously, to provide links to additional versions of the asset, and/or related goods/services. In one embodiment, ad space in this part of the datastructure may be sold and links/values/ads within may be supplied by ad networks.

An example asset control stack 2050, substantially in the form of XML-formatted data, is provided below:

```
Content-Type: Application/XML
Content-Length: 667
<?XML version = "1.0" encoding = "UTF-8"?>
<asset_control_stack>
   <creation_timestamp>2020-12-31 23:59:59</creation_timestamp>
   <asset_id>
      <assetControlID>qwerty12345</assetControlID>
      <assetID>123456789</assetID>
      <serialNo>abc123</serialNo>
      <assetName>Willie Mays 1951 Card</assetName>
      <originator>Topps</originator>
      <dateIssued>1951</dateIssued>
      <assetType>Physical Baseball Card</assetType>
      <assetLink>www.topps.com/assetID</assetLink>
   </asset_id>
   <revision>
      <1>
```

```
        <owner_ID>JaneDoe<owner_ID>
        <revisionDate>1/1/53</revisionDate>
        <revisionType>autograph</revisionType>
      </1>
      <2>...</2>...
    </revision>
    <crypto>
      <publicKey>abc123456</publicKey>
      <encryptionType>digitalCertif</encryptionType>
      <certificateSource>www.certificatesRus.com/encryptionType
        </certicateSource>
      ...
    </crypto>
    <datapayload>
      <dataType>image</dataType>
      <data>JPG data</data>
    <datapayload>
    <assetLink>
      <assetLinkID>12345qwerty</assetLinkID>
      <linklocation>DigitalObjectidentifier.value</linklocation>
      <URL>www.myassetlink.com/assetID</URL>
      <auth_refresh>weekly</auth_refresh>
      <sharing>sharemanageID</sharing>
      <degrade>degradeID</degrade>
      <tamper>tamperID</tamper>
    </assetLink>
    <shareManage>
      <maxCopies>10</maxCopies>
      <loanPeriod>5 days</loanPeriod>
      <degrade>degradeID</degrade>
      <maxLoanAmount>unlimited</maxLoanAmount>
      <refresh>assetLinkID</refresh>
      <authorizedUsers>
        <1>UserID1</1>
        <2>UserID2</2>...
      </autorizedUsers>
    </shareManage>
    <degrade>
      <degradeID>123destroy</degrdeID>
      <degradeType>
        <imagequality>ReJPG_downscale</imagequality>
        <degradeAmount>5%</degradeAmount>
        <degradeTrigger1>tamperID<degradeTrigger1>
        <degradeTrigger2>every 3 days<degradeTrigger2>
      </degradeType>
    </degrade>
    <tamper>
      <tamperID>tamper123</tamperID>
      <tamperType>
        //<1>No Tamper</1>
        <1>autograph</1>
        <2>ledger public vote</2> //where owner may ask for a vote to
modify and public can vote on the crypto ledger to allow/not allow
alteration
        ...
      </tamperType>
    </tamper>
    <reputation>
      <owner1>
        <userID>123456</userID>
        <revisionID>revision123</revisionID>
        <reputation>10</reputation> //e.g., 1-10 score, 10 being top
      </owner1>...
    </reputation>
    <provenance>
      <owner1>
        <userID>123456</userID>
        <ownDateStart>1/1/1951</ownDateStart>
        <ownDateEnd>1/1/1955</ownDateEnd>
        <tamperID>userID</tamperID>
      </owner1>...
    <custody><currentOwner>userID</currentOwner></custody>
    <moralRights>
      <nonDisparagementofAuthor>true</nonDisparagementofAuthor>
      ...
    </moralRights>
    <goodserv>
      <goodservID>abc321</goodservID>
      <adID>12345</adID>
      <adNetwork>google Adsense</adNetwork>
      <URL>google.com/ads/keywords</URL>
      ...
    </goodserv>
</ asset_control_stack >
```

Digital Trading Cards

FIGS. 21a-21c show a screenshot diagrams illustrating embodiments of digital cards for the DUETI. In one embodiment, digital trading cards have an asset control stack. The cards may provide static, video and other media types that are engageable and changeable, yet, relate back to an individual asset identifier as provided by the cards asset control stack. Along with the asset control stacks public/private key-public ledger (e.g., bitcoin-like encryption), the digital asset becomes unique. Even if another user copies the screen shot, the duplicated card would not cryptographically resolve to the ledger noted asset identified by the asset control stack. As such, the digital assets may have limited availability and collectors may experience scarcity/rarity akin to physical world cards through this public ledger tracked encrypted version of the asset.

FIG. 21a shows that the digital trading card template may provide a section identifying its current custodian/owner 2101, as well as a section providing recent messages and notifications which would only be addressed to the current custodian and user identifier associated as the owner of the card in the asset control stack 2110. As such, asset control stack asset links may provide exclusive featured content for the owner of the card 2102, which would not be available to any copies of the card that could not cryptographically resolve without the proper credentials in the cards asset control stack 2102. In one embodiment, various user collections of media assets may be collected, and/or obtained via a marketplace. In one embodiment, a DUETI player component would unfurl to allow for purchase of such assets. In another embodiment, such additional asset purchases could be considered revisions to the playing card, and then travel along and/or separate from the card upon subsequent purchases of the asset by other users 2103.

The digital trading card may offer navigation (e.g., back forward buttons) 2111, buttons to show various features of the card, e.g., providing the ability to trade, sell, share the card and determine its rarity 2112. In one embodiment, in addition to the trade/sell commerce options, a "Bet" option may be included allowing a user to place bets with an authorized betting account (e.g., at a Las Vegas casino and/or online betting account, etc.). The trading/selling/sharing features may be provided via the DUETI player component, and rarity, and sharing tracking may be maintained and updated via the trading cards asset control stack. In one embodiment, the control stack may include an image and video, and the main display may be an image, once engaged, resulting in the playing of video 2113. Additional trading card information may be overlaid atop the image/video 2114, and the card image may be swiped/flipped to see additional information such as statistics on the subject of the card (e.g., the player) and statistics maintained in the asset control stack (e.g., rarity, value, revision history, etc.) 2115. Once swiped, supplemental information, and main card text may be displayed 2123, 2124 on the card. Another area may display statistics on the card subject and on the asset control stack information for the asset 2125. The user may swipe/ flip the card to go back to the front view 2126.

FIG. 21*b* shows the digital trading card template of FIG. 21*a* populated with trading card information. In this embodiment, the template is showing sponsorship information in the top section 2140. Additionally, upon engaging in commerce on the card, the DUETI player component is loaded to purchase tickets at an upcoming game, and the transaction may proceed with one of the user supported payment methods (e.g., Apple Pay) 2150.

FIG. 21*c* shows additional example embodiments of the trading card for various sports.

Additional Example Embodiments

In some embodiments, the DUETI may overlay a product page and/or video page. In some embodiments, the DUETI may overlay a product identified in a video and/or other online webpage. The DUETI may identify a product on a page traversed by a user, or, in other embodiments, the user may indicate interest in a product on a page traversed by the user. The DUETI may overlay the traversed page and/or product identified and provide options for the user to 'buy it,' 'share it,' 'want it,' and/or the like. In some embodiments, the user may purchase the product with a one-click 'buy it' option. In yet another embodiment, the DUETI may receive indication of the user's buy it, want it, or share it and may present options to the user based on the user's indication.

In some embodiments the DUETI may be provided on its own product page and/or video player. In yet another embodiment, the DUETI may overlay on another product page, video page, and/or the like. The DUETI overlay may include options for the user to buy it!, share it!, and/or want it! to indicate the user's interest in the product.

In some implementations, the DUETI may store user profile data. In some embodiments, this may allow the DUETI to employ a one-click buy it!. The DUETI may store such information such as user name, credit card info, preferred stores for purchases, preferred shipping options, and/or the like. In some embodiments, the DUETI may determine the store with the best price and/or shipping option, and, in some embodiments, the DUETI may use that information to choose the store from which to purchase the item.

Two example implementations of the DUETI include a (e.g., audio, photo, video, media, etc.) player (e.g., for concert promotion), and a trading card implementation.

Player

In one implementation, the DUETI may provide a connection from a video, such as on YouTube, via a DUETI platform, to purchase something advertised or related to an advertisement, in the video. For example, a video advertisement for a Celine Dion concert tour may be shown, and below the video, an advertisement for a special purchase arrangement may be shown. In one example, the advertisement may be for a pre-sale for tickets to the Celine Dion Concert. In another example, a countdown clock may be shown to when the pre-sale begins. In this implementation, the DUETI may be aware that the user is a platinum card member, or the user may have already clicked a link indicating that they have a credit card giving them access to the pre-sale. This may allow the user to enter a queue for tickets prior to the beginning of the pre-sale. When the user is offered to buy the tickets, the user may be sent directly to a ticket sales website, such as Ticketmaster, to purchase the tickets.

By clicking on a related link, a user may also access related content. For example, clicking on the link may bring up a display window showing various videos, photographs, links, and/or merchandise, some or all of which may be exclusive to members with access to the pre-sale through the pre-sale promotion. In so doing, the user may access exclusive content, and the user may view the information at the user's pleasure, as well as having access to the transaction to purchase the tickets through the pre-sale directly, and turn the transaction into an information portal, further linking the pre-sale to the user's purchasing activity based at least in part on advertisements. In various embodiments, the fields in the related content page may update and may pull information from other sites. For example, it may pull new YouTube® videos posted about Celine Dion, or may pull an update from a Celine Dion social media feed, such as Twitter® or Facebook® or the like.

In some implementations, the video player may be the foundation YouTube® player. In other implementations, this may be a specialized player linked to the DUETI. In some implementations, social media feeds, access to sweepstakes, and/or the like may be linked, for example, through standard APIs.

In some embodiments, the user's purchases may be part of a gamification engine whereby the user may receive promotions. For example, the DUETI may know that the user has purchased tickets for two other concerts, so the DUETI may offer a particular promo specifically for the user prior to the user making a purchase through the advertisement. In an alternative embodiment, promotions may be presented after the purchase to indicate to the user that the user has a promotion available on their next purchase, purchase of a particular type, and/or the like.

In some implementations, the user may log into the system before receiving notification of promotions; other implementations may allow the user to be identified through cookies, previous log ins, and/or the like. The user may have a profile on the DUETI and the DUETI may be able to suggest other events that may interest the user based on the user's profile in the DUETI. This profile may contain user-entered data regarding the user's preferences, and may also further include information collected about the user based on user purchases. This may further allow the DUETI to determine what future events the user may be interested in, as well as may determine certain promotions that may convince the user to click on certain links or may determine promotions that may pique the user's interest and may convince the user to purchase a certain item. In other embodiments, the user profile may provide for one-click purchasing of the item through the promotion and/or advertisement.

Trading Card

In some embodiments, the DUETI may allow advertisers to create a DUETI trading card that, in some embodiments, may include a video advertisement. In one implementation, the DUETI may provide a template of a DUETI trading card, and these may be handed out to users. In one implementation, these may be similar to baseball cards that may be, for example, handed out as a promotion at a baseball game. In one implementation, an advertiser may generate a promotion using DUETI and the DUETI may create a QR code or other distribution mechanism to hand out a DUETI trading card to users as they enter a baseball stadium, for example. The DUETI trading card may be hosted on an DUETI application, for example, an iPhone app, where the application may know who the collector of DUETI is. The collector may use the DUETI app to buy, trade, and sell DUETI trading cards. The DUETI app may also be able to indicate the rarity of the DUETI trading card, and the collector may share acquisition of a DUETI trading card may be shared on social media. In various implementations, the number of shares may be tracked by the DUETI app, as well. The DUETI app may also allow for messaging amongst users.

In one embodiment, the rarity of the DUETI trading card may be determined using BitCoin. The DUETI trading card may have a specific BitCoin encryption mechanism and unique identifier to assure the card's authenticity, which therefore may provide validity and uniqueness of the DUETI trading coin. In another embodiment, anti-counterfeiting methodologies may be used. This may provide a server-held owner, which may be updated when access changes, for example, when the DUETI trading card is sold or traded.

In some implementations, the DUETI may also host promotions. For example, in the baseball example above, these promotions may be tied to the players, where a player may sign the DUETI trading card, thereby increasing the rarity of the DUETI trading card. Furthermore, players or advertisers may host promotions indicating that if they get a certain number of shares, the player may sign a certain number of DUETI trading cards which the DUETI may distribute to users. In other implementations, a player may sign a certain number of DUETI cards per month, which may be distributed by a certain advertiser on the DUETI. Other embodiments may allow winners of promotions to receive signed DUETI trading cards.

This may further be applied to other gaming cards, in both sports and other collector cards, such as Pokémon and Skylanders Giants.

In some implementations, for example as shown in FIGS. 21a-21c, the DUETI trading card may be a baseball trading card. In the embodiment, the trading card may be a static trading card, and may include a photo of the athlete. In some embodiments as shown in FIGS. 21a-21c, the DUETI may show a still shot of the athlete, the athlete's name, team logo, team name, jersey number, league logo (e.g., MLB), and/or the like. In some implementations, a sponsor logo may also be shown. In some implementations, such as that shown in FIGS. 21a-21c, the") provide a connection from a video, via an DUETI trading card may include a video. In some embodiments, the DUETI may show a still shot of the athlete, where the still shot of the athlete is a still shot from a video of the athlete. The DUETI trading card may also show a play button that, when tapped, may play a video, and the video may be integrated within the DUETI trading card. Other embodiments may show dynamic images, e.g., dynamic layered shots that move to provide a sense of 3D depth, video, 3D video snippets, holographic displays, etc.

In either or both of the embodiments, a flip button may be displayed in the corner of the DUETI trading card, as shown in FIGS. 21a-21c. In some implementations, the flip button may be a circular arrow, while in other embodiments the flip button may take other forms. In some embodiments, the flip button on the DUETI may turn the image of the DUETI trading card to show the back of the card, or, when tapped when viewing the back of the card, may flip to show the front of the card. In some such implementations, the flip feature may be accessed by swiping the display showing the card to the left and/or right. In yet another embodiment, the DUETI trading card may have more than two sides and/or screens. In these embodiments, the DUETI trading card may show a flip button that shows the next screen, a button to flip directly to the first and/or last screen, links to a particular screen, and/or the like.

Furthermore, in some implementations, the flip button may be shown only when the DUETI trading card is displaying a still screen and/or still shot of the video, while in other embodiments, the flip button may be shown while the video is playing. Where a still shot is shown, the DUETI trading card may show the still shot rotating as the DUETI trading card flips to show the other side of the DUETI trading card. Where the video is playing on the DUETI when the flip button is tapped, the DUETI may freeze the current frame of the video and show the frame rotating to show the back of the card. In another embodiment, the DUETI may continue playing the video as the DUETI trading card flips.

FIGS. 21a-21c show an embodiment of the DUETI trading card showing the back of the DUETI card. In some implementations, the back of the DUETI trading card may show statistics and/or biographical information about the athlete. In some embodiments, the biographical information may include such information as the athlete's team number, team and/or club name, age, birthplace, height, weight, and/or the like. In some implementations, the DUETI trading card may display the athlete's statistics. In the baseball example shown in FIGS. 21a-21c, the statistics may include current information, such as hits, runs, home runs, RBIs, and/or the like. In some implementations, the DUETI trading card may also have additional statistics that may be shown by swiping the statistics to the left and/or right. In some embodiments, the statistics may have a circular orientation, where the user may swipe to the left or to the right to view additional statistics, while other embodiments may include additional statistics to the right and the originally displayed statistics may be viewed by swiping back to the left.

In some implementations, the back of the card may also display videos of the athlete. In some such implementations, the videos may be pre-selected before the DUETI trading card is released to the user, but in other embodiments, new videos may be pushed to the DUETI trading cards. In some implementations, the new videos may be recent highlights, for example, from that day's game, while in other embodiments, the videos may be a from a preselected highlight reel. In some implementations, such as where the DUETI trading card is distributed at an event stadium, the DUETI trading card may include videos from that day's game. In some implementations, the videos may be pushed to the DUETI trading card, while in other embodiments, the DUETI may send a link to the DUETI user, which, when clicked, may update the DUETI trading card with highlights from that day's game.

Further embodiments of the DUETI may allow the user to trade, collect, and/or share the DUETI trading card. The trade button may allow the user to propose a trade to a particular user and/or for a particular card, offer a trade for a particular type of card to all DUETI users, view proposed trades for this particular card and/or other cards in the user's portfolio of DUETI trading cards, and/or the like. The user may also collect DUETI trading cards, and may, in some instances be able to review the DUETI trading card before deciding to collect the card, and clicking the collect button may add the card to the user's collection. In some embodiments, the user may indicate his interest in a trade to acquire the card by indicating that (s)he wants to collect the card being viewed. Sharing the DUETI trading card may allow the user to share the card with other DUETI users and/or non-users. In some implementations, sharing the DUETI trading card may share the fact that the user has a DUETI trading card, while other implementations may share the DUETI trading card and allow others to view the card, although it may not be added to their collection of DUETI trading cards unless acquired otherwise.

FIGS. 21a-21c show various embodiments as described in reference to FIGS. 21a-21c, but instead showing a soccer player instead of a baseball player.

DUETI Controller

FIG. 22 shows a block diagram illustrating embodiments of a DUETI controller. In this embodiment, the DUETI controller 2201 may serve to aggregate, process, store, search, serve, identify, instruct, generate, match, and/or facilitate interactions with a computer through digital asset, management, inventory and electronic purchasing systems technologies, and/or other related data.

Typically, users, which may be people and/or other systems, may engage information technology systems (e.g., computers) to facilitate information processing. In turn, computers employ processors to process information; such processors 2203 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2229 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DUETI controller 2201 may be connected to and/or communicate with entities such as, but not limited to: one or more users from user input devices 2211; peripheral devices 2212; an optional cryptographic processor device 2228; and/or a communications network 2213.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DUETI controller 2201 may be based on computer systems that may comprise, but are not limited to, components such as: a computer systemization 2202 connected to memory 2229.

Computer Systemization

A computer systemization 2202 may comprise a clock 2230, central processing unit ("CPU(s)" and/or "processor(s)" (these terms are used interchangeable throughout the disclosure unless noted to the contrary)) 2203, a memory 2229 (e.g., a read only memory (ROM) 2206, a random access memory (RAM) 2205, etc.), and/or an interface bus 2207, and most frequently, although not necessarily, are all interconnected and/or communicating through a system bus 2204 on one or more (mother)board(s) 2202 having conductive and/or otherwise transportive circuit pathways through which instructions (e.g., binary encoded signals) may travel to effectuate communications, operations, storage, etc. The computer systemization may be connected to a power source 2286; e.g., optionally the power source may be internal. Optionally, a cryptographic processor 2226 may be connected to the system bus. In another embodiment, the cryptographic processor and/or transceivers (e.g., ICs) 2274 may be connected as either internal and/or external peripheral devices 2212 via the interface bus I/O 2208 (not pictured) and/or directly via the interface bus 2207. In turn, the transceivers may be connected to antenna(s) 2275, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4750IUB8 receiver chip (e.g., GPS); a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); an Infineon Technologies X-Gold 618-PMB9800 transceiver chip (e.g., providing 2G/3G HSDPA/HSUPA communications); a MediaTek MT6620 transceiver chip (e.g., providing 802.11a/b/g/n, Bluetooth 4.0 LE, FM, global positioning system (GPS) (thereby allowing DUETI controller to determine its location); a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large mainframe computers, down to mini computers, servers, desktop computers, laptops, netbooks, tablets (e.g., iPads, Android and Windows tablets, etc.), mobile smartphones (e.g., iPhones, Android and Windows phones, etc.), wearable devise (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2229 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the DUETI controller and beyond through various interfaces. Should processing requirements dictate a greater amount speed and/or capacity, distributed processors (e.g., Distributed DUETI), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the DUETI may be achieved by implementing a microcontroller such as CAST's R8051XC2 microcontroller; Intel's MCS 51 (i.e., 8051 microcontroller); and/or the like. Also, to implement certain features of the DUETI, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DUETI component collection (distributed or otherwise) and/or features may be implemented via the microprocessor and/or via embedded components; e.g., via ASIC, coprocessor, DSP, FPGA, and/or the like. Alternately, some implementations of the DUETI may be implemented with embedded components that are configured and used to achieve a variety of features or signal processing.

Depending on the particular implementation, the embedded components may include software solutions, hardware solutions, and/or some combination of both hardware/software solutions. For example, DUETI features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the DUETI features. A hierarchy of programmable interconnects allow logic blocks to be interconnected as needed by the DUETI system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the DUETI may be developed on regular FPGAs and then migrated into a fixed version that more resembles ASIC implementations. Alternate or coordinating implementations may migrate DUETI controller features to a final ASIC instead of or in addition to FPGAs. Depending on the implementation all of the aforementioned embedded components and microprocessors may be considered the "CPU" and/or "processor" for the DUETI.

Power Source

The power source 2286 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2286 is connected to at least one of the interconnected subsequent components of the DUETI thereby providing an electric current to all subsequent components. In one example, the power source 2286 is connected to the system bus component 2204. In an alternative embodiment, an outside power source 2286 is provided through a connection across the I/O 2208 interface. For example, a USB and/or IEEE 1394 connection carries both data and power across the connection and is therefore a suitable source of power.

Interface Adapters

Interface bus(ses) 2207 may accept, connect, and/or communicate to a number of interface adapters, conventionally although not necessarily in the form of adapter cards, such as but not limited to: input output interfaces (I/O) 2208, storage interfaces 2209, network interfaces 2210, and/or the like. Optionally, cryptographic processor interfaces 2227 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2209 may accept, communicate, and/or connect to a number of storage devices such as, but not limited to: storage devices 2214, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2210 may accept, communicate, and/or connect to a communications network 2213. Through a communications network 2213, the DUETI controller is accessible through remote clients 2233*b* (e.g., computers with web browsers) by users 2233*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., Distributed DUETI), architectures may similarly be employed to pool, load balance, and/or otherwise decrease/increase the communicative bandwidth required by the DUETI controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 2210 may be used to engage with various communications network types 2213. For example, multiple network interfaces may be employed to allow for the communication over broadcast, multicast, and/or unicast networks.

Input Output interfaces (I/O) 2208 may accept, communicate, and/or connect to user input devices 2211, peripheral devices 2212, cryptographic processor devices 2228, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 2211 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 2212 may be connected and/or communicate to I/O and/or other facilities of the like such as network interfaces, storage interfaces, directly to the interface bus, system bus, the CPU, and/or the like. Peripheral devices may be external, internal and/or part of the DUETI controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the DUETI controller may be embodied as an embedded, dedicated, and/or monitor-less (i.e., headless) device, wherein access would be provided over a network interface connection.

Cryptographic units such as, but not limited to, microcontrollers, processors 2226, interfaces 2227, and/or devices 2228 may be attached, and/or communicate with the DUETI controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 2229. However, memory is a fungible technology and resource, thus, any number of memory embodiments may be employed in lieu of or in concert with one another. It is to be understood that the DUETI controller and/or a computer systemization may employ various forms of memory 2229. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 2229 will include ROM 2206, RAM 2205, and a storage device 2214. A storage device 2214 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 2229 may contain a collection of program and/or database components and/or data such as, but not limited to: operating system component(s) 2215 (operating system); information server component(s) 2216 (information server); user interface component(s) 2217 (user interface); Web browser component(s) 2218 (Web browser); database(s) 2219; mail server component(s) 2221; mail client component(s) 2222; cryptographic server component(s) 2220 (cryptographic server); the DUETI component(s) 2235; and/or the like (i.e., collectively a component collection). These components may be stored and accessed from the storage devices and/or from storage devices accessible through an interface bus. Although non-conventional program components such as those in the component collection, typically, are stored in a local storage device 2214, they may also be loaded and/or stored in memory such as: peripheral devices, RAM, remote storage facilities through a communications network, ROM, various forms of memory, and/or the like.

Operating System

The operating system component 2215 is an executable program component facilitating the operation of the DUETI controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DUETI controller to communicate with other entities through a communications network 2213. Various communication protocols may be used by the DUETI controller as a subcarrier transport mechanism for interaction, such as, but not limited to: multicast, TCP/IP, UDP, unicast, and/or the like.

Information Server

An information server component 2216 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DUETI controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DUETI database 2219, operating systems, other program components, user interfaces, Web browsers, and/or the like.

Access to the DUETI database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DUETI. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DUETI as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome; Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 2217 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2218 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the DUETI enabled nodes. The combined application may be nugatory on systems employing standard Web browsers.

Mail Server

A mail server component 2221 is a stored program component that is executed by a CPU 2203. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the DUETI.

Access to the DUETI mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2222 is a stored program component that is executed by a CPU 2203. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2220 is a stored program component that is executed by a CPU 2203, cryptographic processor 2226, cryptographic processor interface 2227, cryptographic processor device 2228, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the DUETI may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the DUETI component to engage in secure transactions if so desired. The cryptographic component facilitates the secure accessing of resources on the DUETI and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DUETI Database

The DUETI database component 2219 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the DUETI database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the DUETI database is implemented as a data-structure, the use of the DUETI database 2219 may be integrated into another component such as the DUETI component 2235. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 2219 includes several tables 2219*a-z:*

An accounts table 2219*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 2219*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a DUETI);

An devices table 2219*c* includes fields such as, but not limited to: deviceID, accountID, assetIDs, paymentIDs, deviceType, deviceName, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, device Preferences, deviceRestrictions, and/or the like;

An apps table 2219*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions and/or the like;

An assets table 2219*e* includes fields such as, but not limited to: assetID, accessControlID, merchantID, advertiserID, distributorAccountID, distributorPaymentID, distributorOnwerID, assetType (e.g., advertisement, ad network, art, card, currency, equity, product, etc.), assetName, assetProductName, assetCode, assetQuantity, assetCost, assetPrice, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, assetLink, subscriptionIDs, assetAuthroizationCode, assetAccessPrivileges, assetPreferences, assetRestrictions, and/or the like;

A payments table 2219*f* includes fields such as, but not limited to: paymentID, accountID, userID, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 2219*g* includes fields such as, but not limited to: transactionID, accountID, assetIDs, deviceIDs, paymentIDs, transactionIDs, userID, transactionType, transactionDate, transactionAmount, transactionQuantity, transactionDetails, transactionNo, transactionAccessPrivileges, transactionPreferences, transactionRestrictions, and/or the like;

An merchants table 2219*h* includes fields such as, but not limited to: merchantID, merchantTaxID, merchanteName, merchantContactUserID, merchantEmail, merchantAddress, merchantState, merchantZIPcode, merchantCountry, merchantAuthKey, merchantIPaddress, merchantURLaccessCode, merchantPortNo, merchantAccessPrivileges, merchantPreferences, merchantRestrictions, and/or the like;

An ads table 2219*i* includes fields such as, but not limited to: adID, adNetwork, adNetworkURL, goodservID, adKeywords, adKeywordPrice;

An asset_control_stack table 2219*j* includes fields such as, but not limited to: assetControlID, serialNo, assetName, originatorID, dateIssued, assetID, revisionID, revisionOwnerID, revisionDate, revisionType, cryptoID, cryptoType, publicKey, certificateSource, assetLinkID, linkLocation, assetLinkURKL, auth_refresh_frequency, sharingID, sharemaxcopies, shareloanperiod, maxloanAmount, authorizedUsers, degradeID, degradeType, degradeAmount, tamperID, tamperType, tamperData, reputationOwnerID, provenanceOwnerID, custodyOwnerID, moralRightsType, goodservID, adID;

An UI table 2219*h* includes fields such as, but not limited to: ULID, accountID, assetIDs, merchantID, deviceIDs, deviceType, applicationID, applicationType, UI_Type, menu_ID, menuTitle, menuItem, menuItemID, paneID, paneType, paneTemplateUI, UI_WidgetView, UI_WidgetViewID, widgetID, widgetType, widgetName, widgetAddress;

A market_data table 2219*z* includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Dun & Bradstreet, Reuter's Tib, Triarch, etc.), for example, through Microsoft's Active Template Library and Dealing Object Technology's real-time toolkit Rtt.Multi.

In one embodiment, the DUETI database may interact with other database systems. For example, employing a distributed database system, queries and data access by search DUETI component may treat the combination of the DUETI database, an integrated data security layer database as a single database entity.

In one embodiment, user programs may contain various user interface primitives, which may serve to update the DUETI. Also, various accounts may require custom database tables depending upon the environments and the types of clients the DUETI may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2219a-z. The DUETI may be configured to keep track of various settings, inputs, and parameters via database controllers.

The DUETI database may communicate to and/or with other components in a component collection, including itself, and/or facilities of the like. Most frequently, the DUETI database communicates with the DUETI component, other program components, and/or the like. The database may contain, retain, and provide information regarding other nodes and data.

The DUETIs

The DUETI component 2235 is a stored program component that is executed by a CPU. In one embodiment, the DUETI component incorporates any and/or all combinations of the aspects of the DUETI that was discussed in the previous figures. As such, the DUETI affects accessing, obtaining and the provision of information, services, transactions, and/or the like across various communications networks. The features and embodiments of the DUETI discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the DUETI's features and facilities, and in many cases reduce the costs, energy consumption/requirements, and extend the life of DUETI's underlying infrastructure; this has the added benefit of making the DUETI more reliable. Similarly, many of the features and mechanisms are designed to be easier for users to use and access, thereby broadening the audience that may enjoy/employ and exploit the feature sets of the DUETI; such ease of use also helps to increase the reliability of the DUETI. In addition, the feature sets include heightened security as noted via the Cryptographic components 2220, 2226, 2228 and throughout, making access to the features and data more reliable and secure The DUETI transforms site traversal, site request, embed data request, purchase request inputs, via DUETI components (e.g., embed 2241, player 2242, asset collection browser 2243, TAT Gift It 2244, TAT Share It 2245, TAT Want It 2246, TAT Buy It 2247 of FIG. 22), into contextual activity payload, digital/media/actual asset procurement outputs.

The DUETI component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the DUETI server employs a cryptographic server to encrypt and decrypt communications. The DUETI component may communicate to and/or with other components in a component collection, including itself, and/or facilities of the like. Most frequently, the DUETI component communicates with the DUETI database, operating systems, other program components, and/or the like. The DUETI may contain, communicate, generate, obtain, and/or provide program component, system, user, and/or data communications, requests, and/or responses.

Distributed DUETIs

The structure and/or operation of any of the DUETI node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DUETI controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the DUETI controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to
address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
```

```
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xay.com/perl/site/lib/SOAP/Parser.html
http://publib.boulder.ibm.com/infocenter/tivihelp/v2r1/
    index.jsp?topic=/com.ibm.IBMDI.doc/
    referenceguide295.htm and other parser implementations:

http://publib.boulder.ibm.com/infocenter/tivihelp/v2r1/
    index.jsp?topic=/com.ibm.IBMDI.doc/
    referenceguide259.htm all of which are hereby expressly incorporated by reference.

Additional example embodiments include:

1. A processor-implemented method for transforming a video presentation into a distributed unfolding embedded transaction and inventory management system, comprising:

executing processor-implemented component instructions to:

receive said video from a first server for display to a user via a graphical user interface; transmit information regarding said video to a second server for compiling a data payload associated with said video;

receive said data payload from said second server; and transform said data payload, using a distributed unfolding embedded transaction and inventory (dueti) browser component, a dueti player component and a dueti embed component, into a user interface selection mechanism associated with said video, wherein said transformation comprises:

transforming said data payload to form an unfurled user interface selection display having dynamic selection information for (a) sharing information regarding said video with a user's social contacts, (b) purchasing or trading digital or physical goods or services associated with said video, (c) adding information regarding said video to a user's wishlist; and (d) gifting digital or physical goods or services associated with said video to a third party.

2. The processor-implemented method of embodiment 1 wherein said transforming comprises executing processor-implemented component instructions to:

transform said data payload to form an unfurled user interface selection display in an iframe overlaying said video.

3. The processor-implemented method of embodiment 2 wherein said transforming comprises executing processor-implemented component instructions to:

transform said data payload to form an unfurled user interface selection display, upon user selection, in an iframe overlaying said video.

4. The processor-implemented method of embodiment 1 wherein said transforming comprises using an application programming interface to call for said data payload from said second server.

5. The processor-implemented method of embodiment 1 wherein said transforming comprises using an application programming interface provided by a video player to call for an outside user interface overlaying said video to display formation from said data payload.

6. The processor-implemented method of embodiment 1 wherein said second server creates said data payload from information regarding a transaction history of said user.

7. The processor-implemented method of embodiment 6 wherein said transforming comprises executing processor-implemented component instructions to:
transform said data payload to form an unfurled user interface selection display in an iframe overlaying said video, said unfurled user interface selection display including at least a portion of a transaction history of said user, and a suggested future purchases to said user based on said transaction history and said video presentation.

8. A distributed unfolding embedded transaction and inventory (dueti) matching system, comprising:
a network communications unit to receive a data payload request regarding a video presentation from a video player disposed on a user's device;
a storage component to store data payload requests regarding said video presentation;
a computation unit to determine said data payload by analyzing and retrieving supplemental data regarding said video presentation from third parties resources, wherein said storage component stores said computed data payload; and
a processing unit to process and transmit said data payload in response to an API call from said video player, wherein said processing unit processes said data payload to unfurl into an iframe to form a user interface overlayed over said video presentation, upon user selection;
a determination component to determine availability of items for purchase or barter from third party providers in connection with said data payload; and
a transaction component to initiate and complete a transaction involving products or services in connection with said data payload and said video presentation.

9. The distributed unfolding embedded transaction and inventory (dueti) matching system of embodiment 8 wherein said overlayed user interface comprises visual components to share, purchase, trade or gift products or services in connection with said video presentation.

10. The distributed unfolding embedded transaction and inventory (dueti) matching system of embodiment 8 wherein said storage component stores a transaction history of a user's interactions in connection with transactions involving said video presentation, and wherein said data payload includes said transaction history.

11. The distributed unfolding embedded transaction and inventory (dueti) matching system of embodiment 10 wherein said processing unit determines suggested goods or services to purchase in connection with said transaction history, and processes said data payload to include said suggested goods or services.

12. The distributed unfolding embedded transaction and inventory (dueti) matching system of embodiment 8 wherein said data payload is first transmitted to a third party server for transmission to said user, wherein said third party server initially transmitted said video presentation to said user.

13. A distributed unfolding embedded transaction and inventory (dueti) matching apparatus, comprising:
a memory;
a component collection in the memory, including:
a dueti browser component;
a dueti player component;
a dueti embed component;
a transaction and asset transformation (TAT) want it component;
a TAT share it component; and
a TAT gift it component;
a processor disposed in communication with the memory, and configured to issue a plurality of processing instructions from the component collection stored in the memory,
wherein the processor issues instructions from the component collection, stored in the memory, to:
transmit a player component with an embedded data payload from a dueti server to a user's web browser, utilizing said dueti browser component and said dueti player component,
wherein said embedded data payload includes information to create graphical displays for user selection of want it, share it, and gift it user interfaces, utilizing said TAT want it component; said TAT share it component; and said TAT gift it component;
receive a user selection in connection with said player component; said user selection including at least one of purchasing, trading, sharing or gifting a user selection; and
processing a transaction in connection with said user selection.

14. The dueti matching apparatus of embodiment 13 wherein said processing a transaction comprises selecting an on-line store to complete said transaction.

15. The dueti matching apparatus of embodiment 13 wherein the processor issues instructions from the component collection, stored in the memory, to process said transaction by transmitting information regarding said user to a third-party e-commerce provider for processing.

16. The dueti matching apparatus of embodiment 13 wherein the processor issues instructions from the component collection, stored in the memory, to transmit said player component with an embedded data payload including a user wishlist, a plurality of a user friends' wishlists and a have/want status list of each item in said wishlists.

17. The dueti matching apparatus of embodiment 13 wherein the processor issues instructions from the component collection, stored in the memory, to transmit said player component with an embedded data payload including a video montage of a user's wishlist.

18. The dueti matching apparatus of embodiment 13 wherein the processor issues instructions from the component collection, stored in the memory, to process said transaction by determining availability of an item at a plurality of on-line stores; and displaying availability status at said on-line stores to said user.

19. The dueti matching apparatus of embodiment 13 wherein the processor issues instructions from the component collection, stored in the memory, to process said transaction by unfolding said payload, upon user selection, into a plurality of user interface component displays for further user selection, said user interface component displays including at least one of:
a component display for sharing information regarding said payload with a user's social media contacts;
a component display for purchasing an item associated with a product or video associated with said player component; and
a component display for gifting an item associated with a product or video associated with said player component.

20. A processor-implemented method for transforming a video presentation into a distributed unfolding embedded transaction and inventory management system, comprising:
   executing processor-implemented component instructions to:
   transmitting said video and an associated embedded data payload to a user interface for display to a user;
   transforming said data payload, using a distributed unfolding embedded transaction and inventory (dueti) browser component, a dueti player component and a dueti embed component, into a user interface selection mechanism associated with said video, wherein said transformation comprises:
   transforming said data payload to form a user interface selection display having dynamic selection information for (a) sharing information regarding said video with a user's social contacts, (b) purchasing or trading digital or physical goods or services associated with said video, (c) adding information regarding said video to a user's wishlist; and (d) gifting digital or physical goods or services associated with said video to a third party.

21. The processor-implemented method of embodiment 20 for transforming a video presentation to a distributed unfolding embedded transaction and inventory management system, wherein said transformation further comprises:
   transforming a data payload to form a user interface selection display having dynamic information regarding wishlists of a plurality of third parties.

22. In memory, storing a plurality of processor-issuable instructions to provide an interaction interface having a plurality of interaction-interface mechanisms for conducting distributed unfolding embedded transaction and inventory (dueti) matching for a video or product, comprising:
   a selection interface mechanism to specify a video or product for display to a user;
   an interaction interface mechanism to display transformed embedded data payload subcomponents, associated with said video or product, for selection by said user, said interaction interface mechanism comprising a plurality of sub-interface interaction mechanisms comprising:
      a first sub-interface interaction mechanism to display embedded data payload subcomponents for sharing information regarding said video or product to a plurality of social media contacts;
      a second sub-interface interaction mechanism to display embedded data payload subcomponents for sharing sales or trading information from a plurality of third party providers regarding said video or product to said user;
      a third sub-interface interaction mechanism to display embedded data payload subcomponents for gifting products or services regarding said video or product to third parties;
   a value interaction interface mechanism to affect a value of a displayed video or product; and
   a display region for display of said interaction interface mechanisms.

23. A memory for access by a processor-executable program component, comprising:
   a processor-operable data structure stored in the memory, the data structure having interrelated data types, wherein processor instructions embody the data types and associated data, for conducting distributed unfolding embedded transaction and inventory (dueti) matching associated with a displayed video or product, including:
   a collection of data types for conducting distributed unfolding embedded transaction and inventory matching information associated with a displayed video or product, said collection comprising:
      a first data type to store a source address for an originating device;
      a second data type to store a destination address for a target device;
      a third data type to store an intermediary address for an intermediate device, wherein the intermediary device address is computed as the sum of the source address and destination address;
   said collection of data types configured to facilitate transmission of a player component with an embedded data payload from a dueti server to a user's web browser, utilizing a dueti browser component and a dueti player component, wherein said embedded data payload includes information to form graphical displays for user selection of user interfaces for selecting preferences for purchasing, trading, and gifting products or services associated with said displayed video or product;
   said collection of data types configured to facilitate processing of a transaction in connection with user selection.

24. A processor-implemented system for transforming a video presentation into a distributed unfolding embedded transaction and inventory management system, comprising:
   means for receiving said video from a first server for display to a user via a graphical user interface; means for transmitting information regarding said video to a second server for compiling a data payload associated with said video;
   means for receiving said data payload from said second server; and
   means for transforming said data payload, using a distributed unfolding embedded transaction and inventory (dueti) browser component, a dueti player component and a dueti embed component, into a user interface selection mechanism associated with said video, wherein said transformation comprises:
   transforming said data payload to form an unfurled user interface selection display having dynamic selection information for (a) sharing information regarding said video with a user's social contacts, (b) purchasing or trading digital or physical goods or services associated with said video, (c) adding information regarding said video to a user's wishlist; and (d) gifting digital or physical goods or services associated with said video to a third party.

25. The processor-implemented system of embodiment 24 wherein said means for transforming comprises means for executing processor-implemented component instructions to:
   transform said data payload to form an unfurled user interface selection display in an iframe overlaying said video.

26. The processor-implemented system of embodiment 25 wherein said means for transforming comprises means for executing processor-implemented component instructions to:
   transform said data payload to form an unfurled user interface selection display, upon user selection, in an iframe overlaying said video.

27. The processor-implemented system of embodiment 24 wherein said means for transforming comprises using an application programming interface to call for said data payload from said second server.
28. The processor-implemented system of embodiment 24 wherein said means for transforming comprises using an application programming interface provided by a video player to call for an outside user interface overlaying said video to display formation from said data payload.
29. The processor-implemented system of embodiment 24 wherein said second server creates said data payload from information regarding a transaction history of said user.
30. The processor-implemented system of embodiment 29 wherein said means for transforming comprises executing processor-implemented component instructions to:
transform said data payload to form an unfurled user interface selection display in an iframe overlaying said video, said unfurled user interface selection display including at least a portion of a transaction history of said user, and a suggested future purchases to said user based on said transaction history and said video presentation.
31. A method for distributed unfolding embedded transaction and inventory (dueti) matching, comprising:
receiving a data payload request regarding a video presentation from a video player disposed on a user's device;
storing data payload requests regarding said video presentation into a storage component;
determining said data payload by analyzing and retrieving supplemental data regarding said video presentation from third parties resources, wherein said storage component stores said computed data payload; and
processing and transmitting said data payload in response to an API call from said video player, wherein said processing processes said data payload to unfurl into an iframe to form a user interface overlayed over said video presentation, upon user selection;
determining availability of items for purchase or barter from third party providers in connection with said data payload; and
initiating and completing a transaction involving products or services in connection with said data payload and said video presentation.
32. The method of distributed unfolding embedded transaction and inventory (dueti) matching of embodiment 31 wherein said overlayed user interface comprises visual components to share, purchase, trade or gift products or services in connection with said video presentation.
33. The method of distributed unfolding embedded transaction and inventory (dueti) matching of embodiment 31 wherein said storage component stores a transaction history of a user's interactions in connection with transactions involving said video presentation, and wherein said data payload includes said transaction history.
34. The method of distributed unfolding embedded transaction and inventory (dueti) matching of embodiment 33 wherein said processing unit determines suggested goods or services to purchase in connection with said transaction history, and processes said data payload to include said suggested goods or services.
35. The distributed unfolding embedded transaction and inventory (dueti) matching system of embodiment 31 wherein said data payload is first transmitted to a third party server for transmission to said user, wherein said third party server initially transmitted said video presentation to said user.
36. A distributed unfolding embedded transaction and inventory (dueti) matching apparatus, comprising:
a memory means for storing a component collection, including:
component means for dueti browsing;
component means for playing a dueti video;
component means for embedding dueti payload information;
component means for transacting and asset transforming want it data;
component means for transacting and asset transforming share it data; and
component means for transacting and asset transforming gift it data;
processor means disposed in communication with the memory means, and configured to issue a plurality of processing instructions from the component collection stored in the memory,
wherein the processor means issues instructions from the component collection, stored in the memory means, to:
transmit a player component with an embedded data payload from a dueti server to a user's web browser, utilizing said dueti browser component and said dueti player component,
wherein said embedded data payload includes information to create graphical displays for user selection of want it, share it, and gift it user interfaces, utilizing said TAT want it component; said TAT share it component; and said TAT gift it component;
receive a user selection in connection with said player component; said user selection including at least one of purchasing, trading, sharing or gifting a user selection; and
processing a transaction in connection with said user selection.
37. The dueti matching apparatus of embodiment 36 wherein the processor means issues instructions from the component collection, stored in the memory means, to process a transaction comprising selecting an on-line store to complete said transaction.
38. The dueti matching apparatus of embodiment 36 wherein the processor means issues instructions from the component collection, stored in the memory, to process said transaction by transmitting information regarding said user to a third-party e-commerce provider for processing.
39. The dueti matching apparatus of embodiment 36 wherein the processor means issues instructions from the component collection, stored in the memory, to transmit said player component with an embedded data payload including a user wishlist, a plurality of a user friends' wishlists and a have/want status list of each item in said wishlists.
40. The dueti matching apparatus of embodiment 36 wherein the processor means issues instructions from the component collection, stored in the memory, to transmit said player component with an embedded data payload including a video montage of a user's wishlist.
41. The dueti matching apparatus of embodiment 36 wherein the processor means issues instructions from the component collection, stored in the memory, to process said transaction by determining availability of an item at a plurality of on-line stores; and displaying availability status at said on-line stores to said user.
42. The dueti matching apparatus of embodiment 36 wherein the processor means issues instructions from the component collection, stored in the memory, to process said transaction by unfolding said payload, upon user selection, into a plurality of user interface component displays for further user selection, said user interface component displays including at least one of:

a component display means for sharing information regarding said payload with a user's social media contacts;

a component display means for purchasing an item associated with a product or video associated with said player component; and a component display means for gifting an item associated with a product or video associated with said player component.

43. A processor-implemented system for transforming video presentations for distributed unfolding embedded transaction and inventory management, comprising:

means for executing processor-implemented component instructions to:

means for transmitting said video and an associated embedded data payload to a user interface for display to a user;

means for transforming said data payload, using a distributed unfolding embedded transaction and inventory (dueti) browser component, a dueti player component and a dueti embed component, into a user interface selection mechanism associated with said video, wherein said transformation comprises:

means for transforming said data payload to form a user interface selection display having dynamic selection information for (a) sharing information regarding said video with a user's social contacts, (b) purchasing or trading digital or physical goods or services associated with said video, (c) adding information regarding said video to a user's wishlist; and (d) gifting digital or physical goods or services associated with said video to a third party.

44. The processor-implemented system of embodiment 43 for transforming video presentations for distributed unfolding embedded transaction and inventory management, further comprising:

means for transforming a data payload to form a user interface selection display having dynamic information regarding wishlists of a plurality of third parties.

45. A method, comprising, providing a video advertisement to a user;

receiving a user input indicating the user is interested in the video advertisement;

determining enhanced advertisement content based on the user indication of interest in the advertisement; and displaying enhancement content to the user.

46. A system, comprising:

a processor; and a memory disposed in communication with the processor and storing processor-issuable instructions to:

provide a video advertisement to a user;

receive a user input indicating the user is interested in the video advertisement;

determine enhanced advertisement content based on the user indication of interest in the advertisement; and display enhancement content to the user.

47. A processor-readable tangible medium storing processor-issuable instructions to:

provide a video advertisement to a user;

receive a user input indicating the user is interested in the video advertisement;

determine enhanced advertisement content based on the user indication of interest in the advertisement; and display enhancement content to the user.

In order to address various issues and advance the art, the entirety of this application for Distributed, Unfolding, Embedded Transaction and Inventory Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a DUETI individual and/or enterprise user, database configuration and/or relational model, data type, data transmission and/or network framework, syntax structure, and/or the like, various embodiments of the DUETI, may be implemented that enable a great deal of flexibility and customization. For example, aspects of the DUETI may be adapted for advertising, distributed e-commerce and browsing of all asset types. While various embodiments and discussions of the DUETI have included digital asset, management, inventory and electronic purchasing systems, however, it is to be understood that the embodiments described herein may be readily configured and/or customized for a wide variety of other applications and/or implementations.

What is claimed is:

1. A cryptographically limiting trading card distribution apparatus, comprising:
    a memory;
    a component collection in the memory;
    a processor disposed in communication with the memory, and configured to issue a plurality of processing instructions from the component collection stored in the memory, to:
        obtain a user's digitally cryptographically limited edition trading card identifier datastructure from a user at a distributed rights managing server, wherein the digitally cryptographically limited edition trading card identifier datastructure is registered with a cryptographic distributed ledger;
        authorize the digitally cryptographically limited edition trading card;
        provide a digitally cryptographically limited edition trading card component with an embedded data payload from a distributed unfolding embedded transaction and inventory (dueti) server to a user's media browser;
        wherein said embedded data payload includes information to create graphical displays for the user's authorized digitally cryptographically limited edition trading card and user selection of want it, share it, gift it, and digital card loan user interfaces;
        receive a user transaction selection in connection with said dueti component, wherein said user transaction selection including any of purchasing, trading, gifting, and loan a user selection; and
        process a transaction in connection with said user transaction selection and update any change of ownership of the digitally cryptographically limited edition trading card with the rights management server.

2. The dueti matching apparatus of claim 1 wherein said processing a transaction comprises selecting an on-line store to complete said transaction.

3. The dueti matching apparatus of claim 1 wherein the processor issues instructions from the component collection, stored in the memory, to process said transaction by transmitting information regarding said user to a third-party e-commerce provider for processing.

4. The dueti matching apparatus of claim 1 wherein the processor issues instructions from the component collection, stored in the memory, to transmit said digitially cryptographically limited edition trading card component with an embedded data payload including a user wishlist, a plurality of a user friends' wishlists and a have/want status list of each item in said wishlists.

5. The dueti matching apparatus of claim 1 wherein the processor issues instructions from the component collection, stored in the memory, to transmit said player component with an embedded data payload including a video montage of a user's wishlist.

6. The dueti matching apparatus of claim 1 wherein the processor issues instructions from the component collection, stored in the memory, to process said transaction by determining availability of an item at a plurality of on-line stores; and displaying availability status at said on-line stores to said user.

7. The dueti matching apparatus of claim 1 wherein the processor issues instructions from the component collection, stored in the memory, to process said transaction by unfolding said payload, upon user selection, into a plurality of user interface component displays for further user selection, said user interface component displays including at least one of:
    a component display for sharing information regarding said payload with a user's social media contacts;
    a component display for purchasing an item associated with a product or video associated with said player component; and
    a component display for gifting an item associated with a product or video associated with said player component.

* * * * *